Figure 8:
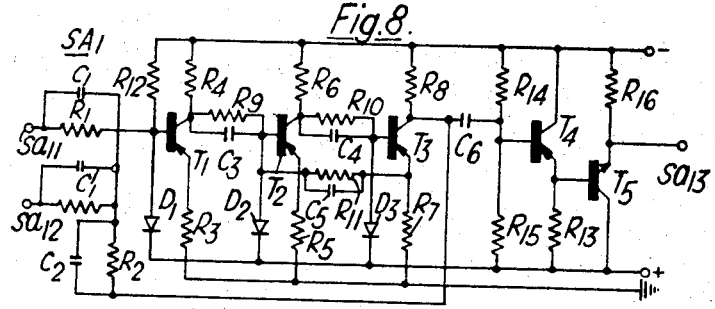

Oct. 1, 1968   P. G. A. JESPERS ET AL   3,404,261
CORRELATION APPARATUS FOR COMPUTING TIME AVERAGES OF FUNCTIONS
Filed March 6, 1963   8 Sheets-Sheet 1
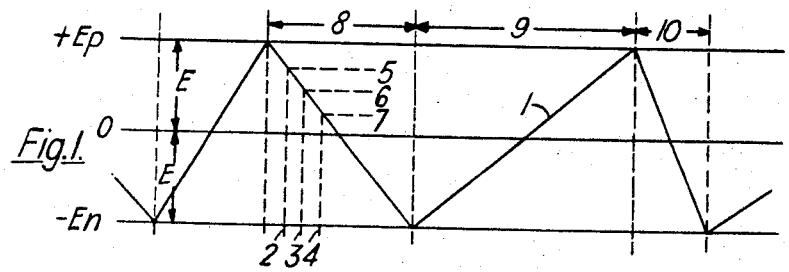
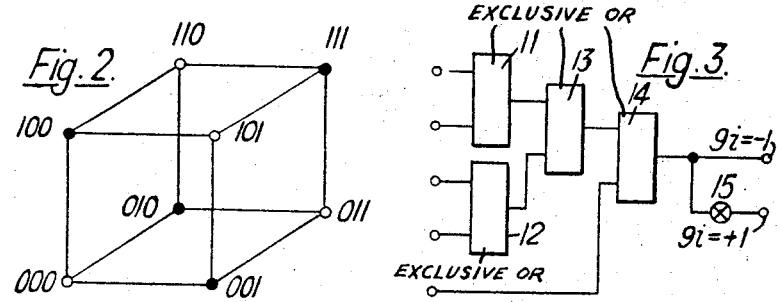
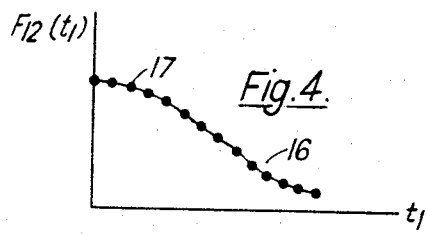
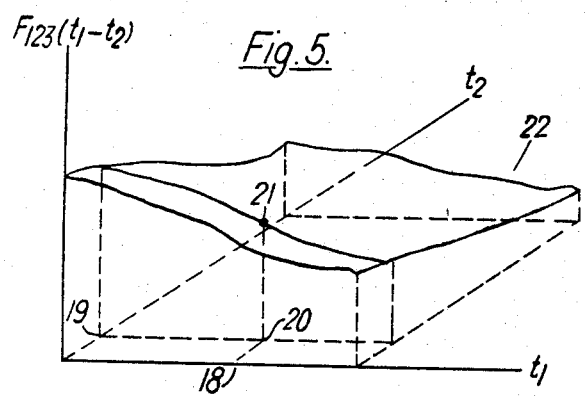
Inventors
PAUL G. A. JESPERS
PE TSI CHU
By *Percy P. Lenker*
Attorney

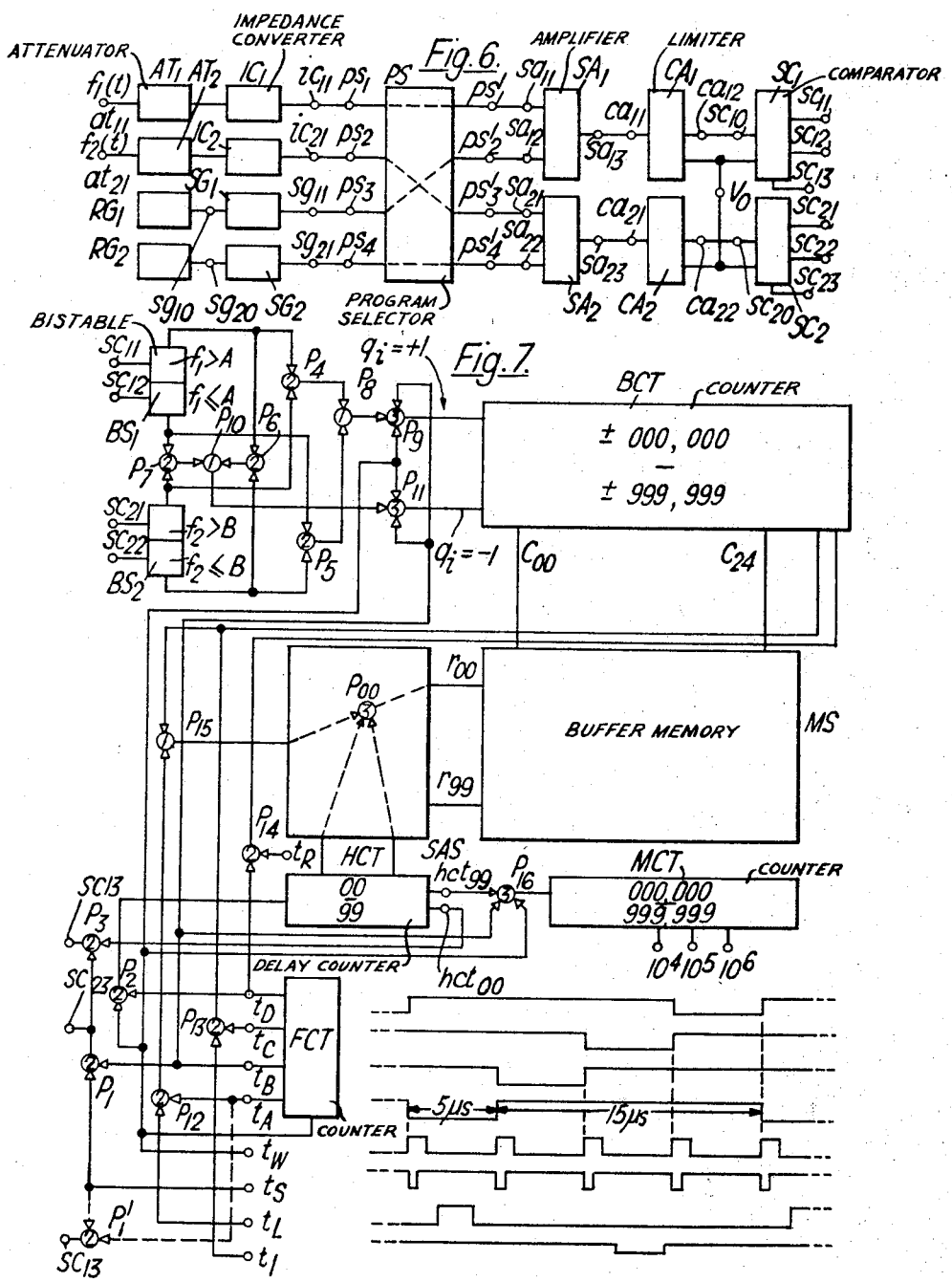

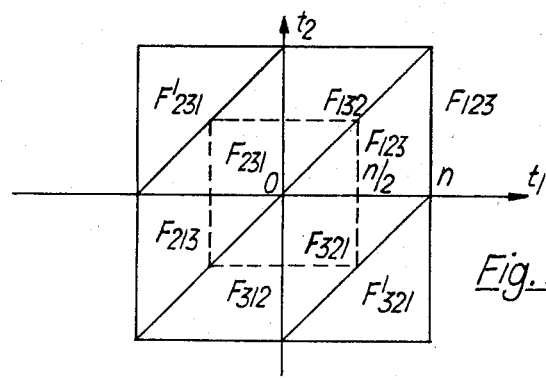

Inventors
PAUL G. A. JESPERS
PE TSI CHU
By
Attorney

United States Patent Office 3,404,261
Patented Oct. 1, 1968

3,404,261
CORRELATION APPARATUS FOR COMPUTING TIME AVERAGES OF FUNCTIONS
Paul Gustave Amélie Jespers, Tervueren, and Pe Tsi Chu, Antwerp, Belgium, assignors to International Standard Electric Corporation, New York, N.Y., a corporation of Delaware
Filed Mar. 6, 1963, Ser. No. 263,234
Claims priority, application Belgium, Mar. 7, 1962, 289,898, Patent 614,757
37 Claims. (Cl. 235—181)

The invention relates to an apparatus for computing time averages of functions comprising means for the sampling of functions at repeated time intervals.

Such an apparatus has been described in U.S. Patent No. 2,643,819 and also in an article by Y. W. Lee, T. P. Cheatham, Jr. and J. B. Wiesner published on pages 1165–1171 of the October 1950 issue of PIRE. In these prior references, the apparatus described had as more specific object the computation of correlation functions, i.e. functions defined by $$F_{12}(t_1) = \lim_{T \to \infty} \frac{1}{2T} \int_{-T}^{T} f_1(t) f_2(t+t_1) dt \quad (1)$$

where $F_{12}(t_1)$ represents the crosscorrelation function of the functions $f_1(t)$ and $f_2(t)$, the time variable $t$ disappearing in the course of integration in such a manner that the correlation function $F_{12}$ is a function of $t_1$, the time interval corresponding to the shift between the functions $f_1$ and $f_2$. When the functions $f_1$ and $f_2$ are distinct from one another, the function $F_{12}(t_1)$ is called the crosscorrelation function, but when function $f_2(t)$ is identical to function $f_1(t)$, the correlation function $F_{11}(t_1)$ is called the autocorrelation function. Correlation functions have acquired an appreciable importance in different domains and they represent a particularly effective tool for the analysis of the statistical characteristics of messages or noise. Among the principle applications of correlation analysis one may briefly mention noise analysis, network analysis and detection of periodic signals.

In relation to noise analysis, the theorem of Wiener-Khintchine proves that the autocorrelation function and the power density spectrum of a stationary random signal, i.e. such that its statistical properties are independent of time, form a pair of Fourier transforms. In this manner, from the autocorrelation function it is thus possible to determine the spectral power distribution of any stationary random process.

The article of P. Jespers entitled "Introduction de Méthodes statistiques dans l'étude des filtres" and published on pages 199 to 207 of Revue E. Tijdschrift, volume III, No. 5, 1961, describes among other things the applications of correlation functions to circuit analysis. The latter may be either linear or non-linear, with or without local noise source and in each case it is possible to calculate the transfer function of a network and its pulse response from the correlation functions of a random input signal, which may for instance be white noise, and of the random output signal from the network. The input-output crosscorrelation function of the network, e.g. a filter, driven by white noise is proportional to the pulse response of the filter, the Fourier transform of this crosscorrelation function being proportional to the transfer function of the filter. In particular, these properties permit to determine the transmission characteristics of networks which cannot be disturbed by the application of particular measuring signal sources.

A third principal application of correlation functions is the detection of periodic signals masked by noise since correlation analysis permits, on the basis of statistical time averages, to eliminate all incoherent components, i.e. those which do not present relations between one another. Detailed considerations on the advantage of autocorrelation and crosscorrelation for such applications are to be found in the above mentioned PIRE article.

There is a multiplicity of application fields for correlators and one may mention for instance long-range radar echo detection, oil soundings, electroencephalography, oceanography, noise and acoustic measurements, mechanical impedance problems, atmospheric turbulence, radio interferences, etc.

Most of the correlators developed until now have been of the analogue type with computing precisions of the order of 5%.

An analogue correlator is described for instance by K. W. Goff in an article published in "The Journal of the Acoustical Society of America," volume 27, No. 2, March 1955, pages 223 to 236 and entitled "An analog Correlator for Acoustic Measurements."

The U.S. Patent No. 2,643,819 describes a system on a digital basis where the two electric waveforms representing the functions $f_1(t)$ and $f_2(t)$ are sampled at time intervals which are separated by a delay $t_1$. By repeating this pair of measurements N times, N being a large number, the time interval separating the two samples of a pair being always equal to $t_1$ and the pairs of samples being separated by a time interval which is sufficiently large so that the measurements are statistically independent from one another, it will be possible to use the result of these N measurements to compute a point of the crosscorrelation function $F_{12}(t_1)$ corresponding to the particular value of $t_1$ representing the delay between the two samples of each pair. The computing procedure consists in multiplying the voltage amplitudes of the two samples, one from the function $f_1(t)$ and the other from the function $f_2(t)$, of a pair and to accumulate the N products thus obtained to secure the sum of all these N products which divided by N, will give the value of the crosscorrelation function $F_{12}(t_1)$ for the particular delay value $t_1$ which is chosen. The N pairs of samples need not be obtained with equal intervals between one another and these time intervals must be sufficiently long to ensure statistical equilibrium, but in practice it will generally be easier to regularly sample the two waveforms. As described in the above mentioned patent and in the above mentioned PIRE article, each pair of samples gives rise to a pair of pulses whose amplitudes represent the respective instantaneous amplitudes of the two functions at the respective sampling instants and one of the pulse trains corresponding to one of the waveforms is modified so as to transform the amplitude variation of these pulses into time variations, after which the amplitude modulated pulses of the other train are also modulated in duration by the modified pulses of the first train so as to obtain a train of pulses whose surfaces are proportional to the product of the pair of instantaneous amplitudes. These pulses which are modulated both in amplitude and in duration are then forwarded to an integrating device.

After N pairs of samples, it is necessary to repeat the operation and this as many times as the desired number of different points to be computed for the correlation curve. If the desired number of points is $n$, $nN$ pairs of samples shall thus have to be successively obtained.

Despite the sampling, the operation of the correlator described above still calls largely upon analogue computing methods which makes it difficult to secure a high precision apparatus. Phase shifting devices are foreseen to create the time difference $t_1$ between the samples of the first waveform and those of the second, and the means to multiply the amplitudes of the samples, to add the products and to obtain the average for the N pairs of samples are essentially analogue means.

A correlator using pairs of samples but provided with computing circuits enabling a much larger precision has been described by H. E. Singleton in an article entitled "A Digital Electronic Correlator" and published on pages 1422–1428 of the December 1950 issue of PIRE. In this digital correlator, a timing device is foreseen enabling to produce two pulse trains with an interval of $t_1$ between any two corresponding pulses of the two trains, interval which may be modified for the calculation of the various $n$ points of the correlation function. The instantaneous amplitudes which are sampled by these pulses are converted into pulses whose duration is modulated in a corresponding manner. A digital quantizing of these durations proportional to the instantaneous amplitudes is obtained with the help of a binary counter. Started from a rest condition by advancing pulses, at a given rate, at the start of the duration modulated pulses, this counter will have a numerical condition at the end of this duration modulated pulse which will be a digital measure of this duration and consequently of the instantaneous amplitude measured by the sampling pulse. The two digital values thus obtained for the two samples forming a pair are then applied to a digital multiplier and the digits of the product are integrated for the N pairs of samples by sending them into a digital accumulator constituted by a cascade of bistable circuits operating as a binary counter whose last stages will give the result of the sum of these N products.

While this digital method is more precise and more flexible, it nevertheless requires a considerable amount of equipment. By quantizing as indicated in the article on a basis of ten binary digits, the binary counter must be able to count a maximum of $2^{10}-1$ pulses, and even when using a frequency of 5 megacycles per second for driving such a binary counter, one must count on a time of 200 microseconds merely for coding a pulse. A like time is required for the multiplication of the two ten-digit binary numbers and an addition circuit must be provided able to accumulate the N products of the two binary numbers of ten digits each. As N may generally vary from $10^2$ to $10^6$, a representative value being $10^5$, it is seen that the circuits are necessarily either very complicated in the case of fast parallel computation or alternatively the operations take an enormous time in the case of serial calculations.

Correlation functions must be calculated for $n$ values of the delay $t_1$ and in practice if one wishes to determine this delay with some precision, for instance as described in the last article cited above with the help of a digital frequency divider, one is brought to use a unitary delay $t_0$, all the different delays being integral multiples of this unitary delay. For the computation of $n$ points of the correlation function, the various delays thus go from 0, $t_0$, $2t_0$, $3t_0$ . . . to $(n-1)t_0$, and the maximum time separating a waveform sample from the next sample must be at least equal to $nt_0$ plus the time necessary for the quantizing, multiplication and addition operations described above. In practice, one is necessarily driven to choose a unique predetermined value between two successive samples of the same wave form and this time shall thus necessarily be at least equal to $nt_0$ plus the computation time.

The determination of the $nN$ pairs of samples may thus necessitate a considerable time which may rise to several days for values of $n$ and N equal to $10^2$ and to $10^6$ respectively, and this despite the use of frequencies of the order of the megacycle and more for some of the computation operations.

A general object of the invention is to realize an apparatus permitting to compute time averages of functions and particularly for computing correlation functions and which, while using digital techniques permitting a high precision, necessitates only an equipment which is very reduced with regard to the existing realizations.

Another object of the invention is to realize such an apparatus which, all other things being equal, can perform the computation in a very reduced time with regard to the time necessary in accordance with the known techniques.

In accordance with a first general aspect of the invention, an apparatus for the computation of time averages of functions as initially defined, is characterized by the fact that comparator means are provided to compare the amplitude of each of the functions samples with the instantaneous amplitude of a variable reference level and to associate a binary value to the result of each comparison.

In accordance with another characteristic of the invention, said reference level varies in a random manner.

In accordance with another characteristic of the invention, said reference level varies continuously between a predetermined lower limit and a predetermined higher limit.

In accordance with another characteristic of the invention, the maxima and minima of said functions do not go beyond said limits.

In accordance with another characteristic of the invention, said reference level varies linearly.

In accordance with another characteristic of the invention, an accumulator is provided for algebraically adding the N binary values resulting from N successive comparisons for the same function.

It has been proved that by performing such comparisons between the samples of the function whose time average must be computed and the reference samples whose amplitude varies in a random manner permits to avoid quantizing the amplitudes of the samples as previously done and entailing a complex and relatively slow equipment.

Another object of the invention is to apply the comparison technique mentioned above with reference amplitudes varying in a random manner in order to compute correlation functions.

In accordance with another characteristic of the invention, an apparatus for computing time averages of functions and particularly for computing correlation functions as defined in accordance with the first general aspect of the invention in characterized by the fact that $k(k>1)$ binary values resulting from a set of $k$ comparisons between $k$ functions and the $k$ instantaneous values of the random variable reference levels which are respectively associated thereto, these random variables being independent from one another, are provided by the $k$ comparator means to a logical circuit producing an output binary value dependent on the parity of the number out of the $k$ comparisons having given a same binary result, an accumulator being foreseen to algebraically add the N output binary values resulting out of N successive sets of $k$ comparisons.

In the case of ordinary correlation functions such as defined at the beginning of this description, one will thus give a first or a second value in accordance with the result of the comparison between the functions $f_1$ and the instantaneous amplitude of the reference sample which is associated thereto and by normalizing one of these values to unity, one may thus give the value 1 or $\alpha$ ($\alpha \neq 1$) in accordance with the result of the comparison. The same possibility is offered for the function $f_2$ so that for each pair of samples of the functions $f_1$ and $f_2$, the comparisons with the instantaneous amplitudes of the corresponding reference samples may give four possible results which may be defined by 00, 11 when the amplitudes of the two functions are either both lower or equal to or both higher than their reference samples and by 01, 10 when the first function is lower or equal to its reference sample while the second is higher than its reference sample, and vice versa. In the first case symbolized by 00, 11, the number of functions giving comparisons with the same result is even while in the other case it is odd and for the whole series of comparisons for the two functions, one will give in this way either one or the other value, i.e. 1 or $a$ in normalized values.

It can be proved that if the two values expressing the result of all the comparisons are 1 and −1, the algebraic addition of a large number N of these results will give a sum directly proportional to the correlation function. This will also be true for the calculation of the average of a single function or of the mean of the product of two functions.

In accordance with a second general aspect of the invention, an apparatus for the computation of time averages of functions and particularly for the computation of correlation functions including means for repeatedly sampling functions in time, is characterized by the fact that the digital values resulting from the sampling of the different time functions are stored in a memory including a number of sections which is sufficient to successively store a series of $n$ results of the sampling, each of these last results corresponding to a particular value of the correlation delay of one of said functions with respect to another.

In accordance with another characteristic of the invention, an apparatus as characterized above includes in association with the said memory an access switch and a staticizing device permitting to successively transfer each of the $n$ results inscribed in the said memory into the staticizing device under the control of the access switch which is switched from one position to the other by an $n$-conditions delay counter driven by a train of repeated pulses and which provides control signals to said access switch in order to successively create a series of $n$ pulse trains whose time positions inside a revolution cycle of said delay counter corresponds to a particular correlation delay, the pulses feeding said delay counter serving also to define the instants during which one of the time functions is sampled, while one or possibly more pulses produced at an $n$ times slower rhythm by said delay counter are used to define a reference time for the sampling of one of the time functions at each cycle of said delay counter and possibly for the sampling of other time functions than that regularly sampled at the rhythm of the input pulses driving said delay counter.

In accordance with another characteristic of the invention, the staticizing device of said memory is characterized by the fact that it is realized in the form of a counter comprising a predetermined number of two condition devices which on the one hand are fed in parallel from said memory under the control of said access switch in order to staticize one of the $n$ results stored in said memory and which on the other hand is serially fed from the comparator devices foreseen to compare the time functions with their respective reference levels, this serial drive being made in the form of pulses characterizing the result of said comparisons.

In accordance with another characteristic of the invention, the said staticizing device operates as a reversible counter and is provided with a two-condition device indicating the sign of the numerical value corresponding to the condition of the reversible counter acting as a staticizing device, the counter being provided with two distinct inputs and the appearance of a pulse on one or the other of the inputs having for effect to add or subtract a unit to or from the result registered in said reversible counter.

The use of the memory in conjunction with the comparison of the functions samples with regard to reference samples whose level varies in a random manner is particularly advantageous since the result of these comparisons may be expressed by a single binary digit. Consequently, if a large number of N series of samples is obtained, one assigns the value $+1$ or $-1$ to the result of the overall comparison and the result being between the limits $+N$ and $-N$, even in the case of a value for N equal to $10^6$, such a number can be expressed with the help of a relatively small quantity of binary digits. By registering such a number in a memory section corresponding to a given correlation delay, this memory can staticize the number inscribed in a section at the moment the new series of samples is obtained and the overall result of the new comparison will cause the addition or the subtraction of one unit from the staticized number which may then be reinscribed in the corresponding memory section. At the next delay time, the same operation may be repeated for another memory section and so on.

In this manner it is also seen that for computing correlation functions it is no longer necessary to foresee a device providing a correlation delay time, but it becomes possible to use a single train of repetitive pulses to sample the function $f_2$ at each pulse while the function $f_1$ will be sampled at a lower rhythm only equal to $1/n$ times the sampling rhythm of $f_2$, by applying the pulse train to a frequency divider which may be realized by an $n$-condition counter which is continuously driven. The instantaneous condition of such a delay counter among the $n$ possible conditions defines a correlation delay time since for this condition the pulse sampling the function $f_2$ is separated from the pulse having previously sampled the function $f_1$ by a time which depends on the product of the delay counter condition by the sampling period for $f_2$.

Another object of the invention is to facilitate quantization of the samples by using the variable reference level.

In accordance with another characteristic of the invention, a waveform proportional to a time function to be analyzed and the reference waveform whose slope varies in a linear manner are applied to the two inputs of an operational amplifier which produces the analogue sum of the two waveforms.

In accordance with another characteristic of the invention, the waveform produced at the output of said operational amplifier is transmitted to the comparator means constituted by a two-input differential amplifier fed on the one hand by the said sum of the waveform to be analyzed with the reference waveform associated therewith, and on the other hand by a fixed stabilized reference voltage, triggering pulses being provided to the output stage of said differential amplifier in order to produce a pulse at one or the other of two distinct outputs of said differential amplifier in accordance with the result of the comparison between said sum of the two waveforms and the fixed stabilized reference voltage.

In accordance with another characteristic of the invention, the two outputs from said differential amplifier are respectively coupled to the inputs of a bistable device acting as staticizing device to store the result of the sampling of the waveform representing a time function.

In this manner, one may express the result of the comparison between the waveform to be analyzed and the variable reference waveform by simple and reliable means, it being possible for the result to remain stored in the staticizing bistable during any desired time interval. For the computation of the correlation function it will in particular be possible to sample the waveform representing the function in the case of the computation of an autocorrelation function, or that representing one of the two functions for the computation of the crosscorrelation function, keep the result in memory in a staticizing bistable during a complete cycle of the delay counter until a new sample of this waveform is stored. But during this cycle, the other staticizing bistable may be used for sampling during successive correlation delay times of the same waveforms (autocorrelation) or of the other waveform representing the other function (crosscorrelation) and states of the two bistables can be successively compared, at each delay time, a logical circuit which will provide a corresponding binary signal to the reversible counter permitting to accumulate the results of the $Nn$ series of comparisons in the case of the computation of $n$ points of the curve, each necessitating N sets of samples.

In such a device permitting to pass from analogue values (the function or functions to be analyzed and the reference function or functions) to digital values (the state or states of staticizing bistables), it is important to use measuring means which are as accurate as possible to compare the two waveforms.

Another object of the invention is consequently to increase the precision of the comparison between the waveforms to be analyzed and the reference waveform with a variable level.

In accordance with another characteristic of the invention, the potential obtained at the output of said operational amplifier is transmitted to one of the inputs of the differential amplifier acting as comparator by means of a voltage limiting device comprising a first symmetrical amplitude limiter followed by an amplifier at the output of which is a second symmetrical amplitude limiter, the reference voltage for each of the two limiters being each time equal to the said fixed stabilized reference voltage applied to the second input of said differential amplifier.

In this manner, the waveform representing the sum of the waveform to be analyzed and of the sawtooth reference waveform, or what amounts to the same thing, the waveform representing the difference between that to be analyzed and a sawtooth reference waveform whose slope is at any time the negative of the first, is subjected to a first slicing around the reference potential and after an amplification of this limited waveform a second slice of this amplitude waveform is finally obtained which permits an increased accuracy for the determination of the transition instants between the sum of the two waveforms and the fixed reference potential, i.e. the instants where the amplitude of the waveform to be analyzed goes through the instantaneous value of a variable level reference waveform.

In order to produce the reference waveform whose levels vary linearly between two predetermined limits but with slopes whose value is a random variable, it is important to be able to ensure a good linearity of the reference waveform while guaranteeing a true determination of this slope by the random phenomenon which controls it.

Another object of the invention is to realize a transistorized scanning generator particularly adapted to these ends.

In accordance with a third general aspect of the invention, a linear transistorized scanning generator using the "bootstrap" circuit principle is characterized by the fact that it includes a first and a second bootstrap circuit whose two inputs are coupled between one another towards a control voltage source and whose outputs are also coupled to one another to provide the output waveform, these two bootstrap circuits being identical with the exception of the polarity of the transistors, rectifiers or voltage sources used and which are the reverse of one another so as to be able to create by each bootstrap circuit a linear voltage variation in a given direction, the linear parts for each bootstrap circuit being controlled with the help of a bistable circuit having an output connected to the two bootstrap circuits for the control of a transistor operating as a short-circuiting switch for the linear charge capacitor, the two inputs of the bistable circuit being respectively controlled by a triggering signal coming from level detecting devices respectively included in the first and in the second bootstrap circuit, when the corresponding linear voltage variation goes beyond a predetermined level and distinct for each bootstrap circuit, the said output from the bistable circuit being coupled by an impedance to the output of the linear scanning generator, this measure ensuring a scanning generator output voltage which essentially consists in the linear part of the voltage variation successively provided by the two bootstrap circuits in accordance with the state of said bistable circuit.

In accordance with another characteristic of the invention, in each bootstrap circuit, the output from the transistor operating as buffer amplifier is connected to the output terminal of the linear scanning generator by a first rectifier and to the input of said level detecting device by a second rectifier, the rectifiers of the second bootstrap circuit being of opposite polarity with respect to those of the first and in each bootstrap circuit the potential level detecting device providing an output signal when this potential is reached and which serves to trigger the bistable in the condition enabling the short-circuiting of the linear charge condenser in the bootstrap circuit where the said reference level has been reached.

In accordance with another characteristic of the invention, a white noise generator is connected to the input of said linear scanning generator.

In this manner, such an association of two bootstrap circuits with a bistable device permits to select the linear parts of the waveforms produced by the two circuits using complementary transistors and the control by a white noise source will permit to trigger the linear part of each of the scanning waveforms of the bootstrap circuits and to instantaneously give it a random slope, the white noise source being coupled to the bootstrap circuit only at the transition time. This ensures an absolute value for the slopes of the reference waveform which, while remaining constant for a given variation from one predetermined level to the other, is a random variable.

Yet another object of the invention is to permit the realization of a versatile correlator which can be readily adapted to various calculations.

In accordance with another characteristic of the invention, a correlator as characterized above comprises an interconnecting device with $2k$ input terminals and $2k$ output terminals, $k(k>1)$ being the number of waveforms to be analyzed which may be simultaneously applied to the correlator, $k$ of said input terminals being connected to the input circuits to which are brought the waveforms to be analyzed, for instance variable attenuators followed by an impedance converter and the $k$ remaining input terminals being connected to the variable reference level generators, the $2k$ output terminals of said interconnecting device being connected to the inputs of $k$ operational amplifiers each with two inputs and the interconnecting device permitting to selectively interconnect the said input terminals to the said output terminals.

In this manner, one may readily adapt the correlator to the computation of various functions. If the correlator is foreseen for the handling of two distinct functions, the interconnecting device will have two pairs of input terminals and two pairs of output terminals, the latter being permanently connected to the inputs of two operational amplifiers, one for each pair of output terminals from the interconnecting device. Each pair of output terminals from this device comprises a terminal connected to the output of the input circuit for one of the waveforms to be analyzed and the other connected to the output from the variable reference voltage generator. For the computation of the crosscorrelation function, if two distinct waveforms are applied to two input circuits, the input terminals of the interconnecting device corresponding to these two input circuits will be connected to output terminals which are not associated with the same operational amplifier, the other two input terminals of the interconnecting device being connected to the two other output terminals. If on the other hand the calculation of an autocorrelation function is desired, in the interconnecting device it suffices to disconnect one of the input terminals corresponding to the input circuit which does not receive any waveform to be analyzed and to branch the interconnecting wire on the only input circuit which is effectively used.

One of the operational amplifiers is coupled to a comparator which is regularly sampled during each delay time, while the other operational amplifier leads to a comparator which is sampled only every $n$ delay times. For the cross correlation function, one of the waveforms will be successively sampled for every delay time and the other once out of $n$. In case of the autocorrelation function, the waveform to be analyzed, which is unique, will be applied to one of the input circuits and it will thus be regularly sampled by a comparator for each time delay and once out of $n$ by the other.

In case of a computation of an autocorrelation function, the correlation delays $t_i$ must only be calculated for one given sign, since an autocorrelation function is even. For crosscorrelation functions $F_{12}(t_1)$ with the help of the interconnecting device it will be possible to perform a first computation of $n$ points of $F_{12}(t_1)$ and when this computation will be terminated, in the interconnecting device it will suffice to cross the connections starting from the two input circuits and to repeat the calculations which will produce the function $F_{12}(t_1)$ equal to the crosscorrelation function $F_{12}(-t_1)$. As will be explained later in detail, for the correlation functions of higher order, without extreme complications it will be possible with the help of the interconnecting device to successively perform the calculation by inverting the order of the $k$ functions in accordance with the $k$ possibilities to compute all the possible values. These modifications of the connections may be programmed.

If it is desired to compute the time average of a single function, the interconnecting device will be used to connect the corresponding waveform towards that of the two channels which is regularly sampled every delay time, while the input of the interconnecting device corresponding to the other channel will be connected to ground. In the case of the computation of the RMS value of a random time function, the connections will be the same as for an autocorrelation function, but care will be taken to provide the sampling pulses to the two channels for each delay time.

Among the other uses of the correlator allowed by the invention, one may still cite the computation of the probability function and that of the probability density by using a variable reference level generator with a fixed slope and having a period corresponding to the cycle of the delay counter.

Another use of the correlator in accordance with the invention will permit to verify the stationary character of a random time function by repeated computation of the autocorrelation function by keeping into memory the previous result so as to permit a comparison.

The above mentioned and other objects and features of the invention will become more apparent and the invention itself will be better understood from the description of detailed embodiments thereof to be read in conjunction with the accompanying drawings and which represent various forms of the invention or diagrams to explain the latter, i.e.

Figure 9:
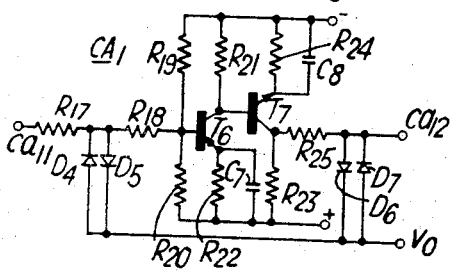
Figure 10:
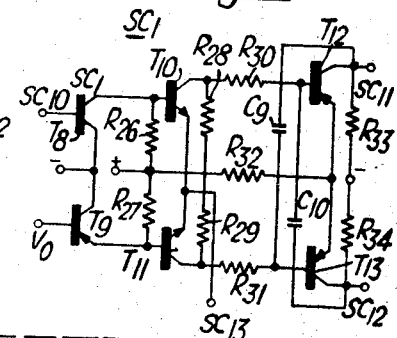
Figure 11:
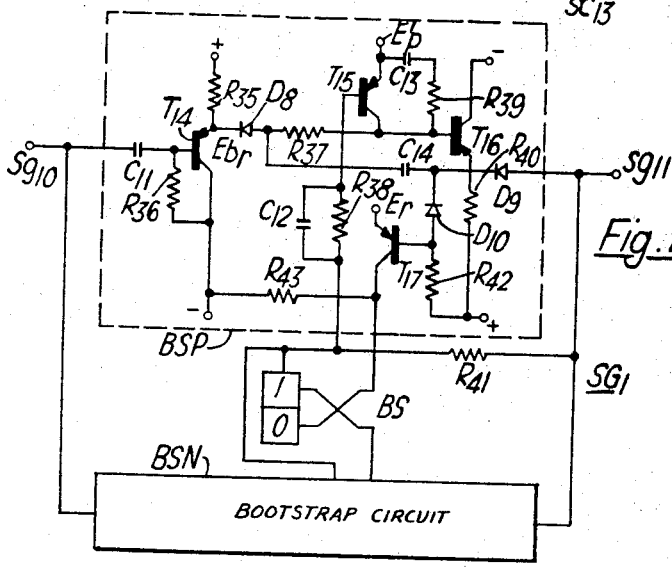
Figure 12:
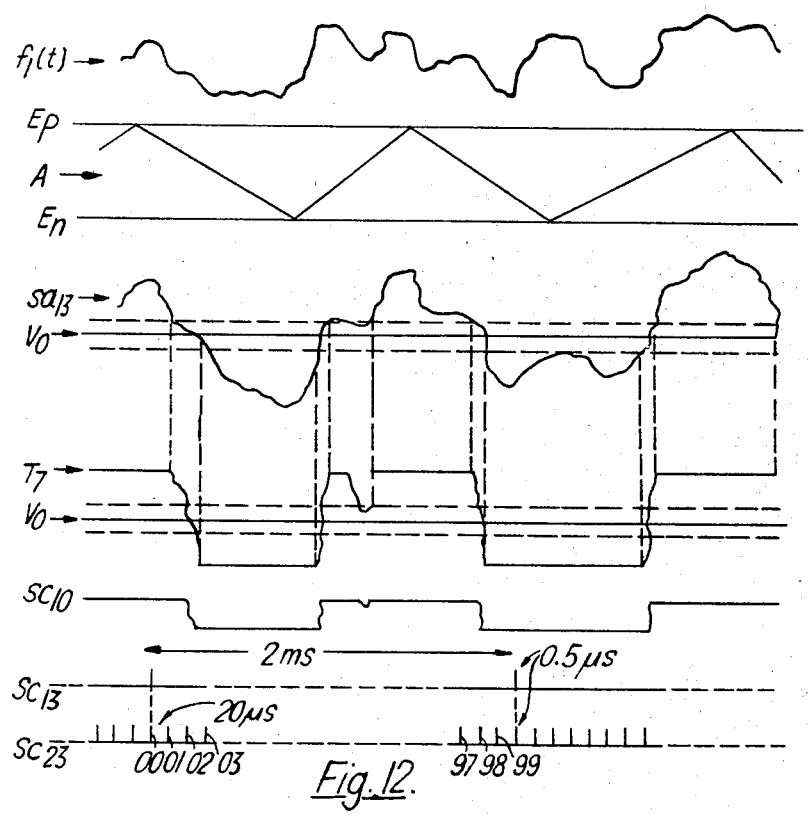
Figure 13:
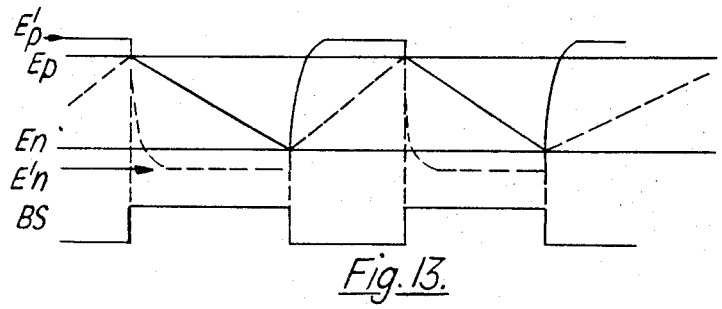
Figure 14:
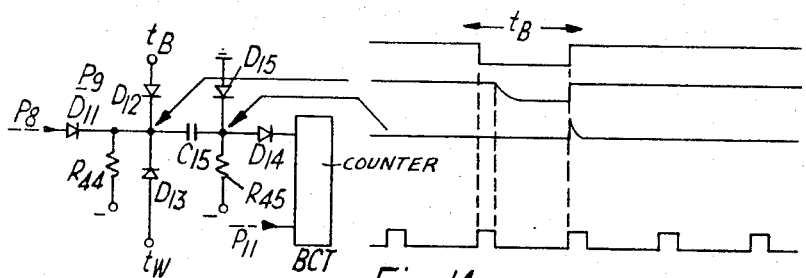
Figure 16:
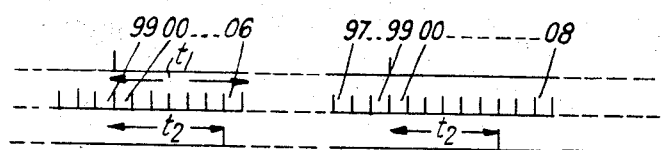
Figure 17:
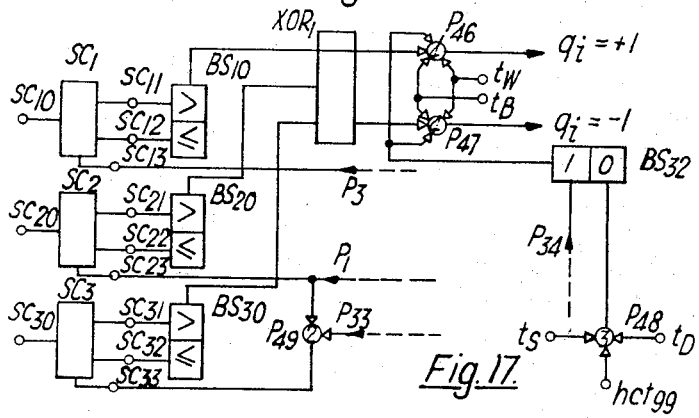
Figure 18:
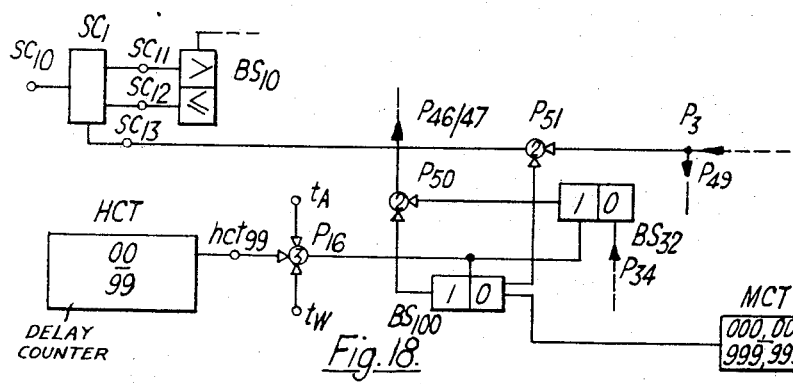
Figure 15:
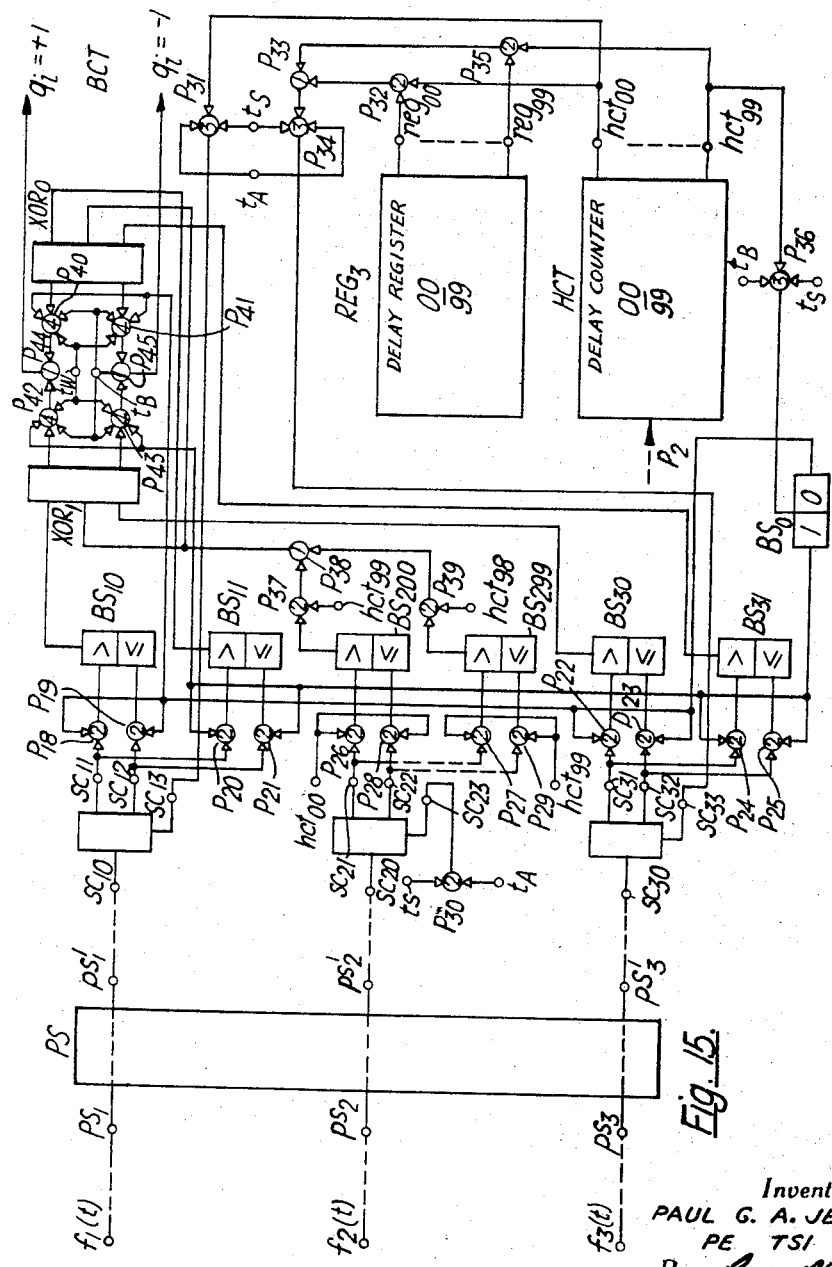
Figure 26:
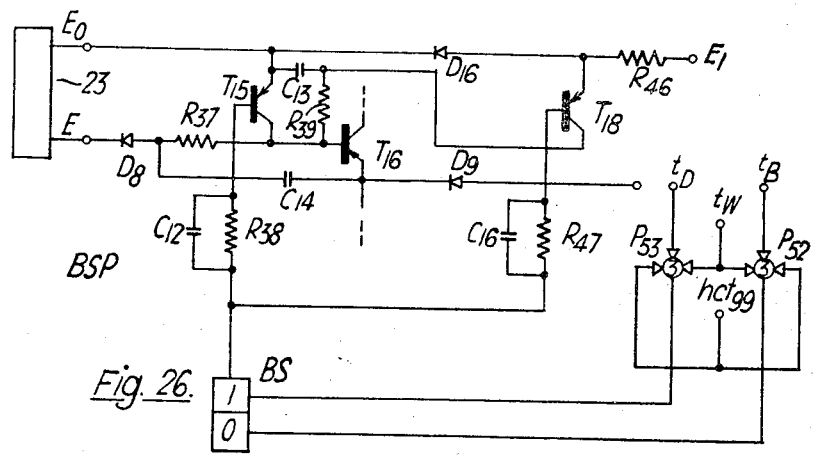
Figure 27:
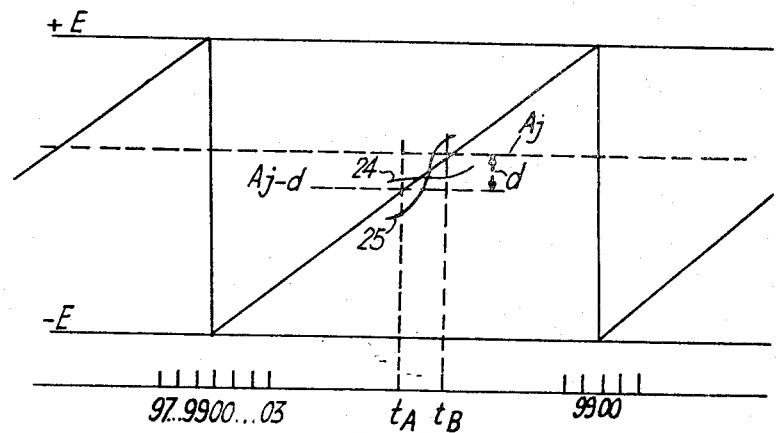

FIG. 1, a diagram of the variable level reference waveform with a random slope;

FIG. 2, a diagram in the form of a cube representing the distribution of the comparison results in order to calculate second order correlation functions;

FIG. 3, a block diagram of a logical circuit permitting to distribute the comparison results in two groups for the calculation of correlation functions of any order;

FIG. 4, a diagram representing the plot of a first order correlation function;

FIG. 5, a diagram representing a surface corresponding to a second order correlation function;

FIG. 6, a first part, in the form of a block diagram, of the correlator circuit in accordance with the invention and more particularly that part of the correlator permitting to derive and to staticize binary values following the sampling of the functions to be analyzed;

FIG. 7, a second part, as a block diagram, of the correlator circuits in accordance with the invention and more particularly those operating from binary signals received from the circuits of FIG. 6 and under the control of a control pulse system;

FIG. 8, the detailed circuit of an embodiment of the operational amplifiers of FIG. 6, using transistors;

FIG. 9, a detailed embodiment of one of the amplitude limiter circuits of FIG. 6, using transistors;

FIG. 10, one of the comparator means of the circuit of FIG. 6 represented in the form of the detailed circuit of a transistorized differential amplifier;

FIG. 11, the detailed circuit of a linear scanning generator using two transistorized bootstrap circuits to provide the reference waveform whose level varies linearly with a random slope between two extreme values;

FIG. 12, various waveforms present at different points of the circuits of FIG. 6;

FIG. 13, waveforms appearing in the circuit of the variable reference level generator detailed in FIG. 11;

FIG. 14, an embodiment of electronic gates such as P9 represented by a logical symbol in FIG. 7;

FIG. 15, a circuit representing certain modifications to be brought to the correlator whose circuits are represented in FIGS. 6 and 7 for the computation of correlation functions of higher orders and more particularly correlation functions of the second order;

FIG. 16, a diagram of the sampling pulses for the computation of second order correlation functions;

FIG. 17, modifications to be brought to the correlator whose circuits are represented in FIGS. 6 and 7 in order to adapt it to the computation of second order correlation functions with an automatic limitation in the choice of the correlation delays;

FIG. 18, a modification of the circuit of FIG. 17 permitting to compute second order correlation functions with correlation delay times higher than the maximum delay time normally used;

FIG. 19, a table of the various points of a second order correlation function which can be computed with the help of the circuits of FIGS. 6, 7 and 17;

FIG. 20, a table analogous to that of FIG. 19 for a second order correlation function derived from that corresponding to the table of FIG. 19;

FIG. 21, a table showing the transposition of the results of FIG. 20 in the table of FIG. 19;

FIG. 22, a table representing various points of a second order correlation function derived from that corresponding to the table of FIG. 19, points which are calculated with the help of the supplementary circuits of FIGS. 17 and 18;

FIG. 23, a diagram showing a surface comprising the various points of the second order correlation function corresponding to the table of FIG. 22;

FIG. 24, a transposition of the results represented in FIG. 23 in the plane corresponding to the second order correlation function whose points are represented by the table of FIG. 19;

FIG. 25, a diagram of the various points of the second order correlation function showing the distribution of the various computations;

FIG. 26, a fixed slope linear reference voltage generator with the fixed slope occupying practically all the scanning period and using one of the bootstrap circuits of FIG. 11;

FIG. 27, the waveform which can be generated by the circuit of FIG. 26; and

Figure 28:
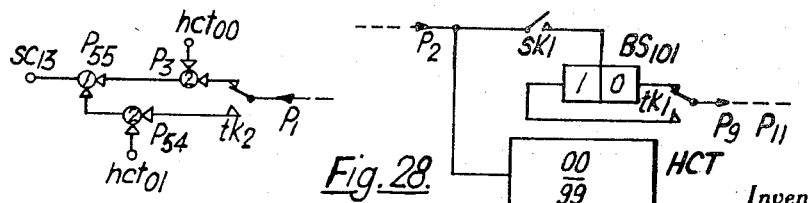

FIG. 28, modifications to be brought to the circuits of FIGS. 6 and 7 to enable ascertaining that random time function is stationary.

The average of a random variable may be expressed in function of the algebraical sum of binary values corresponding to two possible results of comparisons between this random variable and a reference level which also varies, preferably in a random manner, and more particularly a linearly varying reference level, the value of the slope being preferably a random variable. Each time that the function whose average must be computed as sampled, the variable reference level is also sampled and one or the other value is stored in an algebraic accumulator depending on whether the sample of the function whose average must be taken is either smaller than or equal to the level of the reference sample, or whether it is larger than the latter. It may be proved that the average of this function is directly proportional to the result stored in this accumulator after having taken a large number of N samples and by assuming that the two possible values are $+1$ and $-1$.

By referring to FIG. 1, the latter shows a sawtooth waveform 1 linearly varying between two extreme constant amplitude values $+E_p$ and $-E_n$ taken around a zero reference. Preferably these two amplitude values will be taken equal to E. As shown, the slope of the waveform whose sign is reversed after each scan has an absolute value which varies from one scan to the next and this variation occurs at random. If the intervals between successive passages of the waveform 1 through a predetermined amplitude such as zero are considered, it is clear that this time interval varies in a random manner in accordance with the random variations of the slope from one scan to the next. Thus, if a sample of a certain function (not represented in FIG. 1) should be taken each time that the sawtooth waveform 1 passes through an amplitude such as zero, the interval between adjacent samples of this waveform would have the required random character in order to ensure the statistical independence of sample of this function whether the latter contains periodical components or not. Thus, a random shift or time variation of the sampling is obtained.

On the other hand, if periodic sampling is used, it is clear that the instantaneous amplitude A of the sawtooth waveform 1 considered as a variable reference is not constant but varies in a random manner from one scan to the next. If it is assumed that the total sampling period is sufficiently large so that the total number N of the samples taken during this period is very high, the regularly spaced pulses and produced for instance at the times indicated by 2, 3 and 4 will correspond to distinct amplitudes or reference levels, indicated by 5, 6 and 7 respectively and whose average value of their total number S is such that it may be considered as equal to $N/M$ where M represents the total number of scans from one extreme value to the other or vice versa, such as 8, 9, 10 achieved by the waveform 1 during the total sampling period of the N successive samples.

Thus, the variable reference level constituted by the waveform 1 passing alternately from $+E$ to $-E$ and vice versa with a linear slope of random value can be considered as a random variable A expressed as a time series offering discontinuous variations. The sampling values of this random reference function will be the instantaneous levels $A_j$ from $-E$ to $+E$. With an average number S of distinct instantaneous reference levels, S being a sufficiently large number, the average discrete increment for the instantaneous reference level is thus equal to $2E/S = 2ME/N$.

Considering now that by means which will be described hereafter it is possible to produce an electrical waveform of the type shown in FIG. 1 with the random character required, one will be able to sample the function $f(t)$ to be analyzed or more precisely a voltage waveform corresponding to this function, and simultaneously the reference waveform with linear variations will each time be sampled. This implies of course, that the time function $f(t)$ is physically realizable and it will also be assumed that the function $f(t)$ whose average must be computed is limited between positive and negative values of equal amplitudes and not higher than the amplitude E which constitutes the upper and lower limit of the reference waveform 1 shown in FIG. 1. From a given instant, N regularly separated samples will be taken one from each waveform, and for each pair of samples a comparison will be made by means which will be described hereafter between the samples of $f(t)$ and $A_j$, the instantaneous level of the simultaneously sampled reference waveform 1. Two distinct values may be attributed to the result of these comparisons depending on whether the sample of the amplitude of $f(t)$ is either smaller than or equal to $A_j$, or higher than this value. If one value is normalized with respect to the other, unity may be assigned to the first binary result and the second binary result may be called $a$. After having performed N pairs of measurements, by sending each result $q_i$ in an algebraic accumulator, the latter will total $$Q = \sum_{i=1}^{N} q_i \qquad (2)$$

at the end of the computation period. If it is assumed that $a = -1$, the two possible values for $q_i$ are consequently $+1$ and $-1$ and the absolute value of the algebraic sum Q cannot exceed N.

It may be proved that the average of $f(t)$ can be expressed by $$\overline{f(t)} = EQ/N \qquad (3)$$

Hence, with the help of the variable reference level method it is possible to obtain the average of a stationary random input waveform $f(t)$ by a sum of N values each resulting out of the comparison of two samples, these values being equal to $+1$ or to $-1$. Such a method for computing the average offers the advantages that the quantization of the analyzed waveform sample consists in a simple comparison between the two values at the time of the sampling, this comparison giving a binary result. This avoids a measurement of the amplitude of the sample from the analyzed waveform and a quantization of this measurement by a number comprising several bits. Without sacrificing the precision of the measurement, a single bit may be used to represent the value of each sample of the waveform to be analyzed and no coding is necessary, only means enabling to perform the algebraic sum of the unitary results need be provided. Moreover, the proportion factor $E/N$ appearing in (3) may be chosen in such a way that the sum is a direct indication of the wanted average for the function $f(t)$.

It will be noted however that it is not absolutely essential to use the two values $+1$ and $-1$ for $q_i$ and in general if a normalized value $a$ is employed, with unity as other value, and if $Q_a$ defines the sum of the N samples by using the two values $+1$ and $+a$, and Q the same sum when the two values are $+1$ and $-1$, the following linear relation exists between Q and $Q_a$:

$$(1-a)Q = 2Q_a - (1+a)N \qquad (4)$$

Hence, if another value than $-1$ is used for $a$, it will always be possible to compute Q intervening in (3) with the help of (4). A value of $a = 0$ will permit to use an accumulator or counter which is displaced in one direction only since it will either receive a pulse as a result of the sampling or else it will not receive such a pulse, depending upon the binary result of the comparison.

If the stationary random function $f(t)$ previously defined is a continuous variable having a continuous range of values with a probability density $p(f)$, the time average of $f(t)$, the cumulative distribution function of $f(t)$, is consequently given by $$\overline{f(t)} = \lim_{T \to \infty} \frac{1}{2T} \int_{-T}^{T} f(t)dt = \int_{-\infty}^{\infty} fp(f)df \qquad (5)$$

It may also be proved that the cumulative distribution function of the average value $f(t)$ defined by (5) shall also be given by the expression (3) previously calculated.

It may yet be proved that the average of the product of two random time functions $f_1$ and $f_2$ can also be expressed in function of Q with a proportionality factor given by $$\overline{f_1(t)f_2(t)} = E_a E_b Q/N \qquad (6)$$

showing that this average of the product can thus be obtained by the comparison with reference levels with linear slopes having random values, these two variable reference levels, one for each of the functions $f_1$ and $f_2$ being statistically independent from one another and their limits being $\pm E_a$ and $\pm E_b$ respectively.

This result expressed by (6) is thus a generalization of the result expressed by (3) which gives the average of a time function by accumulating binary values. These results may be subject to a further generalization in the sense that the average of the product of any number $k$ of random time functions can be obtained by the same process consisting in making the sum of the unitary values of $q_i$ equal either to $+1$ or to $-1$ in accordance with the result of $k$ comparisons, one between each of $k$ random waveforms and one among $k$ random reference waveforms with a linearly variable level, these $k$ reference waveforms being statistically independent from one another. The average of the product of the $k$ functions will always be proportional to $Q/N$ as in (6), Q being defined by (2), and proportional to the product of the $k$ limiting voltages of the $k$ reference waveforms, i.e. $E_a$, $E_b$, ... $E_k$ $Q/N$ having always a value between $+1$ and $-1$.

As to the way in which the value of $q_i$ should be determined in case there are more than two input functions, it has already been indicated for the case of the average of the product of two functions that there was a unique manner of assigning one or the other binary value of $q_i$ in accordance with the results of the two comparisons between each random function and its associated reference waveform. This is generally true whatever be the number $k$ of input functions.

In deed, for each of the $k$ comparisons to play a significant role in the determination of the binary value $q_i$ it is necessary that for any set of $k$ comparisons results, a change of any one of these $k$ results should cause a change of the resultant binary value of $q_i$. Each set of results for $k$ comparisons may be considered as a binary number with $k$ bits. Hence, it is necessary that the $2^k$ possible binary numbers are divided into two groups of $2^{k-1}$ numbers, one group corresponding to a value such as $+1$ for $q_i$ and the other corresponding to a value such as $-1$ for $q_i$, and in such a manner that in changing any one of the $k$ digits from 0 to 1 or from 1 to 0, as the case may be, the modified number shall pertain to the other group characterized by the other binary value for $q_i$.

This can be ensured by associating in one group all the binary numbers having an even number of binary digits of one type, the other group being constituted by the remaining binary numbers, i.e. having an odd number of binary digits having the said value. In this way, any change in a digit shall necessarily produce a number pertaining to the other group.

FIG. 2 shows by way of example how the various possible results should be grouped in case there are three functions, i.e. when $k=3$, a cubic representation being used for the eight possible results. As shown by FIG. 2, each of the three coordinates corresponds to one of the three digits so that the eight binary numbers from 000 to 111 occupy the eight vertices of a cube which are divided as shown in two groups of four, distinguished by white or black circles used for the codes having an even or odd number of 1's respectively.

While this representation with three coordinates is particularly suited to three inputs, the separation into two groups in accordance with the same principles may be accomplished whatever the number of inputs depending upon the parity of the number of 1's comprised in each code characterizing the results of the various $k$ individual comparisons. For instance, if $k=4$, the $2^4=16$ codes, will be divided into two halves to determine the value of $q_i$ in the manner shown below.

| $q_i=+1$ | $q_i=-1$ |
|---|---|
| 0000 | 0001 |
| 0011 | 0010 |
| 0101 | 0100 |
| 0110 | 0111 |
| 1001 | 1000 |
| 1010 | 1011 |
| 1100 | 1101 |
| 1111 | 1110 |

$q_i=+1$ corresponds as shown above to an even number of 1's and $q_i=-1$ corresponds to an odd number of 1's.

FIG. 3 represents how the binary value of $q_i$ can be determined whatever be the number $k$ of input functions. It has been assumed that there are five functions but the generality of the system whatever be the value of $k$ will be readily appreciated. As represented the five input terminals at which an activating potential will appear are not depending upon the result of the corresponding comparison between the random time functions and the variable reference level foreseen for this variable, are grouped in pairs, one pair of such input terminals feeding a two-input/one-output logical circuit such as 11 and 12. The circuits 11 and 12 are both exclusive-OR gates which provide an activating output voltage only when one of their two inputs is activated, and which do not provide such an activated output when none of their two inputs is activated or when both are. Then, after this first stage of logical combinations of the various input terminals, the outputs from the first stage of exclusive-OR circuits, i.e. the outputs from 11 or from 12, will be combined in pairs in the same way. As soon as the number of outputs from one stage of exclusive OR gates is odd, any input or any output from a previous stage which had not been associated to an exclusive-OR gate in a preceding stage as it was the odd one out, is now paired with one of these outputs whose number is odd. In the present case with five input terminals and where the outputs from 11 and 12 constitute the inputs of an exclusive-OR gate 13, the fifth input terminal cannot be paired before the output of this second stage which contains only one exclusive-OR gate. The fifth input terminal together with the output of 13 will thus constitute the inputs of the last exclusive-OR gate 14 whose output will be activated each time that the number of the five input terminals which are activated is odd, i.e. in the sixteen cases where 1, 3 or 5 input terminals are activated. An activating signal at the output of 14 may thus indicate that $q_i$ is equal to $-1$ and by connecting this output terminal to a logical inverter 15, the output of the latter will thus be activated for the remaining 16 combinations of input conditions, to indicate that $q_i$ is equal to $+1$.

While this type of parallel logic will generally be preferable to determine the value of $q_i$, a serial logic using for instance scales-of-2 to determine the parity of the codes could also be used. Inverse logical circuits could eventually be used for the realization of the logical circuit of FIG. 3, i.e. all-or-none gates in the place of each exclusive-OR gate, the all-or-none gates thus producing an activating output signal only when the two inputs are simultaneously activated or when none of the two is. Particularly in the case of two inputs, a mixture of gates of both types may be used, the exclusive-OR gate producing the signal corresponding to $q_i=-1$, while the all-or-none gate produces the signal $q_i=+1$.

As is easily verified with the help of FIG. 3, the total number of gate circuits of the type indicated is equal to $k-1$.

Since a method has now been explained which will permit to calculate the average value of a random time function, or the average of the product of such functions, it becomes possible with the help of this method to compute correlation functions. Indeed, for the cross-correlation function $F_{12}(t_1)$ of the variables $f_1(t)$ and $f_2(t)$, it will suffice to sample $f_1$ and $f_2$ as well as their respective reference waveforms at instants which differ by a time $t_1$. The cross-correlation function $F_{12}$ will thus be calculated point by point for the different $n$ values of the correlation delay $t_1$, a series of N pairs of consecutive samples being taken for the computation of each of the $n$ points.

In the particular case where $f_2$ corresponds to $f_1$, the calculated function will be $F_{11}$: the autocorrelation function of $f_1$.

FIG. 4 represents by way of example the curve of a correlation function $F_{12}(t_1)$ expressed as ordinate in function of the correlation delay $t_1$ as abscissa, values of $t_1$ of like sign only having been represented. This curve indicated by 16 can be traced by any appropriate means in function of the computation of the various points of the curve such as 17, this number of points $n$ being for instance equal to 100.

The correlation functions not being necessarily restricted to one or two input functions, as indicated in relation to FIGS. 2 and 3, FIG. 5 represents by way of example a second order correlation function $F_{123}(t_1, t_2)$ which as indicated may be represented in three dimensions in the form of a correlation surface, the values of $F_{123}$ being measured perpendicularly to the plane defined by the axis $t_1$ and $t_2$. Thus, for a given value 18 of the first correlation delay $t_1$ between the input variables $f_2(t)$ and $f_1(t)$ and a particular value 19 of the second correlation delay $t_2$ corresponding for instance to the delay between the input variables $f_3(t)$ and $f_1(t)$, a point 20 having 18 as abscissa and 19 as ordinate is defined in the plane $t_1, t_2$. The length 20–21 perpendicular to this plane is equal to the function $F_{123}(t_1, t_2)$ corresponding to the particular values of these two delay times. This point 21, for one pair among 100 possible delay values along the two axis $t_1$ and $t_2$, will thus constitute one of the 100×100=10,000 points of the function $F_{123}$ defining the surface 22.

Hence, the method described to calculate averages of time variables and particularly random time variables or averages of the product of such variables is of general application, since it permits not only to compute correlation functions, but also other analogous functions as will be explained in more detail in the detailed description of the digital correlator using the method already described above. These other possibilities will in particular be the computation of the first order probability distribution function, the first order probability density and it will also be explained how the described correlator may be used for the repeated computation of the autocorrelation curve in order to verify that the random time variable possesses a stationary character.

By referring to FIGS. 6 and 7, the latter represent the general schematic of a digital correlator permitting in particular to compute ordinary crosscorrelation functions, i.e. crosscorrelation functions of the first order, the two random functions being presented to the correlator in the form of two electrical voltages $f_1(t)$ and $f_2(t)$ which are present at terminals $at_{11}$ and $at_{21}$ which represent the input terminals of two attenuators $AT_1$ and $AT_2$ respectively which are destined to match the amplitude of the two input voltages to values suited for the sampling of these two voltages following the method already explained. These attenuators may be of the type which is balanced with respect to ground and the attenuation range may for instance permit to handle random input voltages at terminals $at_{11}$ and $at_{21}$ varying between 0.5 and 200 volts.

These two attenuators are each followed by an impedance converter indicated by $IC_1$ and $IC_2$ respectively in FIG. 6 so as to raise the impedance level in such a way that $IC_1$ and $IC_2$ offer at their output, i.e. at the terminals $ic_{11}$ and $ic_{21}$, impedances which correspond for instance to 1 megohm in parallel with the reactance of a 47 picofarad capacitor.

On the other hand, the voltages with variable level A and B, i.e. whose value varies linearly between the two predetermined levels but with a random slope, are respectively produced by the white noise generators $RG_1$ and $RG_2$ which respectively control the linearly variable level generators indicated by $SG_1$ and $SG_2$ respectively and which will provide the sawtooth waveforms such as represented in FIG. 1 and whose linear slope is a random variable controlled by $RG_1$ or $RG_2$. These two waveforms present at terminals $sg_{11}$ and $sg_{21}$ are combined with the random waveforms to be measured and present at terminals $ic_{11}$ and $ic_{21}$ by means of a programme selector. This programme selector which will not be described here, comprises an interconnecting device or field PS permitting to modify the connections between the input waveforms and the actual correlator, in accordance with the various functions which one desires to obtain. In the present case it will be assumed as indicated in FIG. 6 that the programme selector is established so that the connections of PS enable the computations of the crosscorrelation function between the variables $f_1(t)$ and $f_2(t)$ present at the inputs of the attenuators $AT_1$ and $AT_2$. As indicated by the dotted line connections inside PS, the terminal $ic_{11}$ at which function $f_1(t)$ is present at a suitable level, is connected by the connection $ps_1$–$ps'_1$ of PS to one of the inputs $sa_{11}$ of an operational amplifier $SA_1$ while the terminal $sg_{11}$ at which is present the reference level A varying linearly between two predetermined voltages and with a random slope, is connected to the second input $sa_{12}$ of this operational amplifier by the connection $ps_3$–$ps'_2$ of PS. The function of this amplifier is to add the random waveforms $f_1(t)$ to the variable reference waveform A, which is equivalent to the subtraction of the reference waveform −A from the waveform $f_1(t)$ so, as to be able to compare these two waveforms with a fixed reference potential $V_0$ and determine if the sum of $f_1(t)$ and A is higher or lower than this fixed reference potential.

Likewise, the random variable $f_2(t)$ and the reference voltage B respectively present at terminals $ic_{21}$ and $sg_{21}$ are connected by the connections $ps_2$–$ps'_3$ and $ps_4$–$ps'_4$ of PS to the two input terminals $sa_{21}$ and $sa_{22}$ of an operational amplifier $SA_2$ identical to $SA_1$.

In order to increase the sensitivity of the comparison with the fixed reference voltage $V_0$, the output voltage from the operational amplifier $SA_1$ is sent into a limiter amplifier $CA_1$ which produces at its output an amplitude slice of the voltage which is centered around the reference voltage $V_0$ applied to this limiter amplifier which also permits to increase the voltage slice and in this way the sensitivity of the comparison.

The limiter amplifier output voltage is sent to the input terminal $sc_{10}$ of the actual comparator $SC_1$ which is fed by sampling pulses at its terminal $sc_{13}$ and which produces a trigger pulse at its output terminal $sc_{11}$ if the sum of the voltage $f_1(t)$ and of the reference voltage A is lower than the fixed reference voltage $V_0$, or alternatively a trigger pulse at its output terminal $sc_{12}$ if the sum of $f_1(t)$ and A gives a voltage which is higher than the reference voltage $V_0$.

The chain for the function $f_2(t)$ to be compared with the variable level reference voltage B is identical and it comprises after the operational amplifier $SA_2$, the limiter amplifier $CA_2$ following by a sampling comparator $SC_2$.

What precedes constitutes that part of the correlator circuit of FIGS. 6 and 7 which permits to convert the analogue signals into digital signals which will appear at terminals $sc_{11/12}$ and $sc_{21/22}$ in accordance with the result of the comparisons between the random waveforms $f_1(t)$ and $f_2(t)$ and their respective variable reference voltages A and B.

Before describing the remainder of the correlator circuit which is shown in FIG. 7 and which concerns only digital operations, some of the elements summarily described above will be described in more detail.

FIG. 8, represents the detailed circuit of an operational amplifier suitable for $SA_1$ (or $SA_2$) indicated by a block in FIG. 6. The two input terminals $sa_{11}$ and $sa_{12}$ are connected to the base of a first amplifying transistor $T_1$ by the resistors $R_1$ and $R'_1$, this amplifying transistor $T_1$ being followed by two other amplifying transistors $T_2$ and $T_3$ in cascade, all these PNP transistors being operated in common emitter fashion with the collector of $T_3$ returned to the base of $T_1$ through feedback resistor $R_2$, the three resistors $R_1$, $R'_1$ and $R_2$ being shunted by capacitors $C_1$, $C'_1$ and $C_2$ respectively. Transistor $T_1$ has its emitter connected to ground through resistor $R_3$ and its collector connected to a negative voltage source through resistor $R_4$, resistors $R_5/R_6$ and $R_7/R_8$ fulfilling analogous functions for the subsequent amplifying transistors $T_2$ and $T_3$. The base of $T_2$ is biassed by a resistor $R_9$, shunted by a capacitor $C_3$, whose other end is connected to the collector of $T_1$, an analogous combination $R_{10}C_4$ connecting the collector of $T_2$ to the base of $T_3$ while an analogous combination $R_{11}C_5$ constitutes a feedback path between the emitter of $T_3$ and the base of $T_2$. The base of $T_1$ is biassed by a resistor $R_{12}$ connecting it to the negative supply pole, while rectifiers $D_1$, $D_2$ and $D_3$ are respectively provided between the bases of $T_1$, $T_2$ and $T_3$ and a positive pole of the supply, these connections being foreseen so as to compensate the effects of the leakage collector current $I_{co}$ which tend to modify the base voltage in function of temperature variations. Since, as is shown by FIG. 8, the germanium diodes such as $D_1$ are reversely biassed, the reverse current will also be affected by the temperature and the residual current flowing through the resistances such as $R_{12}$ being the difference between the residual base current of $T_1$ and the inverse current passing through $D_1$, there will be a certain compensation of thermal effects.

So that the output of the DC amplifier comprising the transistors $T_1$, $T_2$ and $T_3$ should not be subjected to load variations able to entail distortion of the output voltage by saturation effects, FIG. 8 shows that the collector of $T_3$ is coupled to the output terminal by means of a double stage amplifier comprising transistors $T_4$ and $T_5$ both connected as emitter follower. This connection is performed for AC by means of capacitor $C_6$ connecting the collector of $T_3$ to the base of $T_4$ which is a PNP transistor whose collector is connected to the negative supply pole and the emitter to the positive pole by means of resistor $R_{13}$, the potentiometer formed by the resistors $R_{14}$ and $R_{15}$ connecting the negative to the positive supply pole enabling to bias the base of $T_4$. The emitter of $T_4$ is directly coupled to the base of the NPN transistor $T_5$ whose collector is directly connected to the positive pole while its emitter is connected to the negative pole through resistor $R_{16}$, this emitter constituting also the output terminal of the operational amplifier. The operational amplifier described with the help of FIG. 8 may permit a voltage gain of 1200 and be designed to produce this gain over a frequency range extending from 200 c.p.s. to 20 kc./s. The feedback resistor $R_2$ and the input resistors $R_1$ and $R'_1$ are relatively small compared to the input impedance of the actual amplifier. Such an amplifier may limit the error percentage to 0.2% for the analogue addition of the waveforms such as $f_1(t)$ and A.

FIG. 9 represents the limiter amplifier which can be used for $CA_1$ (or $CA_2$) in FIG. 6. It comprises a first amplifying PNP transistor $T_6$ whose base is fed by the input signal through a limiting network comprising the series resistors $R_{17}$ and $R_{18}$ between the input terminal and the base of $T_6$, their common point being connected to the comparison voltage $V_0$ through two diodes $D_4$, $D_5$ branched in parallel with opposite polarities. The voltage produced at the input of the limiting amplifier of FIG. 9, i.e., at the emitter of $T_5$ in the operational amplifier of FIG. 8, may be of the order of 4 volts and the two diodes $D_4$, $D_5$ branched in parallel will slice the input waveform around the reference potential $V_0$, equally limiting the positive and negative amplitudes of the signal to ±0.2 volt, voltage produced across rectifiers $D_4$ or $D_5$ when they are conductive. This sliced waveform is amplified by transistor $T_6$ whose base is biassed by the potentiometer comprising resistors $R_{19}$ and $R_{20}$ in series between the negative and the positive supply pole, and whose collector and emitter are respectively connected to the negative and positive poles by the resistances $R_{21}$ and $R_{22}$, the latter being shunted by capacitor $C_7$. This transistor $T_6$ operated in common emitter fashion feeds a transistor $T_7$ operated in like manner but which is of the NPN type, the resistors $R_{23}$, $R_{24}$ and the capacitor $C_8$ corresponding to $R_{21}$, $R_{22}$ and $C_7$ for the PNP transistor $T_6$. These two complementary transistors constitute a DC voltage amplifier permitting to provide at the collector of $T_7$ a voltage of the order of 4 volts which will again be sliced by an output voltage limiter comprising the series resistance $R_{25}$ connecting the collector of $T_7$ to the output terminal going to the actual comparison device, output terminal which is connected to the fixed reference voltage $V_0$ by a pair of shunt rectifiers $D_6$, $D_7$ analogous to $D_4$, $D_5$. Thus, the output voltage will finally be limited to ±0.2 volt around the fixed voltage $V_0$.

In this manner, the output voltage of the limiter amplifier $CA_1$ or $CA_2$ and whose circuit is represented in FIG. 9 is equal to 0.4 volt and thus represents with a tenfold magnification the portion of the input waveform applied to the circuit of FIG. 9 which extends between +0.02 volt and −0.02 volt around the fixed reference voltage $V_0$. Hence, only the interesting zone is used and the limiting amplifier of FIG. 9 permits to obtain an increase of the resolution power of the comparator device $SC_1$ or $SC_2$ which is essentially constituted by a differential amplifier.

FIG. 10 represents this comparator device which may be used for $SC_1$ (or $SC_2$) in FIG. 6 and which will permit to produce digital signals characterizing the sign of the difference between the random voltage $f_1(t)$ to be measured and its variable level reference voltage A. The output signal coming from the limiter amplifier of FIG. 9 is applied to the base (terminal $sc_{10}$) of a PNP transistor $T_8$ connected as emitter follower with its collector directly connected to the negative supply pole and its emitter connected to the positive pole through the resistor $R_{26}$, this transistor being used as buffer amplifier. Another exactly analogous buffer amplifier and comprising PNP transistor $T_9$ and the emitter resistor $R_{27}$ receives the fixed bias $V_0$ at its base in order to be able to compare the input waveform to the latter. In this manner, the eventual modifications in the characteristic of the buffer stages mutually compensates one another without affecting the result of the comparison between the useful part of the voltage $f_1(t) - A$ and the fixed reference voltage $V_0$.

In relation to the compenastion of the DC drift of the operational amplifier $SA_1$ (or $SA_2$) this amplifier may eventually be realized as a DC amplifier, i.e. without a capacitive coupling such as that constituted by the capacitor $C_6$ for the detailed circuit illustrated in FIG. 8. If such a DC operational amplifier is used, it will be possible to largely compensate its drift in what concerns the comparison to be effected by the circuit of FIG. 10 if the base of transistor $T_9$ (FIG. 10) is not fed directly by the reference voltage $V_0$, but by the output terminal of a limiter amplifier, with respect to this fixed reference potential $V_0$, and itself fed by an operational amplifier whose two inputs are short-circuited. In other words, the base of $T_9$ may be fed by the cascade combinations of the circuits of FIGS. 8 (modified into a DC amplifier) and 9, these circuits being absolutely identical to the circuits feeding the base of $T_8$, but for the operational amplifier (FIG. 8) destined to feed the base of $T_9$, the free ends of resistors $R_1$ and $R'_1$ shall be directly connected to ground, the output terminal of the limiter amplifier of FIG. 9 (junction point of $D_6$ and $D_7$) destined to bias transistor $T_9$ of FIG. 10 being directly connected to its base.

The signal representing the difference between the function $f_1(t)$ and the reference variable A or at least the critical portion of this difference around the fixed reference level $V_0$ and appearing at the emitter of $T_8$, is applied to the base of the NPN transistor $T_{10}$ constituting with the NPN transistor $T_{11}$ whose base is fed by the emitter of $T_9$, the first stage of a differential amplifier. The emitters of transistors $T_{10}$ and $T_{11}$ are directly connected to the terminals such as $sc_{13}$ or $sc_{23}$ depending on whether it concerns the comparator device $SC_1$ or $SC_2$ and to this terminal are applied narrow sampling pulses, in the negative direction, so as to render transistors $T_{10}$ and $T_{11}$ conductive. This negative current pulse applied to the emitters of $T_{10}$ and $T_{11}$ will tend to lower the collector potentials of these transistors, these collectors being connected to the positive pole through respective resistors $R_{28}$ and $R_{29}$. The potential drop at the collector of $T_{10}$ or $T_{11}$ will be the greater the more the signal at its base will be positive. These negative signals at the collectors of $T_{10}$ and $T_{11}$ produced by the sampling pulses applied to their emitter will be further differentiated by a second stage of the differential amplifier comprising the PNP transistors $T_{12}$ and $T_{13}$ whose bases are connected to the collectors of $T_{10}$ and $T_{11}$ through resistors $R_{30}$ and $R_{31}$ respectively, their emitters being connected to the positive pole by the common resistor $R_{32}$ while their collectors are connected to the negative pole by the respective individual resistors $R_{33}$ and $R_{34}$. This second stage of the differential amplifier will increase the discrimination, the more so since the collector of each of the transistors $T_{12}$ and $T_{13}$ is coupled to the base of the other transistor through the respective capacitors $C_9$ and $C_{10}$. In this way the preponderance of a negative signal at the collector of $T_{10}$ and sent to the base of $T_{12}$ will have for effect to produce a positive signal at the collector of $T_{12}$ which, applied by capacitor $C_9$, on the contrary opposes itself to the action of a residual negative signal at the collector of $T_{11}$. In this way, in accordance with the polarity of the voltage difference between the waveforms $f_1(t)+A$ on the one hand, and the fixed reference voltage $V_0$ on the other hand, the narrow sampling pulse applied to the emitters of $T_{10}$ and $T_{11}$ will produce a positive pulse at the collector of $T_{12}$ or of $T_{13}$ depending on whether the analogue sum $f_1(t)+A$ is lower or higher than the fixed reference voltage $V_0$. A pulse will thus appear either at terminal $sc_{11}$ or $sc_{12}$ depending upon the sign of the difference between $f_1(t)$ and $-A$ or between $f_2(t)$ and $-B$.

The sampling pulses applied to terminal $sc_{13}$ or $sc_{23}$ may be applied at different instants and this may be controlled following the pre-established programme in accordance with the nature of the function to be computed. In the present example, the computation of the crosscorrelation function $F_{12}(t_1)$ between $f_1(t)$ and $f_2(t)$ is assumed and hence, as it will be described hereinafter in more detail by referring to the logical digital circuit of FIG. 7, channel A, i.e. that corresponding to the reference waveform A, will be sampled by pulses having a recurrence period $n$ times that of the sampling pulses applied to channel B, $n$ representing the desired number of points for the crosscorrelation function. In this manner, waveform $f_1(t)+A$ may be sampled in channel A, waveform $f_2(t)+B$ may be successively sampled in channel B so as to produce samples coming from channels A and B which are separated by the different times separating the sampling of the two functions, i.e. 0, $t_0$, $2t_0$, $3t_0$, $4t_0$, ... $(n-t)t_0$, $t_0$ representing the delay increment and also the period of the sampling pulses for channel B, while $nt_0$ represents the sampling pulse period of channel A.

FIG. 12 represents various waveforms illustrating the operation of the elements such as $SA_1$, $CA_1$ and $SC_1$ detailed in FIGS. 8, 9 and 10 respectively.

The first waveform represents the random time function $f_1(t)$ which is applied to terminal $sa_{11}$ of $SA_1$ while the second waveform corresponds to the reference waveform A whose level varies linearly between the predetermined voltages $E_p$ and $E_n$ but with linear slopes which have a random value for each variation between the two extreme values $E_p$ and $E_n$, this waveform appearing at terminal $sa_{12}$.

The third waveform represents the analogue combination of these two waveforms and appearing at the output terminal $sa_{13}$ of the operational amplifier, this third waveform indicating also with dotted horizontal lines the reference levels of the input limiter of circuit $CA_1$ of FIG. 9, around the fixed reference potential $V_0$.

The fourth waveform represents the amplified signal appearing at the collector of $T_7$ (FIG. 9) and which is thus limited between voltages of the order of $\pm 2$ volts. This fourth waveform also represents by horizontal dotted lines the limiter levels, offered by the output limiter comprising diodes $D_6$ and $D_7$, again around the fixed reference potential $V_0$.

The output waveform which will be applied to the terminal such as $sc_{10}$ of the comparator comprising the differential amplifier and detailed in FIG. 10, will thus pass from the level of $+0.2$ volt to that of $-0.2$ volt as indicated by the fifth waveform.

The sixth waveform represents the sampling pulses which are applied at terminal $sc_{13}$ of the circuit $SC_1$ in channel A, while the last waveform indicates the sampling pulses which are applied at terminal $sc_{23}$ of circuit $SC_2$. As indicated, the pulses have a duration of the order of 0.5 microsecond, but while those applied to terminal $sc_{23}$ have a recurrence period of 20 microseconds, those which are applied to channel A, i.e., to terminal $sc_{13}$, have a period hundred times higher, i.e., of 2 milliseconds, a pulse at $sc_{13}$ coinciding only with one pulse among one hundred consecutive pulses applied to terminal $sc_{23}$.

FIG. 11 represents the variable reference level generator such as $SC_1$ or $SC_2$ of FIG. 6. These generators are fed by random noise sources such as white noise sources provided by generators $RG_1$ and $RG_2$ (FIG. 6) respectively and as shown by FIG. 11, the level generator controlled by this random noise source is constituted by two circuits BSP and BSN which are similar except for the fact that all the transistors (PNP) of circuit BSP and shown in detail in FIG. 11 have the inverse polarity (NPN) in the BSN circuit which is solely represented in the form of a block, and this change of polarity is also valid for the rectifiers included in BSP and also for the supply sources which pass from the positive to the negative and vice versa. Each of the circuits BSP and BSN is essentially constituted by a so-called bootstrap circuit which comprises as active element the PNP transistors $T_{15}$ and $T_{16}$, the bootstrap circuit being fed by a noise amplifier whose active element is the PNP transistor $T_{14}$ and an output potential of the bootstrap circuit included in BSP is also applied to a voltage level detecting device whose active element is the PNP transistor $T_{17}$.

The bootstrap circuit such as that of BSP comprising transistors $T_{15}$ and $T_{16}$ will permit to obtain voltages varying linearly in function of time as represented in FIG. 1 but for one sense of variation only, the other sense of variation being provided by the bootstrap circuit making part of the complementary network BSN. The two networks are associated by means of a bistable circuit BS and in a manner which will be described hereafter.

By assuming that the circuit of FIG. 11 represents the variable level generator $SG_1$ with random slope of FIG. 6, the noise generator $RG_1$ (FIG. 6) which feeds the input terminal $sg_{10}$ will see its noise voltage transmitted to the base of transistor $T_{14}$ by means of the capacitor $C_{11}$, this PNP transistor having its emitter connected to a positive voltage source through resistor $R_{35}$ and its collector directly connected to the negative supply pole to which is also connected the base of $T_{14}$ through a biassing resistor $R_{36}$. $E_{bn}$ is the amplified noise voltage which is applied to the collector of $T_{15}$ through the diode $D_8$ in series with resistor $R_{37}$ and this noise voltage will determine the negative slopes of the reference waveforms varying linearly between two predetermined levels and such as represented by the waveform 1 in FIG. 1.

Indeed, if it is assumed that the bistable circuit BS has just been placed in its 1 condition in a manner which will appear hereafter and that in this condition the output signal provided by BS is a high potential, e.g. 0 volt, if the extreme potentials of the circuit of FIG. 11 are 0 and $-6$ volts, the level rise at the output of BS (FIG. 13) which passes from $-6$ volts to 0 volt for instance will be transmitted to the base of $T_{15}$ through capacitor $C_{12}$ shunted by resistor $R_{38}$ which will entail the blocking of transistor $T_{15}$ whose emitter is connected to a fixed potential point $E'_p$ which may for instance be the highest supply potential, i.e. 0 volt. The bootstrap circuit capacitor and which will be charged linearly so as to produce the negative slopes of the FIG. 1 waveform is capacitor $C_{13}$ which is branched between the emitter and collector of $T_{15}$ in series with resistor $R_{39}$. If it is assumed that at the moment when bistable circuit BS is triggered into its 1 condition, thereby blocking transistor $T_{15}$, capacitor $C_{13}$ is at this moment discharged, this discharge having been accomplished through the emitter-collector path of $T_{15}$ in series with $R_{39}$, the blocking of $T_{15}$ will initiate a new charge of $C_{13}$ and the charge current will be determined by the instantaneous voltage present at the emitter of $T_{14}$ and by the resistance in series with capacitor $C_{13}$. If it is assumed that the forward resistance of $D_8$ and that of $R_{39}$ are small with respect to the resistance of $R_{37}$ and by assuming on the other hand that $E'_p$ is equal to 0 volt, it will be the negative noise voltage $E_{bn}$ instantaneously present at the emitter of $T_{14}$ which will thus determine a charge current equal to $E_{bn}/R_{37}$.

This initial charge current at the moment when $T_{15}$ is blocked will begin to charge capacitor $C_{13}$ whose potential at the plate which is not directly connected to $E'_p$ will become negative and this lowering of potential will be transmitted to the base of transistor $T_{16}$ through resistor $R_{39}$. This transistor $T_{16}$ whose collector is directly connected to the negative pole of the supply operates as emitter follower, its emitter being connected to the positive pole through resistor $R_{40}$ and in the manner conventional for a bootstrap circuit, it acts as buffer amplifier presenting an input impedance which can be considered as substantially infinite by the rest of the circuit and an output impedance which can be considered as practically nil, this for a unitary voltage gain. The input voltage variation at the base of $T_{16}$ will be integrally found as output voltage at the emitter and it is returned to the end of resistor $R_{37}$ distant from the collector of $T_{15}$ through capacitor $C_{14}$ whose capacity is sufficiently high so that the transmission of the voltage variation can be considered as instantaneous. Hence, if one may assume that transistor $T_{16}$ does not load the charge circuit of capacitor $C_{13}$ and that on the other hand any voltage variation on capacitor $C_{13}$, i.e. any voltage variation at the end of resistor $R_{37}$ which is directly connected to the collector of $T_{15}$ and to the base of $T_{16}$, is instantaneously translated into an identical voltage variation at the other end of this resistor $R_{37}$, the current in the latter remains constant. The current flowing in $R_{39}$ and $C_{13}$ is also constant and remains equal to its initial value $E_{bn}/R_{36}$. From the blocking of $T_{15}$, the rise of this current produces a potential drop across resistor $R_{39}$ and the negative pulse transmitted by $T_{16}$ and $C_{14}$ to the anode of diode $D_8$ will immediately entail the blocking of the latter, the charge circuit of $C_{13}$ being practically instantaneously isolated from the noise source amplified by $T_{14}$ and of which an instantaneous random value $E_{bn}$ will have served to determine the constant charge current of $C_{13}$ and in this way the slope of the negative voltage variation at the plate of $C_{13}$ which is not directly connected to $E'_p$. This linearly decreasing voltage variation across capacitor $C_{13}$ appears at the emitter of $T_{16}$ and also at the output terminal to which it is transmitted through diode $D_9$ biassed as indicated. This diode $D_9$ is conductive during this linear descent since the potential at the output of BS is high and it is connected to the output of $sg_{11}$ common to BSP and to BSN, by means of resistor $R_{41}$.

During this linear descent, the high potential at the 1 output of BS being also applied in the circuit BSN to a transistor (not shown) corresponding to $T_{15}$ in BSP but which is of the NPN type and whose emitter is biassed to a negative voltage $E'_n$ (not shown in FIG. 11), this high potential will have for effect to render the NPN transistor corresponding to $T_{15}$ conductive in such a way that the BSN capacitor corresponding to $C_{13}$ is discharged through a resistor corresponding to $R_{39}$. As the latter has a relatively small value, the discharge of this capacitor corresponding to $C_{13}$ is rapid, and more rapid particularly than the linear descent of the voltage at the emitter of $T_{16}$. Hence, the voltage at the emitter of the corresponding transistor in BSN being more negative, the BSN diode corresponding to $D_9$, and whose cathode is connected to the anode of the latter due to the polarity inversion of the circuit BSN with respect to the circuit BSP, is blocked during the whole of the linear descent of the output voltage.

When the voltage at the emitter of $T_{16}$ reaches a value near a threshold voltage $E_n$ which biasses the emitter of the PNP transistor $T_{17}$, diode $D_{10}$ whose cathode is connected to the emitter of $T_{16}$ and whose anode is connected to the base of $T_{17}$ which is also connected to the positive supply pole by resistor $R_{42}$ will become conductive like transistor $T_{17}$ which will produce a positive trigger pulse at its collector connected to the negative supply pole through resistor $R_{43}$. This trigger pulse will be used to trigger bistable circuit BS into its 0 condition. This will entail the passage of the output voltage from BS which is used to control the transistor such as $T_{15}$ to a more negative value rendering the PNP transistor $T_{15}$ conductive. On the other hand, the corresponding NPN transistor in BSP will be blocked. From this instant, the capacitor in BSN corresponding to $C_{13}$ in BSP and which has been discharged to the level of its reference potential $E'_n$ will receive a constant charge current whose amplitude will depend on the instantaneous noise voltage present at the emitter of the NPN transistor in BSN and corresponding to $T_{14}$. This current will permit a sudden voltage rise at the terminals of the BSN capacitor corresponding to $C_{13}$ in BSP in such a manner as to reach the voltage $E_n$ which is at that moment the output voltage from the reference voltage generator of FIG. 11 with linear variations.

FIG. 13 represents the waveforms appearing at the emitters of transistor $T_{16}$ in BSP and of the corresponding NPN transistor in BSN. The waveform at the emitter of $T_{16}$ is indicated with full lines while that of the emitter at the complementary transistor is indicated in dotted lines. From the passage of bistable BS to the 0 condition, the output waveform of this bistable indicated below the voltage variations at the emitters of the transistors such as $T_{16}$ will entail the rapid discharge of capacitor $C_{13}$ and the linear charge of the corresponding capacitor in BSN with a voltage increase which will progressively pass from $E_n$, the minimum value, to $E_p$, the maximum value. When the control voltage at the output of BS passes to its low value, diode $D_9$ becomes blocked while the corresponding diode in BSN becomes conductive allowing the positive linear voltage variation at the output of the circuit of FIG. 11. Only the linear variations between $E_n$ and $E_p$, positive and negative, are thus transmitted to the output of the variable reference voltage generator circuit. At the transition times, small voltage peaks corresponding to the vertical parts between $E_p$ and $E'_p$ and between $E_n$ and $E'_n$ (FIG. 13) may reach the output but these variations corresponding to the transition and to the reversal of the state of conductivity of the diodes such as $D_9$ are very rapid (1 microsecond at most) for linear variations with a duration varying in a random manner and for instance of the order of 2 milliseconds and for a sampling period at the minimum equal to 20 microseconds, in such a way that their elimination does not set a problem.

If desired, the output voltages can be adjusted by deriving the voltages not through the amplifier comprising the transistor such as $T_{16}$ which creates the action essential to the bootstrap circuit but with the help of a separate unitary voltage gain amplifier whose input will be branched on a tapping point of resistor $R_{39}$.

The passage from a positive slope to a negative slope and vice versa may be performed with the help of any appropriate threshold detector. For instance, it will be possible to replace the simple threshold detecting transistor $T_{17}$ by a more complex arrangement using a blocking oscillator to cause the triggering of BS.

It is thus seen that the circuit of FIG. 11 permits to create the reference waveform with linear variation between two predetermined voltages $E_p$ and $E_n$, these variations alternately changing direction and having a random slope.

FIG. 7 represents the whole of the digital part of the correlator and destined to cooperate with the input circuits of FIG. 6. As previously described, these circuits permit to deliver a pulse to one or the other of two output points such as $sc_{11}$ or $sc_{12}$ depending on whether the random input function such as $f_1$ is larger or alternatively equal or smaller than a reference voltage whose level varies linearly with a random slope between two predetermined limits, i.e. the variable such as A. The same result is also obtained for the variables $f_2$ and B and produces the appearance of a pulse either at terminal $sc_{21}$ or at terminal $sc_{22}$.

These four terminals have also been reproduced in FIG. 7 where it is seen that they constitute the inputs of staticizing bistables, $BS_1$ for terminals $sc_{11/2}$ and $BS_2$ for the terminals $sc_{21/2}$. In this way, if a pulse occurs at terminal $sc_{11}$, $BS_1$ will be placed into its condition $f_1 > A$, the condition $f_1 \leq A$ being obtained for a pulse appearing at $sc_{12}$ and analogous conditions being obtained for $BS_2$ in relation to the appearance of a pulse at one of the two terminals $sc_{21/2}$.

These pulses will appear in synchronism with the sampling pulses appearing at terminals $sc_{13}$ or $sc_{23}$, terminals which are also reproduced in FIG. 7.

A pilot pulse generator (not shown) is provided to produce pulses $t_W$, $t_S$, $t_L$ and $t_T$ waveforms of which are indicated at the bottom of FIG. 7 to the right of the terminals. The $t_W$ pulses are positive, have a duration of about 1 microsecond and as indicated have a period of 5 microseconds. They are used in particular to produce various phases of logical operations by sending them in a counter-of-4 FCT serving as pulse distributor and producing four series of output pulses at the terminals indicated by $t_A$, $t_B$, $t_C$ and $t_D$, the corresponding pulse waveforms represented at the level of these terminals each having a duration of 5 microseconds and a period of $4 \times 5 = 20$ microseconds but being phase shifted in time so as to define four distinct phases.

It is during the second phase, i.e. that defined by $t_B$ that the sampling pulses for the $A(SC_1)$ and $B(SC_2)$ channels are produced. As indicated in FIG. 7, a narrow sampling pulse $t_S$ synchronized with the $t_W$ pulses but having a substantially shorter duration, of the order of one half microsecond and of negative polarity is conditioned by a gate $P_1$. The various gates represented, in particular in FIG. 7, by circles are either OR gates or AND gates depending on whether digit 1 or a higher digit corresponding to the number of inputs of the gate is inscribed inside the circle. The 2 inscribed in the circle of gate $P_1$ thus indicates that it concerns an AND gate associating the pulses $t_S$ with the pulses $t_B$ of the second phase to produce a narrow and negative sampling pulse located at the beginning of this phase and appearing at terminals $sc_{23}$ for the sampling of the B channel of FIG. 6 which will thus lead to the appearance of a corresponding pulse at one of the inputs of bistable $BS_2$ and this every 20 microseconds.

The $t_W$ pulses are admitted through the AND gate $P_2$ through the delay counter HCT and this under the control of the $t_D$ pulses defining the fourth phase. During this phase of 5 microseconds, the HCT circuit which is a counter able to occupy 100 positions from 00 to 99 will be advanced by one step and this counter will thus perform a complete cycle through all its 100 positions at the end of a delay of $100 \times 0.02 = 2$ milliseconds.

While the distributor or counter FCT can be realized by four bistables coupled at the end of one another to permit a cyclic operation, the delay counter HCT able to define 100 phases of 20 microseconds in a period of 2 milliseconds, will preferably be realized by two series of four bistables, each of these four bistables permitting by a coding arrangement to define 10 states and one cycle of the first unitary series of four bistables producing a carry signal towards the second series of four bistables defining the tens digit so as to modify the latter by one unit. Such circuits are classical and will not be described here in more detail. As indicated in FIG. 7, two particular states among the 100 possible ones of the delay counter HCT are signalled to certain other circuits by the appearance of a signal on the corresponding terminal such as $hct_{00}$ at which a signal of 20 microseconds will appear every two milliseconds during the time that HCT is in its 00 condition. This signal will authorize the AND gate $P_3$ for the admission of the pulse appearing at terminal $sc_{23}$, towards terminal $sc_{13}$.

Channel A will thus be sampled only once every two milliseconds, i.e., once for 100 samples of channel B. This corresponds to the fact that the $n = 100$ points of the correlation function are computed in parallel by the circuits of FIGS. 6 and 7. During each period of two milliseconds thus corresponding to one sample for each of the 100 points of the curve, channels A and B are sampled once simultaneously during the interval of 20 microseconds corresponding to state 00 of the delay counter HCT, i.e., to a correlation delay equal to 0 for the correlation function. During the following interval of 20 microseconds, channel A will not be sampled by a pulse at terminal $sc_{13}$ and the preceding sample is kept in memory by the bistable $BS_1$ but channel B will again be sampled, the result of this sample being stored in bistable $BS_2$. For the states of the delay counter HCT going from 02 to 99, the operations will occur as during the time of 20 microseconds corresponding to state 01 and it will only be upon a new 00 state of HCT, that bistable $BS_1$ will store the result of a new sample of channel A. During 100 successive intervals of 20 microseconds, the same condition of $BS_1$ will thus be compared to that of $BS_2$ which will change every 20 microseconds so as to determine a value of $q_i$ for each of the 100 points of the correlation function.

Contrary to the embodiment of FIG. 3 using exclusive OR gates controlled by single binary signals, in FIG. 7 the determination of $q_i$ is performed starting from a complementary representation of the binary results of the two comparisons of channels A and B, that is to say that the two complementary outputs from the bistables $BS_1$ and $BS_2$ are used to control four AND gates $P_4/P_7$ whose outputs are respectively activated when the states $$f_1 > A \text{ and } f_2 > B$$
$$f_1 < A \text{ and } f_2 < B$$
$$f_1 > A \text{ and } f_2 < B$$
$$f_1 < A \text{ and } f_2 > B$$

are present. In the first two cases, a signal at the output of $P_4$ or $P_5$ passes through the OR gate $P_8$ to control the AND gate $P_9$, while in the other two cases a signal at the output of $P_6$ or of $P_7$ traverses the OR gate $P_{10}$ to authorize the AND gate $P_{11}$. The gates $P_9$ and $P_{11}$ are both controlled by the pulses $t_W$ and $t_B$ in such a way that during the second phase of 5 microseconds out of each period of 20 microseconds the $t_W$ pulse will pass through $P_9$ or $P_{11}$ to produce a pulse corresponding to the value of $q_i$. As indicated in FIG. 7, a pulse at the output of $P_9$ corresponds to a value $+1$ for $q_i$, while a pulse at the output of $P_{11}$ corresponds to a value $-1$.

As indicated, the outputs from $P_9$ and $P_{11}$ feed a third counter BCT which serves to store the precedingly computed value of a particular point among the 100 points of the correlation function and to modify this value either by the addition of $+1$ or by the addition of $-1$. If for each of the $n$ points of the correlation function it is desired to take N pairs of samples, that is to say that the function $f_1$ and the function $f_2$ are each sampled N times, counter BCT should thus be able to characterize N distinct conditions, e.g., $N = 10^6$ as the maximum possible value.

As for the counter HCT, the counter BCT will preferably be realized as a decimal counter with coding by four binary digits of each decimal digit but in the form of a reversible counter. In this way, BCT will comprise 6×4=24 bistables plus an additional bistable to indicate if BCT records a positive or negative value thus 25 bistables altogether since BCT may be brought to record any number from −999,999 to +999,999.

Here BCT must be a reversible counter and such counters particularly binary counters are well known. Preferably however, BCT will be realized as a parallel counter, i.e., the outputs from $P_9$ and from $P_{11}$ may feed all the inputs of the 25 bistable circuits of BCT in parallel through gates authorizing the application of pulse $t_W$ present at the output of $P_9$ or at the output of $P_{11}$ to the different bistable circuits of BCT and particularly to those whose condition must be modified so that BCT will record a new number of six decimal digits either higher or lower by one unit than the preceding one. For instance, if four bistables characterizing a decimal digit inscribed in BCT are in the condition 0111 corresponding to the decimal digit 7 in the ordinary binary code and that a pulse coming from $P_9$ is received, it will be directed towards four inputs of these four bistable circuits in such a manner that they take the condition 1000 and this under the control of the 0111 state of these four bistables upon receipt of this pulse corresponding to +1. Moreover, if the four bistables characterizing a decimal digit are in the condition 1001 corresponding to the decimal digit 9, the +1 pulse coming from $P_9$ will be authorized by these four bistables to drive the four bistables characterizing the higher order decimal digit so as to add one unit thereto by modification of the condition of these four bistables.

On the other hand, since a reversible counter is considered, gates must also be foreseen at each input of the bistables of BCT to conditionally admit a pulse appearing at the output of the gate $P_{11}$ and corresponding to the subtraction of one unit from the value previously registered. For instance, if the condition of a set of four bistables identifying a decimal digit of BCT is 1000, the pulse coming from $P_{11}$ will be conditioned by the outputs of these four bistables to modify their state in such a manner that they register 0111. If a set of four bistables is in the condition 0000, the pulse coming from $P_{11}$ will cause condition 1001 while the set of four bistables identifying the decimal digit of immediately higher order will also receive a pulse coming from $P_{11}$ to diminish the decimal digit by one unit.

The twenty-fifth bistable of BCT is used as polarity unit to indicate if the value expressed by the six sets of four bistables must be read as a positive or negative value. Initially this polarity indicating bistable will be set into the + condition in which it will remain as long as the number of pulses received from $P_{11}$ has not exceeded that received from $P_9$. When this will occur, the six sets of four bistables will all be in the condition 0000 and this condition will be used to allow the passage of the pulse from $P_{11}$ towards the − input of the polarity indicating bistable which will thus be triggered into this − condition, the six other sets of four bistables each passing to the condition 1001 to indicate the number 999,999 following the subtraction of one unit. When the polarity bistable is in its − condition, the negative number really registered by BCT is thus equal to the number read upon the bistables of BCT characterizing the decimal digits, from which $10^6$ is subtracted. When the registered number is 999,999 and a pulse is received from $P_9$, the six sets of four bistables each in the condition 1001 will authorize the admission of this pulse to the + input of the polarity bistable in such a manner as to trigger it from its − to its + condition.

The result counter BCT whose operation has just been described is associated with a buffer memory MS which permits the parallel computation of the $n$ points of the curve representing the correlation or similar function. Every 20 microseconds the memory provides the value previously accumulated for a particular point of the curve to the bistables of BCT which thus also function as staticizing devices for this memory MS. A unit is added to or subtracted from this result previously accumulated and temporarily stored in BCT and then the algebraic sum so modified is reinscribed in the corresponding case of the buffer memory MS. At the following time of 20 microseconds, another partial result corresponding to another point of the curve is extracted from MS to be staticized and modified in BCT before being reinscribed in MS, these operations occurring cyclically for all the $n$ points of the curve, this cycle thus having a duration of 2 milliseconds, when one hundred points are computed and when the time available for each point is 20 microseconds.

The buffer memory MS is a coordinate memory comprising 25 columns $c_{00/24}$ and 100 rows $r_{00/99}$, only the first and last rows and columns being indicated on the drawing. This coordinate memory must thus contain 25×100=2500 binary digits and can be embodied in a ferrite memory where the state of saturation of the magnetic cores indicate the value of the binary digit corresponding to a core or to a pair of cores.

The sequential access switch SAS is used for the reading of MS and it permits in particular to direct a reading pulse $t_L$ on one of the rows of MS so as to read the 25 bits word corresponding to this row. This reading pulse $t_L$ is authorized by the phase pulse $t_A$ in the AND gate $P_{12}$ in such a way that the latter provides a positive pulse such as indicated in FIG. 7 next to terminal $t_L$ on the conductor feeding the sequential access circuit SAS through the OR gate $P_{15}$ which will direct this positive reading pulse to one of the $r_{00/99}$ rows depending upon the condition of the pulse counter HCT. Indeed each delay corresponds to one of the points of the correlation curve, i.e. to one of the rows of the memory MS. Means are foreseen in the delay counter HCT to derive control potentials permitting to direct the pulse at the output of $P_{15}$, for instance towards row $r_{00}$ with the help of the authorization symbolically represented by the AND gate $P_{00}$ controlled from two conductors coming from HCT. This delay counter using two sets of four bistables may thus be foreseen with decoding means so as to provide a control potential to a particular tens conductor and a particular units conductor to authorize the passage of the reading pulse through a gate such as $P_{00}$ among 100 analogous gates each going towards a distinct row of MS.

This read pulse $t_L$ will produce a pulse combination on the 25 column conductors in accordance with the binary code registered in the $r_{00}$ row, pulses which will reach the 1 inputs of the 25 bistables of BCT eventually by means of column amplifiers. By assuming that these 25 bistables of BCT are initially in their 0 condition, they will thus reproduce the six digit number plus the sign previously registered in MS at the time when the pulse $t_W$ will sample the gates $P_9$ and $P_{11}$ during the second phase $t_B$ of 5 microseconds which immediately follows the first phase in which the read pulse is located.

The sampling of the $P_9$ and $P_{11}$ gates and the staticizing of the various partial results contained in MS and representing the $n=100$ points of the curve, occur thus in synchronism and in a continuous way.

FIG. 11 represents a way to realize the gates such as $P_9$ and $P_{11}$.

It is seen that the AND gate $P_9$ has three inputs corresponding to the output from $P_8$ (FIG. 7), to the $t_W$ pulse and to the phase pulse $t_B$, each of these pulses reaching the output of the $P_9$ gate by means of a diode $D_{11}$, $D_{12}$ and $D_{13}$ respectively whose cathodes are connected towards the output of $P_9$ and also to a negative voltage through resistor $R_{44}$. As long as one of the three input potentials feeding one of the three diodes is high, this high potential is found back at the junction of $D_{11/13}$, the corresponding diode being conductive. As the $t_B$ pulse is a negative pulse, before this pulse is offered, the potential feeding diode $D_{12}$ is high and this potential is found back at the cathode of this diode. At the beginning of the negative $t_B$ pulse, diode $D_{12}$ is blocked but diode $D_{13}$ becomes conductive following the appearance of the positive pulse $t_W$. It will only be at the moment of disappearance of this positive $t_W$ pulse that diode $D_{13}$ will also be blocked and hence, with the potential at the output of $P_8$ being also a negative potential for $q_1=+1$, the three diodes will then be blocked creating a negative pulse at their junction point.

This junction point of $D_{11/13}$ is connected by a series capacitor $C_{15}$ and a series diode $D_{14}$ to the input of counter BCT corresponding to the output from gate $P_9$, the junction point of $C_{15}$ and of $D_{14}$ being on the one hand biased to the high potential represented by ground through diode $D_{15}$ and on the other hand to the negative potential through resistor $R_{45}$. The right hand plate of $C_{15}$ is normally maintained at ground potential, diode $D_{15}$ being conductive, and as long as a ground potential appears through one of the diodes $D_{11/13}$, $C_{15}$ is discharged. From the end of the positive $t_W$ pulse, during the second $t_B$ phase the capacitor $C_{15}$ will begin to charge through resistor $R_{44}$, the potential of its left hand plate tending towards the minus potential. At the end of the second phase $t_B$, the ground potential will suddenly reappear at the junction point of the diodes $D_{11/13}$ and the positive pulse transmitted through $C_{15}$ will go through the rectifier $D_{14}$, $D_{15}$ being at this moment blocked, to appear as trigger pulse in the reversible counter BCT and to be exploited in the manner previously described. Should $P_8$ have provided a high potential, i.e., ground, $C_{15}$ would not have been changed in the direction explained and the end of the $t_B$ pulse would not have created a pulse having a sufficiently high level to drive BCT through $D_{14}$.

At the beginning of the third phase $t_C$, counter BCT has thus taken its new state in function of the pulse present at the output of $P_9$ or $P_{11}$ and this third pulse of 5 microseconds is used for the writing operation into the memory with the help of a half negative write pulse $t_I$ which authorized during phase $t_C$ by AND gate $P_{13}$ will be sent on the one hand to BCT to exploit the output conditions of the 25 bistables and produce half column pulses which will be sent to the memory MS through individual write amplifiers, and on the other hand a half-row pulse which will reach $r_{00}$ through $P_{15}$ and $P_{00}$. In the classical manner, the coincidence of the half-write pulses will cause the storage in $r_{00}$ of the binary word newly staticized in BCT following the pulse received from $P_9$ or $P_{11}$.

The negative write pulses $t_I$ having transmitted the new result corresponding to a point of the correlation curve into the memory MS and more particularly into the $r_{00}$ row, the result staticized by BCT may be erased during the fourth phase of 5 microseconds with the help of a $t_R$ pulse (not represented) authorized by the AND gate $P_{14}$ and which will return the 25 bistables to BCT to their zero condition, ready to receive a new number coming from the following row $r_{01}$ of MS during the next staticizing time of 20 microseconds.

The delay counter HCT which is advanced by one position by the $t_W$ pulses during the phase $t_D$, will produce a 20 microseconds signal at its output terminal $hct_{99}$ each time it is in its condition 99. This signal authorizes the AND gate $P_{16}$ which is also fed by the $t_W$ and $t_B$ pulses in such a way that during the second phase of 5 microseconds, a trigger pulse will be sent every one hundred delay positions, i.e. every 2 milliseconds, to the input of the sample counter MCT. This sample counter will permit to determine the number N, i.e. the number of pairs of samples of the wave forms $f_1$ and $f_2$ which must be taken so as to determine the $n$ different points of the correlation curve. This number N may be equal to $10^6$ but one may also work on smaller values of N, e.g. $10^5$ or $10^4$.

This counter or the N samples may be realized in the same way as the counter included in BCT since it has the same capacity, but for MCT this is however only an ordinary counter working only in one direction and at a rhythm which is a hundred times less fast, i.e. one pulse every 2 milliseconds. Thus this counter could also comprise six series of 4 bistables to indicate the six possible decimal digits. Means are provided in the counter to recognize the last position of MCT, for instance 999,999 and to provide at that moment an indication that the computation of the correlation function is terminated. If this computation may be made with a more reduced number N of samples, e.g. $10^5$ or $10^4$, counter MCT may be conditioned to detect the numbers 99,999 or 9,999 respectively and produce an end of computation signal at this moment. The MCT terminals marked by $10^6$, $10^5$ and $10^4$ identify the terminals to which such a conditioning signal may be applied.

Although the circuits of FIGS. 6 and 7 have been described in relation to the computation of a curve representing a crosscorrelation function $F_{12}(t_1)$ between two random functions $f_1(t)$ and $f_2(t)$, the circuits are adaptable to other computations of time average values and this provided simple adjustments or certain modifications of the circuits are made.

With the help of FIG. 3 it has already been described how the computation method could be adapted to correlation functions of a higher order than the first, i.e. in general to correlation functions with more than two random variables. The computer of FIGS. 6 and 7 is adapted to the computation of correlation functions of higher order provided a limited number of modifications are introduced.

FIG. 15 schematically represents the modifications which must be brought to the circuit of FIGS. 6 and 7 to permit computations on more than two functions or time variables and more precisely on three functions $f_1(t)$, $f_2(t)$, $f_3(t)$.

By considering the circuit of FIG. 15 it is seen that it comprises three input waveform variables proportional to the functions or time variables $f_1(t)$, $f_2(t)$ and $f_3(t)$ whose crosscorrelation function $F_{123}(t_1, t_2)$ must be computed with the help of the system already described in relation to FIGS. 6 and 7 and to which the modifications to be brought to enable the computation of correlation functions of the second order are incorporated in FIG. 15.

The voltage representing each of the three variables feeds a chain analogous to those shown in FIG. 6 to reach an interconnecting panel PS provided with input terminals $ps_{1/3}$ and with output terminals $ps'_{1/3}$, only the terminals associated to the functions $f_{1/3}$ being represented, those associated to the reference waveforms being not represented in FIG. 15. It should be assumed that three reference level generators this time are foreseen and connected as in FIG. 6 to associate in an operational amplifier such as $SA_1$ (FIG. 6) each waveform representing a function and its reference waveform. As indicated in dotted lines in FIG. 15, the input terminal $ps_1$ is connected to the output terminal $ps'_1$ and so on, the three output terminals $ps'_{1/3}$ respectively feeding chains analogous to those shown in FIG. 6 to reach the input terminal such as $sc_{10}$ of the comparator devices $SC_{1/3}$ each provided with two output terminals $SC_{11/12}$ and of a sampling terminal $sc_{13}$ for the comparator circuit $SC_1$. As in FIG. 6, a sampling pulse at the terminal such as $sc_{13}$ will produce a pulse at one of the output terminals $sc_{11/12}$ and the pulse produced is sent into a bistable device such as $BS_{10}$ which will staticize the result of the comparison between the waveform corresponding to the function $f_1(t)$ and its variable level reference waveform.

However, FIG. 15 indicates that the sampling pulse does not directly reach the bistable such as $BS_{10}$, but passes through an AND gate such as $P_{18}$ in the case where the sampling pulse appears at output terminal $sc_{11}$ indicating that the variable $f_1(t)$ is higher than the instantaneous reference level. FIG. 15 indicates that the output terminal $sc_{11}$ is also connected in parallel to an AND gate $P_{20}$ which conditions the entrance towards one of the inputs of a bistable $BS_{11}$ having an analogous function to that of $BS_{10}$, the other two inputs of the bistables $BS_{10/11}$ being fed from the output terminal $sc_{12}$ through the AND gates $P_{19}$ and $P_{21}$.

During a series of $n=100$ sampling intervals, i.e. during the total time of 2 milliseconds, it is gates $P_{18/19}$ which are authorized while during the following series of $n$ sampling pulses, the gates $P_{20/21}$ will permit staticizing the sampling pulse of the function $f_1(t)$ into the bistables $BS_{11}$ and so on.

As indicated in FIG. 15, this is obtained with the help of a bistable $BS_0$ operating at a scale-of-two and which, when it is in its 0 state, authorizes the unblocking of the gates $P_{18/19}$ to enable the flow of the sampling pulse. When the bistable $BS_0$ operating as a scale-of-two will be in its second position, i.e., state 1, the two other gates $P_{20/21}$ will then be open. FIG. 15 indicates that an analogous control is exerted for staticizing the sampling pulses coming from the comparator circuit $SC_3$ in the chain corresponding to the function $f_3(t)$. In this way, the bistables $BS_{30/31}$ and the AND gates $P_{22/25}$ play an analogous role for $f_3(t)$ to that of $BS_{10/11}$ and $P_{18/21}$ with respect to function $f_1(t)$.

On the other hand, for the second variable $f_2(t)$ analogous gates are foreseen at the outputs $sc_{21}$ and $sc_{22}$ but on each of these two outputs are branched $n$ AND gates, i.e., 100 gates of which only the first and the hundredth pair have been indicated in FIG. 15, i.e., $P_{26/27}$ for the output terminal $sc_{21}$ and $P_{28/29}$ for output terminal $sc_{22}$. As indicated, the outputs of these gates are connected to the inputs of a corresponding number of bistables, i.e., 100 bistables of which only the first, $BS_{200}$ and the hundredth $BS_{299}$, have been indicated in FIG. 15.

These various steerings of the samples obtained for the three functions can be explained by considering FIG. 16 which schematically represents the sampling pulses necessary for the computation of a second order correlation function $F_{123}(t_1,t_2)$. As in the case of the circuits of FIGS. 6 and 7, there is a sampling pulse every 100 periods of 20 microseconds, i.e., every 2 milliseconds, for the first function $f_1$ and a sampling pulse every 20 microseconds for the function $f_2$, these sampling pulses being indicated by the first two waveforms of FIG. 16. The third waveform indicates a sampling pulse for the third function $f_3$ and these pulses are also produced at the rhythm of one every 2 milliseconds but they can occupy various positions shifted with respect to the sampling pulses for function $f_1$. As indicated in FIG. 16, the sampling pulses for $f_3$ are shifted by a correlation time $t_2$ with respect to the sampling pulses for $f_1$.

If the two correlation times $t_1$ and $t_2$ which intervene in a correlation function of the second order are measured, with respect to the same reference, i.e., the instant at which function $f_1$ is sampled, as long as $t_1$ which represents the delay of the sampling pulse for $f_2$ with respect to that for $f_1$ is lower than $t_2$ representing the delay of the sampling pulse for $f_3$ with respect to that for $f_1$, following the method explained in relation to the circuits in FIGS. 6 and 7, it would not be possible to determine a value serving to compute one of the points of the correlation function since one of the samples, i.e., that of the third function $f_3$, is not yet available. As indicated in FIG. 16, sets of three samples for the functions $f_1$, $f_2$, $f_3$, are only available at the moment when delay $t_1$ is at least equal to delay $t_2$.

This limitation in the determination of the second order correlation function is eliminated in accordance with FIG. 15 by putting into memory not only the sample of function $f_1$ which was already done for the circuits of FIGS. 6 and 7, but also the samples of function $f_2$ as well as that for function $f_3$. By duplicating the staticizing bistables for the functions $f_1$ and $f_3$ and by providing $n$ staticizing bistables for the function $f_2$ which is continuously sampled at each basic interval of 20 microseconds, the circuit of FIG. 15 permits to delay the logical evaluation of the sets of three samples until the last sampling time, i.e., the hundredth indicated by 99 in FIG. 16, the first sampling time being numbered 00 following the numbering already adopted for the delay counter HCT of FIG. 7 defining the hundred successive delay times of 20 microseconds.

In FIG. 15, the sampling instants occur during the first phase of 5 microseconds corresponding to pulse $f_A$ of FIG. 7, the narrow pulse $t_S$ being again used as the actual sampling pulse during this phase $t_A$ of each sampling period of 20 microseconds. This is indicated in FIG. 15 by the AND gate $P_{30}$ which sends the sampling pulse $t_S$ every 20 microseconds on terminal $sc_{23}$ to sample the result of the comparison of function $f_2$ with its variable level reference waveform. The pulses $t_S$ admitted during phase $t_A$ are also applied for the sampling of $f_1$ and $f_3$ but selectively, that is to say that for $f_1$, as in the arrangement of FIG. 7, it is only during the delay time 00 defined by the appearance of a pulse at terminal $hct_{00}$ of delay counter HCT that the sampling of $f_1$ will be permitted with the help of the AND gate $P_{31}$ of FIG. 15 which sends the sampling pulses on terminal $sc_{13}$.

For function $f_3$, the sampling is also selective but the delay time is determined by a delay register $REG_3$ which is a device able to occupy one hundred distinct conditions and which may be realized for instance, as the delay counter HCT, by two binary counters associated in cascade, each comprising four bistables and permitting to register two decimal digits. However, this delay register $REG_3$ for the sampling of function $f_3$ can use means distinct from those employed for HCT since this delay registered by $REG_3$ and defining time $t_2$ (FIG. 16) will not vary during a time which can be appreciable for electronic equipment since it will correspond to N samples for a series of $n$ points of the correlation surface defined by the second order correlation function $F_{123}(t_1, t_2)$. In other words, the computations accomplished by the circuits of FIGS. 6 and 7 in the case of an ordinary correlation function must be repeated for each value of $t_2$ (FIG. 16) in the case of the computation of a second order correlation function with the help of the circuits of FIGS. 6 and 7 modified by the adjunction of those of FIG. 15.

After each computation for a given value of $t_2$, the hundred results stored in MS will be discharged towards any output device (not shown), such as a printer for instance, and the memory MS becomes available for the computation of the following series of hundred points corresponding to a new value of $t_2$.

The delay register $REG_3$ can thus be an electromechanical counter or even a simple selective interconnecting device with manual control permitting to apply an authorization voltage at one particular terminal among a hundred output terminals whose first $reg_{00}$ and last $reg_{99}$ only have been represented in FIG. 15. As indicated by the latter, if $REG_3$ records the delay time 00, i.e. if $t_2$ is equal to 0, the authorizing potential stands on terminal $reg_{00}$ and at the moment when the delay counter HCT produces the 20 microseconds pulse at terminal $hct_{00}$, the latter will go through the AND gate $P_{32}$, the mixer $P_{33}$ and the AND gate $P_{34}$ controlled by the pulses $t_A$ and $t_S$ in the same way as $P_{31}$ in such a manner that only during this delay time will a sampling pulse reach terminal $sc_{33}$ to express in a digital way on bistable $BS_{30}$ or $BS_{31}$ the result of the comparison of the function $f_3$ with its variable level reference waveform.

After the determination of a first series of $n=100$ points of the crosscorrelation function, it will thus be possible to modify the state of $REG_3$ to the next value, e.g. manually, so as to compute a new series of hundred points of the function for a value of $t_2$ equal to a delay unit of 20 microseconds, then two units, and so on until an authorization appears at terminal $reg_{99}$ to unblock the AND gate $P_{35}$ whose other input is connected to terminal $hct_{99}$ and thus produce the last series of N sets of three samples with a delay time $t_2$ equal to the maximum value of 99 units of 20 microseconds. The mixer $P_{33}$ thus concentrates all the outputs of the gates such as $P_{32}$ and $P_{35}$ activated by a pair of terminals from HCT and REG having the same rank.

The sampling of the three functions occurring during phase $t_A$, one may use phase $t_B$ to trigger the control bistable $BS_0$ with the help of a narrow pulse $t_S$ admitted through gate $P_{36}$ during the last delay time 99 defined by the appearance of an authorizing pulse at terminal $hct_{99}$. During this last delay time of the total period between two sampling pulses of $f_1$, the bistable $BS_0$ operating at a scale-of-2, will thus be triggered from one condition to the other. This means that if it has been assumed it was in condition 0 having permitted the entrance of the samples from $f_1$ and $f_3$ into $BS_{10}$ and $BS_{30}$, the reverse $a_1$ of $BS_0$ to condition 1 will, during the next period of 2 milliseconds, send the samples of $f_1$ and $f_3$ into $BS_{11}$ and $BS_{31}$. On the other hand, the fact that $BS_0$ is now in condition 1 will permit to exploit the various samples collected during the preceding 2 milliseconds period and this at the rhythm of one exploitation every 20 millimicroseconds. In other words, the duplication of the staticizing devices for $f_1$ and $f_3$ and the use of one hundred staticizing devices, one for each of the samples from $f_2$, permit to shift the exploitation of the samples by a period of 2 milliseconds, with the advantage that all possible values of $t_1$ can be calculated and particularly those lower than $t_2$.

During the delay time 99, the 20 microseconds pulse at terminal $hct_{99}$, will authorize gate $P_{37}$ controlled by an output of bistable $BS_{200}$ to transmit the state of this bistable by means of the OR gate $P_{38}$ towards the sample logical exploitation circuits $XOR_{0/1}$. This mixer $P_{38}$ unites the outputs of the gates such as $P_{37}$ associated to an output of bistable $BS_{200}$, a hundred gates thus being foreseen, the last represented in FIG. 15 being $P_{39}$ associated to $BS_{299}$ and controlled by the delay pulse appearing at terminal $hct_{98}$.

The sample of $f_2$ admitted during the first delay time 00 into $BS_{200}$ by the gate $P_{26}$ controlled by $hct_{00}$ thus becomes ready for exploitation 99 delay times afterwards with the help of gate $P_{37}$ controlled by the pulse at terminal $hct_{99}$. This being true for all the 100 bistables $BS_{200..299}$, by exploiting the bits staticized in these bistables after 99 delay times, after 100 delay times each bistable is again available to register a new sample of function $f_2$ and a continuous sampling but whose exploitation is delayed by about 2 milliseconds is thus ensured.

The logical circuits $XOR_{0/1}$ are identical and can be realized in the manner described in relation to FIG. 3 in such a way as to combine the eight possible results of each set of three samples in two groups of four results, the first entailing the value $q_1=+1$ and the second entailing the result $q_1=-1$. The two circuits $XOR_0$ and $XOR_1$ are controlled by the output from $P_{38}$ but while $XOR_1$ is additionally controlled by the outputs from $BS_{10}$ and $BS_{30}$, the two other inputs of $XOR_0$ are constituted by the outputs from $BS_{11}$ and $BS_{31}$. Each of these two logical circuits thus continuously exploits the signal combinations present at their respective inputs to produce an authorizing signal on one of their two outputs, that is to say that $XOR_0$ continuously authorizes either the AND gate $P_{40}$, or the AND gate $P_{41}$ and $XOR_1$ the AND gate $P_{42}$ or the AND gate $P_{43}$ and this in accordance with the logic explained in relation with FIGS. 2 and 3. These four gates $P_{40/43}$ are all fed by the pulses $t_B$ and $t_W$ and they are thus analogous to gates $P_9$ and $P_{11}$ of FIG. 7 whose details are represented in FIG. 14. But in addition, gates $P_{40/41}$ are only authorized when $BS_0$ is in its 0 condition, while $P_{42/43}$ are only authorized when $BS_0$ is in its condition 1. One only out of the four gates will thus be able to create a trigger pulse at its output at the end of the $t_B$ phase for each 20 microseconds delay time.

At the end of the first period of 2 milliseconds considered, and from the delay time 99, the outputs from $XOR_1$ will be exploited to produce trigger pulses sent either to the OR gate $P_{44}$ uniting the outputs of gates $P_{40}$ and $P_{42}$, or to the OR gate $P_{45}$ uniting the outputs from gates $P_{41}$ and $P_{43}$ so as to send a pulse on one of the two drive wires of the reversible counter BCT of FIG. 7 corresponding to the value $+1$ or $-1$ characterizing the result of the multiple sampling. In this way, during the second period of 2 milliseconds characterized by the fact that $BS_0$ is in its condition 1, the samples stored during the preceding period are successively exploited while the new samples from $f_1$ and $f_3$ will be admitted into the bistables $BS_{11}$ and $BS_{31}$ and that the continuous series of samples from $f_2$ will still be distributed towards the bistables $BS_{200/299}$. During the following period of 2 milliseconds $BS_0$ will return to its 0 condition which will authorize the exploitation of the results provided by the outputs of the logical circuit $XOR_0$. The exploitation of the samples is thus a continuous operation without limitation as to the value of the delays $t_1$ with respect to the delay $t_2$. It will be noted that there is now a shift of one unit between the delay time defined by HCT and corresponding to the address of the buffer memory MS (FIG. 7) on the one hand, and the effective exploitation of the samples on the other since during the delay time 99 the samples corresponding to time 00 for function $f_2$ are in fact exploited. The row $r_{00}$ of MS will thus contain the result of $t_1=t_0$, $r_{01}$ that of $t_1=2t_0$, $r_{02}$ that of $t_1=3t_0$ and so on until $r_{99}$ containing the result of $t_1=0$, $t_0$ being the unitary correlation delay of 20 microseconds.

The arrangement of FIG. 15 can be readily generalized for the computation of correlation functions of any order since it will suffice to add for each function the equipment foreseen for function $f_3$, i.e. the chain leading to the sampling produced by the comparator $SC_3$ associated to the bistables $BS_{30}$ and $BS_{31}$, as well as the delay register $REG_3$. Each of these delay registers such as $REG_3$, will authorize the sampling of the corresponding function at a given time corresponding to $t_2$, $t_3$, etc. and the circuit of FIG. 15 will permit to store the samples for any values of the first delay time $t_1$, between the sampling of the function $f_2$ and that of the reference function $f_1$, with respect to the other delay times $t_2$, $t_3$, etc., respectively, between the other functions $f_3$, $f_4$, etc. on the one hand and the reference function $f_1$ on the other hand, whatever be the values of these times $t_2$, $t_3$, etc.

Until now, neither for the circuits of FIGS. 6 and 7 permitting to compute ordinary correlation functions, neither for the circuits comprising the supplementary equipment of FIG. 15, have correlation delay times such as $t_1$ for the circuits of FIGS. 6 and 7 been envisaged whose sign may differ. Indeed, by the nature of the circuits of FIGS. 6 and 7, the sampling of the function $f_2$ always occurs either simultaneously with that of function $f_1$, or after the sampling of the latter, i.e. $t_1$ always remains positive. The circuits of FIGS. 6 and 7 thus do not apparently permit the computation of the correlation function for negative values of $t_1$ and one could envisage a system with memory storage analogous to that described in relation to FIG. 15 so as to store the samples of function $f_2$ taken before a sampling of $f_1$ every 100 periods of 20 microseconds, and to begin the exploitation of these previous samples of the function $f_2$ from the moment when $f_1$ has been sampled following the 100 samples of $f_2$.

It is seen however that this entails complications with respect to the circuits of FIGS. 6 and 7 which are characterized by an extreme simplicity and to compute the correlation functions for negative values of $t_1$, one may simply use the circuits of FIGS. 6 and 7 by interchanging the connections of the functions $f_1(t)$ and $f_2(t)$ with the help of the interconnecting device PS of FIG. 6. Indeed, if one replaces the connections between the input and the output terminals $ps_1$ and $ps'_1$ on the one hand and between the input and the output terminal $ps_2$ and $ps'_3$ on the other by connections between $ps_1$ and $ps'_3$ on the one hand and between $ps_2$ and $ps'_1$ on the other, the functions $f_1$ and $f_2$ will have been effectively interchanged. The variable reference levels applied to the input terminals $ps_3$ and $ps_4$ and respectively transmitted to the output terminals $ps'_2$ and $ps'_4$ must not be interchanged since two random functions serving for the comparison are concerned. In this way, after this modification of the interconnections of PS it will be possible to compute the correlation function $F_{21}(t_1)$. But this last function may be written $$F_{21}(t_1)=F_{12}(-t_1) \qquad (7)$$

since a correlation delay $t_1$ between a sampling of function $f_1$ with respect to a sampling of the function $f_2$ corresponds to a delay of $-t_1$ between a sampling of the function $f_2$ and that of function $f_1$. In this way, the computation of the correlation function $F_{21}$ with the help of the circuits of FIGS. 6 and 7, and thus always for positive values of $t_1$, will in fact permit the determination of the correlation function $F_{12}$ for the negative value of $t_1$, this with the help of the same circuits.

Analogous relations to those which precede may also be established in the case of correlation functions of the second and higher order, and for the second order correlation function one may in particular write $$\begin{aligned}F_{123}(t_1, t_2) &= F_{231}(t_2-t_1, -t_1)\\ &=F_{312}(-t_2, t_1-t_2)\\ &=F_{132}(t_2, t_1) \qquad (8)\\ &=F_{321}(t_1-t_2, -t_2)\\ &=F_{213}(-t_1, t_2-t_1)\end{aligned}$$

The relations which precede establish equivalences between the $3!=6$ possible correlation functions in the case of second order correlation functions. These equivalences are easily verified. For example for the first, expressing $F_{123}$ in function of $F_{231}$, since the function $f_2$ becomes the reference function for the correlation function $F_{231}$, the first of the two delays of this function is that between the sampling of $f_3$ and the sampling $f_2$. But the function $F_{123}$ defines $t_1$ as the delay between the samples of $f_2$ and $f_1$, and $t_2$ as the delay between the samples of $f_3$ and $f_1$. In this way, the first delay for $F_{231}$ is indeed $t_2-t_1$. The second delay of $F_{231}$ corresponds to the delay between the sampling of $f_1$ and that of $f_2$, and that between the sampling of $f_2$ and that of $f_1$ being defined by $t_1$, the second delay for $F_{231}$ is indeed $-t_1$. The other equivalences are verified in the same way.

The exchanges between the functions $f_1$, $f_2$ and $f_3$ with the help of the interconnecting device PS of FIG. 15, will permit to compute the second order correlation function for values of $t_1$ and $t_2$ which may not only be both positive, but also negative, either one or the other, or both. But moreover, the relations which precede also permit to get away from the limitation normally imposed on $t_1$, the delay time of the waveform $f_2$ which is continuously sampled, limitation which normally demands that $t_1$ be equal or greater than $t_2$. The additional storing circuits of FIG. 15 and particularly the duplication of the bistables $BS_{10}$ and $BS_{30}$ as well as the multiplication by hundred of the staticizing device necessary for the function $f_2$ can be eliminated by computing other cross-correlation functions such as $F_{231}$.

It is not necessary to eliminate all the supplementary storage devices of FIG. 15, and in fact their presence will permit to compute all the points of the function for all possible positive values of the correlation delay $t_1$ and $t_2$. In their absence, this will not be the case and it will only be possible to compute $n(n+1)/2$, i.e. roughly half the $n^2$ possible points, assuming that $n$ values are envisaged both for $t_1$ and for $t_2$, since the values of $t_1$ are limited to values equal or larger than those of $t_2$. In practice, this limitation will entail a loss of efficiency from the time point of view, since unless the circuits are again complicated, a period of 2 milliseconds covering 100 possible values for $t_1$ will be reserved, although for each of these periods of 2 milliseconds, only part of this period will be effectively used, that for values of $t_1$ at least equal to the value of $t_2$ inscribed in $REG_3$. In other words, the computation time will remain the same although only half of the $n^2$ possible points will have been calculated after having sampled for all the $n$ possible values of $t_2$.

FIG. 17 shows however, that at the cost of this 50% diminution in the efficiency in what concerns the computation time, extremely simple circuits may be used which apart from the delay register $REG_3$ and the chain corresponding to the function $F_3$, a staticizing bistable $BS_{30}$ included, hardly necessitate more equipment than what is shown in FIGS. 6 and 7 for the computation of ordinary correlation functions.

If one limits oneself to values of $t_1$ at least equal to those of $t_2$ (FIG. 16), it suffices to staticize the results of the sampling of $f_1$, $f_2$ and $f_3$ respectively in the bistables $BS_{10}$, $BS_{20}$ (which is thus the only one necessary for $f_2$ instead of 100 foreseen in FIG. 15) and $BS_{30}$, and to provide a single logical circuit $XOR_1$ conceived in accordance with the explanations given in relation to FIG. 3, logical circuit for which the exploitation of the outputs shall only be authorized upon $t_1$ being at least equal to $t_2$.

An automatic control of the exploitation of the results provided by the logical circuit $XOR_1$ is obtained with the help of the bistable $BS_{32}$ of FIG. 17 which authorizes the AND gates $P_{46}$ and $P_{47}$ at the outputs of the logical circuit $XOR_1$ only when $BS_{32}$ is in its condition 1. These gates $P_{46/47}$ are analogous to the gates $P_9$ and $P_{11}$ of FIG. 7 and thus permit to exploit the authorization potential present at one of the outputs of the logical circuit $XOR_1$ with the help of the pulses $t_W$ and $t_B$ defining the second phase of 5 microseconds. As indicated in FIG. 7, as long as $BS_{32}$ is in its 0 condition, the results corresponding to the various points of the correlation function for a particular value of the delay $t_2$ and stored in the buffer memory MS, are successively staticized in the reversible counter BCT during a corresponding period of 20 microseconds, but they are reinscribed in the memory MS without having been modified by the addition or the subtraction of one unit, since neither $P_{46}$ nor $P_{47}$ allow the passage of a pulse. But when gate $P_{36}$ (FIG. 15) will provide a pulse $t_S$, the latter will indicate that the delay $t_1$ reaches the value $t_2$ and this pulse $t_S$ coming from $P_{34}$ can as indicated in FIG. 17, trigger $BS_{32}$ into its condition 1 to authorize the passage of the pulses characterizing the value $+1$ or $-1$ for $q_j$. From this delay time $f_1$ equal to $t_2$, the results previously stored in the memory MS and staticized in the reversible counter BCT will be modified in accordance with the results of the new samples and this until the last delay time characterized by the appearance of a 20 microseconds pulse at the terminal $hct_{99}$ of the delay counter. As indicated in FIG. 17, this pulse will authorize the passage through the AND gate $P_{48}$ of a narrow $t_s$ pulse during a fourth phase $t_D$ of this last delay time. This trigger pulse at the output of $P_{48}$ will reset the authorization bistable $BS_{32}$ into its condition 0 so as to prevent, during the following period of 2 milliseconds, the exploitation of the results until $t_1$ reaches the value of $t_2$.

The AND gate $P_{49}$ (FIG. 17) receives the sampling pulses coming from $P_1$ (FIG. 7) but these are authorized to reach the terminal $sc_{33}$ for the sampling of the function $f_3$ and the staticizing of the result into $BS_{30}$ only when the mixer $P_{33}$ (FIG. 15) provides a 20 microseconds pulse, i.e. during the delay time corresponding to that recorded in $REG_3$. The sampling pulses provided by $P_1$ and $P_3$ (FIG. 7) are respectively sent to the terminals $sc_{23}$ and $sc_{13}$ for the sampling of $f_2$ and $f_1$ and the staticizing of the corresponding results in $BS_{20}$ and $BS_{10}$.

The circuit of FIG. 17 to be used in cooperation with those of FIGS. 6 and 7 and also some of the elements of FIG. 15 and in particular the delay register $REG_3$ and the gates which it controls, is substantially simplified with regard to the system using the full modifications of FIG. 15 which necessitate supplementary storage. This is obtained at the cost of a doubled computation time but the economy of equipment is substantial.

The method of FIG. 17 as well as that of FIG. 15 may be applied to a number of functions higher than 3 so as to permit the computation of correlation functions of a higher order than 2. For each function it will solely be necessary to add a chain of the type represented in FIG. 6 and terminating by the comparator such as $SC_1$ and the staticizing bistable such as $BS_{10}$. For each function an exclusive-OR gate is yet needed to adapt the logical circuit $XOR_1$ to the exploitation of the various functions and this in accordance with the schematic circuit of FIG. 3, and an authorization bistable such as $BS_{32}$ shall also be necessary. In the case of correlation functions of a higher order than the second, the authorization given by the bistables such as $BS_{32}$ will have to be a joint one since in accordance with the system of FIG. 17, the computation can be exploited only when $t_1$ is larger than the other correlation delays temporarily stored in the respective registers such as $REG_3$.

In the case of the system of FIG. 15, analogous additions will be necessary for each function having to intervene in the computation, the two staticizing bistables such as $BS_{10}$ and $BS_{11}$ having always to be provided at the end of the chain for each new function. In the two cases (FIG. 15 or 17) when there are several delay registers such as $REG_3$, interconnections may be foreseen in order to ensure the passage of these registers through all possible combinations so as to ensure a complete programme without manual intervention. This can be done under the control of the counter MCT (FIG. 7) of N samples which can give a signal at the end of the count of N to extract the series of $n$ results from the memory MS (FIG. 7) and modify the state of the delay registers such as $REG_3$.

The system of FIG. 17 being limited to the computation of half the points only of a correlation function of the second order and this for positive values of the delays $t_1$ and $t_2$, one will now examine with the help of the circuit of FIG. 18 and of the diagrams of FIGS. 19 to 25, the computation programme of a second order correlation function for all the possible values of $t_1$ and $t_2$ from 0 to $(n-1)$ $t_0$ i.e. delays going from 0 to 1.98 milliseconds by steps of 20 microseconds for the example chosen, and negative values of $t_1$ and/or $t_2$ included.

FIG. 19 is a table for the correlation function of the second order $F_{123}(t_1, t_2)$ where the value of $n$ has been limited to 5 in order to facilitate the representation and where the columns correspond to the first delay time $t_1$ while the rows give the second delay time $t_2$. In each square corresponding to a particular column and row, a number of two digits defining these coordinates has been indicated, with the row digit first, and corresponding to a point of the correlation function. It is easily seen that the number of calculated points will be of the order of half the $n^2$ possible points and more precisely equal to $n(n+1)/2$ as the points corresponding to values of $t_1$ inferior to those of $t_2$ cannot be calculated if the system of FIG. 17 is used.

With the help of the interconnecting device PS of FIG. 15, one may however make a second calculation by interconnecting this time the input terminal $ps_2$ with the output terminal $ps'_3$ and the input terminal $ps_3$ with the output terminal $ps'_2$. This will permit to calculate the correlation function $F_{132}$ instead of $F_{123}$ and by means of the equivalences (8), it is seen that this function is the same as $F_{123}$ if the coordinates $t_1$ and $t_2$ are inverted.

The table of FIG. 20 for the function $F_{132}$, which table is analogous to that of FIG. 19 indicates that if the columns now give the values of $t_2$ while the rows give that of $t_1$, one can calculate a series of points analogous to those calculated for $F_{123}$, which points have also been defined in FIG. 20 by numbers of two digits characterizing the row and the column but this time with the column digit first.

Due to the correspondence between the functions $F_{132}(t_2, t_1)$ and $F_{123}(t_1, t_2)$, as shown in the table of FIG. 21, the points of $F_{132}$ may be transferred in a table having the same coordinates as those of FIG. 19, so that they complete the points already obtained by the calculation of $F_{123}$ defined by the table of FIG. 19, the $n$ points of the diagonal: 00, 11, 22 etc. being common to the two computations.

In this way, as indicated in FIG. 25 which represents a graph with the times $t_1$ in abscissa and the times $t_2$ in ordinate, for the positive values of these two times, i.e. for the first quadrant, the first calculation of the function $F_{123}$ will permit to find the values of the correlation function of the second order for the values of $t_1$ and $t_2$ defining the lower triangle ($F_{123}$) in the first quadrant joined to axis $t_1$, while the calculation of the correlation function of the second order $F_{132}$ will permit to calculate the points of $F_{123}$ defining the upper triangle ($F_{132}$) in this first quadrant a side of which is joined to the axis $t_2$. The two triangles are contiguous and this contiguity can be verified since as indicated by the tables of FIGS. 19 and 21, the points of the correlation function corresponding to the delay points $t_1$ and $t_2$ equal to one another, i.e. 00, 11, 22, etc. will be calculated in both cases.

By means of the other equivalences defined by (8) one can calculate the other regions of the graph of FIG. 25, each new calculation permitting to obtain values corresponding to another triangle surface as indicated in FIG. 25. It is however remarked that for the calculation of a correlation function of the second order the zone of combinations of the times $t_1$ and $t_2$ is thus divided into eight triangles while PS only permits the calculation of $3!=6$ different functions. Moreover, for the second quadrant where the values of $t_2$ are positive while the values of $t_1$ are negative, the calculation of the function $F_{231}$ will only permit to obtain points corresponding to delay times of which the sum of absolute values is limited, to $n-1$, i.e. 4 for the table of FIGS. 19 to 22 or $99\times20$ microseconds for the example of the circuits of FIGS. 6, 7 and 17. The same situation presents itself also in the fourth quadrant of FIG. 5 where the values of $t_1$ are then positive while those of $t_2$ are negative and this time the upper limit for the sum of values refers to the function $F_{321}$. However, the reference $F'_{231}$ defining the triangle of the second quadrant completing that joined to the two axes indicates that it is possible to carry out a seventh calculation to cover the values of the correlation function corresponding to these times of the graph. The reference $F'_{321}$ defining an analagous triangle in the fourth quadrant indicates an eight and last calculation which will permit to complete the series of positive and negative values of $t_1$ and $t_2$ for the calculation of $F_{123}(t_1, t_2)$.

The table of FIG. 22 defines the correlation function $F_{231}(t_2-t_1, -t_1)$ which is thus equivalent to $F_{123}(t_1, t_2)$ with a change of coordinates. The first part of the table for the columns going from 0 to 4 indicates by numbers of 2 digits the points corresponding to different values of the coordinates and which can be calculated to cover the corresponding triangular zone indicated by $F_{231}$ on the graph of FIG. 25 for the function $F_{123}$. It is seen however that if the columns of the table of FIG. 22 are prolonged to allow delay values $t_2-t_1$ going from $n$ to $2n-2$, i.e. from 5 to 8 for example of the table, it will be possible to calculate other points of the correlation function $F_{231}$ and in view of the equivalence between the functions $F_{231}(t_2-t_1, -t_1)$ and $F_{123}(t_1, t_2)$, it will be found that these points correspond to the triangle indicated by $F'_{231}$ at FIG. 25. Indeed, after having calculated $F_{231}$ for values of $t_2-t_1$ going from 0 to $n-1$, one can make the calculation of $F'_{231}$ with values of $t_2-t_1$ extending from $n-1$ to $2n-2$ which will give again a series of $n$ points such as 40, 31, 22, 13, 04 calculated in the two cases and constituting the limit between the triangles $F_{231}$ and $F'_{231}$ shown on FIG. 25.

The graph of FIG. 23 indicates the zones covered by these two calculations with $t_2-t_1$ in abscissa and $t_1$ in ordinate. By transposing these zones $F_{231}$ and $F'_{231}$ on a diagram giving $t_1$ in abscissa and $t_2$ in ordinate, i.e. the diagram of the function $F_{123}$, it is seen that the triangular zones $F_{231}$ and $F'_{231}$ occupying the first quadrant of FIG. 23 as indicated are transposed into the second quadrant of the graph of FIG. 24 giving the function $F_{123}$, so as to cover all possible values of $t_1$ and of $t_2$ for this second quadrant.

FIG. 18 indicates the few modifications which have to be brought to the circuit of FIG. 17 in order to be able to calculate the values of the correlation function $F'_{231}$ and also the values of function $F_{321}$ which for the fourth quadrant plays the same role as $F'_{231}$ in the second. As it is only desired to sample from the $(n-1)$th delay time on and to continue to sample during the next period of 2 milliseconds as long as $t_1$ remains inferior to $t_2$ contrary to FIG. 17 where $t_1$ should at least be equal to $t_2$, a simple manner to cover these increased delay times consists in using the gate $P_{16}$ of FIG. 7 serving to transmit a trigger pulse towards the sample counter MCT no longer each time the delay counter HCT has accomplished a revolution, but only after two complete revolutions of the counter HCT, the sampling of the function $f_1$ being only effectively authorized once out of two. This duplicating of the period of 2 milliseconds is effected as indicated by FIG. 18 by the interposition of a bistable $BS_{100}$ operating as a scale-of-two between the output of gate $P_{16}$ and the input of the sample counter MCT. Moreover, gate $P_{16}$ is now authorized by pulses $t_A$ in conjunction with $t_w$ so that from the start of the $n-1$ delay time, i.e. that numbered 99 at FIG. 16, the bistable $BS_{100}$ when it is triggered into its 1 condition, once out of two, can immediately authorize the reading of the signal given by $XOR_1$ (FIG. 17). This authorization given by $BS_{100}$ is done together with the authorization given by $BS_{32}$ of FIG. 17 the role of which is however modified at FIG. 18.

Indeed, $BS_{32}$ will now be put into its condition 1 by the output pulse of $P_{16}$ and when this same pulse triggers $BS_{100}$ into its 1 condition, the AND-gate $P_{50}$ will supply an output signal to authorize the reading of $XOR_1$ by means of the gates $P_{46/47}$. On the other hand, the input 0 of $BS_{32}$ is driven by pulses coming from $P_{34}$ (FIG. 17), so that $BS_{32}$ will only authorize the sending of pulses into BCT (FIG. 7) starting from the delay time 99 and then during the next cycle of the delay counter HCT until $t_1$ reaches $t_2$. At this moment, from the start of this delay time defined by $t_2$, $BS_{32}$ will return to its 0 condition thus preventing the exploitation of the condition of $XOR_1$ for the values of $t_1$ equal or superior to those of $t_2$. The next pulse coming from $P_{16}$ will trigger $BS_{100}$ into its 0 condition, so that the next triggering of $BS_{32}$ into its 1-condition will remain without effect. It is only at the next pulse coming from $P_{16}$ that $P_{50}$ will again supply an authorization at its output, $BS_{32}$ and $BS_{100}$ both reaching again their 1-condition. The pulses coming from $P_3$ (FIG. 7) and which at FIG. 17 directly feed terminal $sc_{13}$ of the comparator for the function $f_1$ are only admitted at FIG. 17 to sample this function when $BS_{100}$ is in its position 0, this by means of the AND-gate $P_{51}$ and in order to secure the desired values of $t_1$. Indeed, in this manner, the sample of the function $f_1$ staticized in $BS_{10}$ remains that of the beginning of the first period of two milliseconds and this during the whole duration of the next period of two milliseconds, $f_1$ being thus only sampled one period of two milliseconds out of two. At the end of the second period and in general all those for which $BS_{100}$ is in its 1-condition, a zero output of this bistable will produce a trigger pulse when this bistable returns to its 0 condition to make the sample counter MCT advance by one unit.

The operations will thus continue in the same manner and will be repeated N times under the control of MCT but the calculation time will be twice as long for $F'_{231}$ as for $F_{231}$.

By observing the graph of FIG. 25, the calculations of $F'_{231}$ and of $F'_{321}$ constituting two supplementary calculations at a rhythm twice less fast than the normal one could be avoided if only half of the possible values for the delay times $t_1$ and $t_2$ are desired. If the absolute values of both these times are limited to $$\left(\frac{n}{2}-1\right)t_0$$

the covered zone is one-half smaller and corresponds to the dotted line square in FIG. 25 and in this case the calculation of the zones $F'_{231}$ and $F'_{321}$ is of course no longer necessary and only six calculations will be necessary instead of eight.

It is obvious that the calculation method described above and based on the equivalences (8) may be extended to correlation functions of an order higher than the second by using analogous equivalences between the $k!$ correlation functions of the order $k-1$.

By means of additional circuits such as those represented on FIGS. 15 and 17, it has been explained how the correlator represented by the circuits of FIGS. 6 and 7 and adapted to calculate the correlation function $F_{12}(t_1)$ of two functions $f_1(t)$ and $f_2(t)$ could have its possibilities increased in order to calculate correlation functions of the second order or of higher order and also to treat either positive or negative correlation delays.

It is obvious that in this case of the calculation of correlation functions of any order, the apparatus described will also operate if some of the functions are identical.

In particular, the apparatus may calculate autocorrelation functions of any order, which is the case when all the functions are the same. For the circuits of FIGS. 6 and 7, if it is desired to calculate the ordinary autocorrelation function of the function $f_1(t)$ present at the input of $AT_1$ (FIG. 6), it will be sufficient to modify the connections represented in dotted lines in the rectangle PS symbolizing the interconnecting device which cooperates thus to establish a desired calculation programme. The only connection having to be modified is that between the input terminal $ps_2$ and the output terminal $ps'_3$ which will be replaced by a connection between the latter output terminal and the input terminal $ps_1$, so that the function $f_1(t)$ drives the two channels towards the staticizing bistables $BS_1$ and $BS_2$ of FIG. 7.

The mean value of a random time average function $f(t)$ or the first order moment is defined by $$\bar{f}=\int_{-\infty}^{\infty} fp(f)df = \lim_{T\to\infty}\frac{1}{2T}\int_{-T}^{T}f(t)dt \qquad (9)$$

where $\bar{f}$ indicates the average value of $f$ and $p(f)$ represents the probability density. The correlator of FIGS. 6 and 7 is perfectly adapted to the computation of such an average value for a function $f(t)$ and the average value will be proportional to the sum of binary values of the different N samples. Again, the interconnecting device PS of FIG. 6 will allow to modify the programme of operations when such an average value is desired. The function $f(t)$ of which it is desired to compute the average value will be introduced at the input of $AT_2$ (FIG. 6). The connection between the terminals $ps_3$ and $ps'_2$ of PS will be suppressed, while the connection $ps_1$ to $ps'_1$ will be replaced by a grounding of the latter terminal. Moreover, for this computation of the average value of a function, the buffer memory MS is not required and it will be disconnected from the rest of the circuit of FIG. 7 or rendered ineffective by any appropriate means such as the suppression of reading pulses coming from gate $P_{12}$ and of the inscription pulses coming from gate $P_{13}$. The resetting pulses for the reversible counter BCT coming from gate $P_{14}$ will also be suppressed. Indeed, BCT has no longer to serve as staticizing device for the memory MS which is not used and the suppression of these resetting pulses permits to keep in the reversible counter BCT the number inscribed after each elementary sampling time of 20 microseconds during which the second channel to which the function $f(t)$ is applied is effectively sampled. The logical circuit of FIG. 7 comprising the gates $P_4$ to $P_8$, has to be simplified as only the state of the staticizing bistable $BS_2$ staticizing the sampling results of function $f(t)$ has to be examined to determine the sending of a pulse to one of the two input terminals of the reversible counter BCT. By placing permanently the other staticizing bistable $BS_1$ in its condition $f_1 > A$ one obtains very simply a permanent authorization for the gates $P_4$ and $P_6$, the first thus causing the addition of one unit to the number previously inscribed in BCT when $f(t)$ is greater than the instantaneous variable reference level B, and the second causing the subtraction of one unit in the opposite case.

As the sample counter MCT of FIG. 7 only advances one step for each cycle of the delay counter HCT and during each of these cycles 100 samplings of $f(t)$ will be effected, the number N of samples preselected by MCT will have to be chosen 100 times less high than that effectively desired, i.e. a signal will be applied for instance to terminal $10^4$ of MCT to stop the operations after 10,000 steps of MCT when $N = 10^6$ samples will have been effectively accumulated by BCT.

The circuits of FIGS. 6 and 7 will also permit to compute the average RMS value of a function $f(t)$ or still the second order moment, i.e. the average value defined by $$\overline{f^2} = T \to \infty \frac{1}{2T} \int_{-T}^{T} f^2 p(f) df \qquad (1)$$

In this case, the connections of PS (FIG. 6) will be established just as for the computation of the autocorrelation function, the connection between $ps_2$ and $ps'_3$ being however replaced by a connection between the latter terminal and $ps_1$. The buffer memory MS will be rendered ineffective in the manner described above in relation to the computation of the average value, but a sampling pulse for the first channel (A) will be produced in synchronism with all the sampling pulses for the second channel, i.e. the output of gate $P_1$ (FIG. 7) will be connected not only to terminal $sc_{23}$ of comparator $SC_2$, but also (not shown) to terminal $sc_{13}$ of comparator $SC_1$, which terminal will thus no longer be connected to the output of gate $P_3$ (FIG. 7). The logical circuit of FIG. 7 scanning the conditions of the staticizing bistables $BS_1$ and $BS_2$ will thus remain the same as for the computation of a correlation function and by fixing to $10^4$ the number of steps of the sample counter MCT the computation of a number $N = 10^6$ of samples will be secured, just as in the case of the computation of the average value.

By keeping the connections of PS as indicated at FIG. 6, it is also possible to establish the circuits of FIGS. 6 and 7 for the computation of the RMS value as described immediately above, when two distinct functions $f_1(t)$ and $f_2(t)$ are respectively applied to the input circuits $AT_1$ and $AT_2$ of FIG. 6. In this case, the value supplied by BCT at the end of the computation will correspond to the average of the product of the two input functions $f_1$ and $f_2$, i.e. to the value $F_{12}(0)$ of the cross-correlation function when the correlaion relay is zero, or yet the correlation coefficient.

Another possibility of use of the correlator of FIGS. 6 and 7 is the computation of the probability distribution function or the probability that a function $f$ is within given limits. Due to Bernouilli's theorem, it is known that if $P_j$ represents the probability that the amplitude of the function $f$ is lower than or equal to the reference amplitude $A_j$, the probability that the absolute difference between this probability $P_j$ and the ratio $N_j/N$, where N represents the total number of trials and $N_j$ represents the number of these trials for which $f$ has been found lower than or equal to $A_j$, is getting smaller and smaller when N increases and tends towards infinity, tends towards unity, or in other words tends towards a certainty.

The correlator of FIGS. 6 and 7 will permit to compute the various values of $P_j$ on condition that one disposes, no longer of a variable reference level the variation slope of which is random as represented in FIG. 1 but, of a variable reference level linearly following a predetermined fixed slope so as to pass successively from a voltage level $-E$ to a voltage level $+E$. The waveform having to be analyzed to determine the probability distribution function will be sampled every 20 microseconds while at the same time the variation of the linear level with predetermined slope will also be sampled and the two values compared to one another. The variation rate for the linear reference waveform with predetermined slope will be such that it passes from level $-E$ to $+E$ during a scanning period corresponding to a cycle of the delay counter HCT, i.e. $100 \times 20$ microseconds or 2 milliseconds.

Such a computation thus necessitates the replacement of the generator of variable reference level with random slope such as $RG_1 + SG_1$ of FIG. 6, by a fixed slope sawtooth generator the output of which will be connected to the terminal $ps'_4$ of PS at FIG. 6 to replace the connection between $ps_4$ and $ps'_4$. The waveform $f$ to be analyzed to determine the probability of obtaining the various levels will be applied at the input of $AT_2$ (FIG. 6) and the connections between $ps_1$ and $ps'_1$ as well as between $ps_3$ and $ps'_2$ will be suppressed. In this way, the waveform $f$ and the linear variation reference waveform with fixed slope are combined by the operational amplifier $SA_2$. The staticizing bistable $BS_2$ of FIG. 7 will indicate if the function $f$ is lower than or equal to the instantaneous level $B_j$ at the sampling instant or else superior to this instantaneous level. In the first case the condition expressed by $P_j$ is realized and a value $+1$ will be attributed to this case while a value 0 corresponds to the other case. In other words, it will be sufficient to modify the logic circuit of FIG. 7 so as to permanently maintain the staticizing bistable $BS_1$ in its condition $f \leq A$ and to disconnect the output $f_2 > B$ from the bistable $BS_2$ or what comes down to the same thing, to apply an inhibition signal to the gates $P_4$ and $P_7$. In this way, only gate $P_5$ can supply an activating signal at its output and this when $BS_2$ is in its condition $f_2 \leq B$. In this case, gate $P_9$ will be authorized to send a pulse to counter BCT to cause the addition of one unit to the result previously stored. This previously stored result will have been staticized, as for the computation of the correlation functions, from the buffer memory MS and after each delay time of 20 microseconds, the new or old (if it has not been modified) result inscribed in BCT is reinscribed in MS. In this way, one may compute in parallel $n = 100$ distinct values of $P_j$ corresponding to 100 different delay times, i.e. 100 possible distinct levels uniformly distributed between $-E$ and $+E$.

The realization of a linearly variable reference level but with a predetermined fixed slope may be accomplished by means of the bootstrap circuit of the type described with the help of FIG. 11, by replacing the random noise source control such as $RG_1$ by a fixed and well stabilized reference voltage which will be connected as biassing potential, i.e. for part BSP, to the cathode of rectifier $D_8$. In this way, the scanning period insead of being a random variable in the neighborhood of the revolution period of HTC but varying constantly from one period to the other, will now be fixed. By calculating the constants of this bootstrap circuit and more particularly the constant current charge circuit so that they have values such that the whole amplitude range from $-E$ and $+E$ is scanned during the cycle of the delay times i.e. during 100 times the delay of 20 microseconds or 2 milliseconds, a reference waveform of the type shown in FIG. 1 could be obtained but where the positive and negative slopes will be equal in absolute value and where a two-way scan is effected during the time corresponding to 200 delay points. In this case however, the even and odd cycles have to be distinguished since for an odd cycle for instance, the first delay time would correspond for instance to the lowest level while for the next even cycle it would be the last delay time which would correspond to the lowest level. It is obvious that this constitutes a complication as the partial results corresponding to a given level have to be continually re-stored in the buffer memory MS and normally the different memory cases of the latter which would correspond to a given level, also correspond to a delay time which is the one during which the corresponding memory row is addressed by means of the access switch SAS of FIG. 7.

A first simple solution consists in using for the delay counter HCT a reversible counter just as for counter BCT and to connect the output $hct_{99}$ of this reversible delay counter HCT to a bistable (not shown) operating as a scale-of-two, just as $BS_0$ used in FIG. 15, in order to distinguish the even and odd cycles of the reversible counter HCT. During the first cycles, this bistable would permit to make the reversible counter HCT advance in one sense so as to cause the successive appearance of pulses of 20 microseconds at its terminals $hct_{00/99}$ in this order, while the appearance of the pulse at terminal $hct_{99}$ would have for effect to trigger this bistable into its second condition. This would condition the reversible counter HCT so that it would work in the opposite sense, the pulses being then successively produced at terminals $hct_{99/00}$ and in this order, the appearance of the pulse at terminal $hct_{00}$ having for effect to reverse the state of the control bistable. It is seen that in this manner the buffer memory MS would thus be examined in two-way scans, this pace corresponding to the triangular shape of the linear reference waveform with slopes of fixed absolute values but changing of sign after each scan of the levels comprised between —E and +E.

However, this solution implies a complication for counter HCT which has to be rendered reversible for this purpose only, and an alternative solution will now be described by referring to FIGS. 26 and 27 which not only permit to avoid such a complication but which permit to use a generator of variable level with fixed slope only utilizing a single bootstrap circuit of the type described in relation to FIG. 11.

With the help of such a circuit which is represented partially at FIG. 26 and which essentially comprises part BSP of the circuit of FIG. 11, the bistable BS and particular control means for the latter, plus a supplementary transistor $T_{18}$ incorporated in BSP, a sawtooth generator can be realized, permitting a unidirectional linear scanning during almost the whole of the scanning period corresponding to 100 delay times and thus passing from one predetermined level to the other, while its return to said one level is effected in an extremely fast time.

FIG. 27 indicates such a waveform where during the delay times from 00 to 99, the level increases linearly from —E to +E, but during the delay time 99 the linear increase is abruptly interrupted and before the expiration of this delay time, the instantaneous amplitude of the waveform is already taken back to level —E ready to start a new cycle again.

If the results corresponding to increasing amplitude levels and obtained by comparison between the instantaneous amplitude of the random waveform and the instantaneous amplitude of the sawtooth reference waveform of FIG. 27, are put successively into memory in MS (FIG. 7) by taking into consideration the fact that the operational amplifier such as $SA_2$ of FIG. 6 adds the reference waveform to the waveform to be analyzed, one will thus produce a reference sawtooth inversed with respect to that of FIG. 27.

As indicated by FIG. 26, this may be obtained by means of part BSP represented in detail in FIG. 11 and which permits to develop at the terminals of condenser $C_{13}$ also represented in FIG. 26, a voltage decreasing linearly towards a more negative value. As transistor $T_{15}$ is of the PNP type, from the moment bistable BS is in its 1-condition and assuming the output of this bistable is at this instant at a high potential, transistor $T_{15}$ is blocked and capacitor $C_{13}$ which will be assumed to be initially discharged, will have the potential of its plate connected to resistance $R_{39}$ vary linearly in the negative sense. With its other plate connected to a potential $E_0$ as indicated in FIG. 26 and with the cathode of rectifier $D_8$ connected to a potential E, the potential difference between E and $E_0$ being supplied by a stabilized reference voltage source 23, the voltage at the junction point of $C_{13}$ and of $R_{39}$ and also that at the base of transistor $T_{16}$ will drop linearly towards —E. The constant charge current being predetermined by the circuit constants and the source voltage, one can take measures to reach the voltage —E after 100 delay points, i.e. substantially 2 milliseconds, when one reaches the last delay time of the cycle, i.e. delay 99. At this moment, the pulse at terminal $hct_{99}$ of the delay counter HCT of FIG. 7, which terminal is also reproduced at FIG. 26, authorizes the AND gates $P_{52}$ and $P_{53}$ and during pulse $t_B$ defining the second phase of 5 microseconds of the ninety-ninth delay time of 20 microseconds, which phase authorizes $P_{52}$, pulse $t_W$ driving this gate as well as $P_{53}$ can pass it and place BS in its 0 condition. This will have for effect to render $T_{15}$ conductive and thus establish a short-circuit for the discharge of the linear charge capacitor $C_{13}$.

However, this capacitor will have been charged practically during the whole duration of the 2 milliseconds cycle and it is now desired to discharge it very rapidly during a time which should be inferior to a unitary delay time of 20 microseconds. This particular problem necessitating a high current is solved by means of an auxiliary transistor $T_{18}$ which is a PNP transistor of a special type permitting the passage of a high current. Its emitter is connected on the one hand to $E_0$ by rectifier $D_{16}$ and on the other hand to a voltage $E_1$ more positive than $E_0$ by resistor $R_{46}$, so that when $T_{18}$ is not conductive, a constant current which for instance may be of the order of 150 milliamperes passes through $R_{46}$ in series with rectifier $D_{16}$ which at this moment is in its conductive state. The non-conductive condition of $T_{18}$ is secured by the fact that just as $T_{15}$, its base is coupled to the output 1 of BS by means of a resistor $R_{47}$ shunted by capacitor $C_{16}$. On the other hand, the collector of $T_{18}$ is directly connected to the junction point of $C_{13}$ and of $R_{39}$.

In this way, at the moment that $T_{15}$ becomes conductive when BS is triggered into its 0 condition, $T_{18}$ also becomes conductive and the current in resistor $R_{46}$ is now sent through the emitter-collector space of $T_{18}$, rectifier $T_{16}$ becoming blocked, this current thus being added to that circulating in $R_{39}$ to secure a very quick rise of the potential at the junction point of $C_{13}$ and $R_{39}$ and thereby of the emitter of $T_{16}$ towards the value +E. In this way, by adding the special transistor $T_{18}$, this very fast variation may be accomplished between phase $t_B$ and phase $t_D$ of the same unitary delay time 99. During phase $t_D$, pulse $t_W$ is admitted through gate $P_{53}$ to trigger BS into its 1-condition. This returns the high potential towards the base of transistors $T_{15}$ and $T_{18}$ so that they are again blocked and a new scanning cycle is started.

The correlator of FIGS. 6 and 7 may also be used to calculate the first order probability density $p(f)$ which, for a random function with continuous sampling, may be defined with the help of $$P_j = \int_{-\infty}^{A_j} p(f)df \tag{11}$$

where $P_j$ indicates as previously the probability that the function $f$ is inferior or equal to the level $A_j$. For discrete samples, the probability density may be defined as being approximately equal to $$p(f) = \frac{P_j - P_{j-d}}{d} \quad (12)$$

where $d$ is a level increment and $P_{j-d}$ thus corresponds to the probability that the function $f$ is inferior or equal to this level $A_{j-d}$ slightly inferior to $A_j$.

With the help of the linear scanning generator having a period corresponding to the cycle of the delay counter HCT, i.e. the generator of FIG. 26, the different levels required for the computation of $p(f)$ defined by the preceding equation can be produced. By using the two channels of FIG. 6, one can simultaneously sample the same function $f(t)$ during the pairs of delay times corresponding to the levels $A_j$ and $A_{j-d}$. Through the intervention of the interconnecting device PS of FIG. 6, the function $f(t)$ applied at the input of $AT_1$ will appear at the terminals $ps'_1$ and $ps'_3$ which will both be connected to $ps_1$, the connection between $ps_2$ and $ps'_3$ being suppressed. Also, the connections of $ps_3$ to $ps'_2$ and of $ps_4$ to $ps'_4$ will be suppressed and the linear scanning generator with constant slope will be directly connected to $ps'_2$ and $ps'_4$. Moreover, while the second channel to which comparator $SC_2$ corresponds will be sampled in the normal way with the help of pulses outgoing from gate $P_1$ (FIG. 7), a supplementary gate $P'_1$ indicated in dotted lines in FIG. 7 will be provided to apply sampling pulses at terminal $sc_{13}$ of comparator $SC_1$ of the first chain instead of those normally supplied by $P_3$. These sampling pulses will also be the narrow pulses $t_S$ but this time produced during the previous phase $t_A$ of each delay time of 20 microseconds. In this way, for each delay time the sampling pulses during phase $t_A$ will define a reference level $A_{j-d}$ slightly inferior to the level $A_j$ sampled during the next phase $t_B$ of each delay time. The level increment $d$ corresponding to the quarter of a delay time will thus be defined in this manner by $$d = A_j - A_{j-d} = \frac{1}{4}\frac{2E}{100} = \frac{E}{200} \quad (13)$$

To each delay time corresponds a pair of levels $A_j$ and $A_{j-d}$ and one should determine if the waveform $f(t)$ to be analyzed is inferior (or equal) or superior to these levels. These two results should in principle be accumulated for each level, and the partial results re-stored continuously in MS for the hundred level pairs whereafter, the two series of results corresponding to the hundred levels $A_{j-d}$ and $A_j$ should be subtracted from one another. However, this subtraction may be realized directly for each pair of samples so that the reversible counter BCT may be used as previously in conjunction with the buffer memory MS the capacity of which should not be increased. Indeed, if at the instants $t_A$ and $t_B$ the interval of which has been represented on an enlarged scale in FIG. 27, the waveform $f(t)$ to be analyzed is each time superior to the levels $A_{j-d}$ and $A_j$, or each time inferior to these levels, the difference between the binary results of the two comparisons is nil in both cases and the state of BCT (FIG. 7) should not be modified. On the contrary, if as indicated in FIG. 27 function $f(t)$ has a part 24 which is superior to level $A_{j-d}$ and inferior (or equal) to $A_j$, a value $+1$ will be attributed to the result of the comparison, in accordance with the expression (12), while in the opposite case for the waveform part 25, i.e. when 25 is inferior (or equal) to $A_{j-d}$ and superior to $A_j$, a value $-1$ will be attributed to the result of the comparison.

This way of operation is obtained by modifying (not shown) the connections of the logic circuit of FIG. 7, so that the output of $P_6$ is directly connected to the input of $P_9$ outgoing from $P_8$ while the output of $P_7$ is directly connected to the input of $P_{11}$ outgoing from $P_{10}$, the outputs of $P_8$ and of $P_{10}$ being rendered ineffective or interrupted. In this way it is seen that if during the phase $t_A$, $BS_1$ indicates a value superior to the instantaneous reference level, while during phase $t_B$, $BS_2$ indicates the opposite case, a unit will be added to the partial result of BCT. In the opposite case, a unit will be subtracted, because it will then be $P_{11}$ which will supply a trigger pulse, and for the two other cases corresponding to the activation of $P_4$ and of $P_5$ no pulse will be transmitted to BCT leaving the partial result corresponding to one of the hundred levels unchanged.

In this way, with the help of MS, hundred points of the probability density curve $p(f)$ may be computed in parallel.

Yet another special computation which may be accomplished by the circuits of FIGS. 6 and 7, consists in checking the stationary or non-stationary character of the random waveform to be examined. Indeed, if the random variable is stationary, the autocorrelation function will remain the same whatever the time interval occupied by the observation period. In this manner, if the computation of the autocorrelation function is repeated in a regular manner, the comparison between a curve of the autocorrelation function and the one previously obtained will permit to check if the analyzed random wave is stationary or not.

The circuits of FIGS. 6 and 7 are as previously explained adapted to the computation of the autocorrelation function and the buffer memory MS may allow this checking of the stationary character of the analyzed waveform. The correlator may be adapted to compute only one half of the points of the autocorrelation function, i.e. 50 points when $n = 100$ and in this way only half of the capacity of the buffer memory MS will be used to store these 50 points characterizing the autocorrelation function. When this computation is achieved, the results stored in the memory MS may be transmitted to any appropriate output device to represent the function, for instance as it will be explained later, a cathode oscillograph may be used for a visual representation of such an autocorrelation function. But the results will be kept in the half of the memory MS used for this first computation, and a second computation identical to the first will be repeated by using the same 50 correlation delay values but by storing this time the 50 results in the second half of the memory MS. At the end of this second computation, the memory MS thus contains two series of results and the output device may receive these results in order to allow a comparison which will permit to check the stationary character of the analyzed wave. This checking may be continuous since immediately afterwards a third computation may be carried out the results of which will again be stored in the first part of the memory MS and so on.

There are different possibilities to limit the computation of the autocorrelation function to the half of the points normally computed and to insert the 50 results in a predetermined half of the memory MS. For instance, in conjunction with the circuits of FIG. 7 a supplementary bistable (not shown) can be used which will be regularly triggered into one condition at delay time 00, with the help of a pulse outgoing from the corresponding terminal $hct_{00}$ of HCT, and which will be triggered into its other condition at time 50 with the help of a pulse outgoing from the corresponding terminal $hct_{50}$ (not shown) of HCT. Through an output signal provided by this bistable, a supplementary authorization (not shown) may be provided at the gates $P_9$ and $P_{11}$, so that depending upon the fact that the authorization comes from one output of this supplementary bistable or from the other, the modification of the condition of BCT in function of the results of the comparisons staticized in $BS_1$ and $BS_2$, will be authorized during the first half cycle of HCT or during the second half. Moreover, gate $P_3$ which is authorized by a pulse outgoing from terminal $hct_{00}$ will also be authorized (not shown) by the pulse outgoing from $hct_{50}$ so that when computations will be carried out during the second half cycles of HCT, the sample of the first channel staticized in $BS_1$ will be that taken at the delay time 50 so that the 50 delays during these second half-cycles are the same as those used during the first half-cycles of HCT.

It is seen that such an adaptation is extremely simple and it does not require any modification of the reading and inscribing system associated to the buffer memory MS and in particular no change is required for the access switch SAS. During the half-cycles of HCT which do not correspond to an effective scanning of the values staticized in $BS_1$ and $BS_2$, the 50 results previously stored in MS will be regularly staticized in BCT but will be immediately re-inscribed without undergoing modifications. Of course, such operations may also be suppressed.

If this method permits to compute 50 points of the correlation curve, it limits the total range of the delay to half of the normal range. If it is desired to keep the whole of this range, this may be obtained by interlacing the delay times used during two consecutive observation periods. In this case however, the interval between two consecutive delay times for the same computation will be doubled. In other words, the unitary delay time is doubled.

FIG. 28 represents the necessary modifications for such a solution. The supplementary bistable $BS_{101}$ will this time be operated as a scale-of-two with a common input connected to the output of gate $P_2$ (FIG. 7) by means of make contact $sk_1$ of a key SK not shown. The output which is activated when $BS_{101}$ is in its 0 condition, will normally be connected by means of contact $tk_1$ of a key TK also not represented, to supplementary inputs of the AND gates $P_9$ and $P_{11}$. Through a supplementary contact $tk_2$ of the second key, the output of gate $P_1$ (FIG. 7) will be connected to the input of gate $P_3$ controlled from terminal $hct_{00}$ as in FIG. 7. But contact $tk_2$ is a changeover contact of which the armature connected to the output of $P_1$ may also be connected to the make contact going towards a supplementary AND gate $P_{54}$ which is controlled from pulses appearing at terminal $hct_{01}$. The outputs of $P_3$ and $P_{54}$ constitute the inputs of an OR gate $P_{55}$ the output of which is connected to terminal $sc_{13}$ to which the sampling pulses for the first channel are applied (FIG. 6).

In this manner, when the circuits of FIGS. 6 and 7 are used for the normal computation of an autocorrelation function, the three contacts of FIG. 28 are in the indicated positions, so that the pulses outgoing from $P_2$ solely reach the input of the delay counter HCT as in FIG. 7, and $BS_{101}$ set initially in its 0 condition remains in the latter and authorizes gates $P_9$ and $P_{11}$ permanently. On the other hand, the pulses outgoing from $P_1$ reach $P_3$ by passing through $tk_2$ in its rest condition and thus produce the pulses normally applied to $sc_{13}$ i.e. a sampling pulse during time 00 every hundred delay times.

On the other hand, for the computation of two successive autocorrelation functions, contact $sk_1$ will be closed and the pulses outgoing from $P_2$ will trigger $BS_{101}$ so that it only remains in its 0 condition authorizing gates $P_9$ and $P_{11}$ during the even delay times, i.e. 00, 02, 04, . . . 98. After the first observation period having allowed the computation of 50 points of the curve each necessitating N pairs of samples, while keeping $sk_1$ closed, the changeover contacts $tk_{1/2}$ will be displaced to their work position so that $P_9$ and $P_{11}$ will only be authorized during the odd delay times i.e. 01, 03, 05, . . . 99 while the sampling pulse for the first channel will be produced at terminal $sc_{13}$ during the second delay time 01 thus permitting to keep the same values of the 50 correlation delays, multiples of $2t_0$ this time, for the second computation corresponding to the second observation period.

Of course, with the first method where one only works during the first or the second half of the cycle of HCT, the computation time could also be reduced by half but this would necessitate supplementary controls between the access counter SAS and the buffer memory MS so as to foresee supplementary connections either between the outputs 50–99 of SAS and the inputs 00–49 of MS during an observation period, or between the outputs 00–49 of SAS and the inputs 50–99 of MS during the other period.

It will be remarked that for all the alternatives envisaged, the buffer memory MS must not be modified. This is true even in the case of computation of correlation functions of the second or a higher order. After each computation having allowed the determination of 100 distinct values stored in MS, these values may be extracted from this memory towards any utilisation or displaying device and a new computation is carried out. In this way, for instance, for correlation functions of the second order such as represented in FIG. 5, the surface will be calculated by the successive determination of plane curves corresponding to a particular value of $t_2$ for the $n=100$ possible values of $t_1$.

If a three dimensional display was desirable for such functions, the memory MS could of course be $n$-tupled. On the contrary, if with economy in view it is not desired to foresee the memory MS of FIG. 7, the correlation and other functions may very well be computed by the above described methods with this difference that $n$-times more time is necessary for the computation, each point of the curve having to be computed successively. But the reversible counter BCT will always permit to progressively store the value corresponding to a point of a function.

In case of omission of memory MS, a selection of the delay time defined by HCT and which corresponds to the delay time for the point of the function now computed should however be foreseen. This can be obtained by using the same arrangement as that described in connection with the circuit of FIG. 15 and based on the use of a delay register $REG_3$. For each computation of a point of a function, register $REG_3$ will fix the delay time, so that a pulse will only appear at the output of $P_{33}$ (FIG. 15) during the delay time of 20 microseconds corresponding to the value register by $REG_3$. By connecting the output of $P_{33}$ to supplementary inputs (not shown) of AND-gates $P_9$ and $P_{11}$ (FIG. 7), the effective scanning of the results of the sampling staticized in $BS_1$ and $BS_2$ will only be allowed during a predetermined delay time among $n=100$ so that BCT will only receive pulses during these periods. Then, a new computation will be carried out for a new delay value registered in $REG_3$, or in other delay registers in case of correlation functions of the second or higher order, and so on. The change of delay time may be done either manually or automatically under the control of the sample counter MCT.

It is obvious that when the buffer memory MS is not used, the result stored in BCT should never be eliminated, except when it has been discharged in an output device, and consequently, the zero resetting pulses supplied by $P_{14}$ (FIG. 7) at the end of each delay period of 20 microseconds should be suppressed and the zero resetting of BCT may only be carried out at the beginning of a computation period of a point of a function.

When the memory MS is not used and only one result is accumulated in BCT, it will be sufficient to discharge the condition of this reversible counter in any appropriate output or representation display device.

When computations have been carried out in parallel with the help of MS, the hundred final results are stored in this memory at the end of an observation period and the access device to the memory of FIG. 7 can advantageously be used to control the discharge of information contained in MS towards any appropriate output device, for instance a printer or an oscilloscope. It will be sufficient starting from condition 00 of the delay counter HCT controlling the access to MS, to drive this counter at the rhythm corresponding to the nature of the output device, i.e., of the visual display device, and to inhibit gates $P_9$ and $P_{11}$ so as to isolate the reversible counter BCT which will be used exclusively to allow the successive staticizing of the hundred results stored in MS, each of these results being read from BCT by the output device during the corresponding staticizing period. It is obvious that the results could be reinscribed in MS starting from BCT so that while providing them to the output device one can also keep them in memory as long as it is desired.

This offers the advantage of easily permitting an analogue representation with the help of an oscilloscope as the buffer memory MS may be interrogated with a repetition period adapted to the scanning speed of the oscilloscope, the digital information staticized in BCT being transformed with the help of an analogue-digital converter into an applied voltage so as to define the trace of the oscillogram. To eliminate the information contained in MS, it will be sufficient to inhibit the inscription operation controlled by the pulses supplied at the output of $P_{13}$ (FIG. 7).

The control of the correlator may be rendered as automatic as desired. The computation period which will be initiated by the production of the various pulses necessary to the control of the circuits of FIG. 7, will be ended at the moment the sample counter MCT will arrive in the position characterizing the required number of samples. This may thus produce a signal automatically stopping the supply of the pulses necessary during the computation period. In their place, this signal may authorize the pulses necessary for the discharge of the computed information towards the output or graphic display device. According to other known techniques, the starting signal may ensure a preliminary clearing of the memory MS during the first 100 delay times defined by HCT in order to provide a clean memory MS at the beginning of the computations.

While the principles of the invention have been described above in connection with specific apparatus, it is to be clearly understood that this description is made only by way of example and not as a limitation on the scope of the invention.

We claim:

1. Apparatus for computing time averages of functions which vary with time, characterized in this, that $k$ comparator means are provided to compare each sampled value of one of $k$ functions to be analyzed with a sampled value of one out of $k$ reference functions, said $k$ reference functions being statistically independent from one another, $k$ being determined by the number of functions to be analyzed each of said comparator means providing a binary valued output depending on the result of each comparison between one of said $k$ functions and its associated reference function, that a logical circuit means is fed from the outputs of said $k$ comparator means and provides a binary valued output depending on whether the number out of said $k$ comparator means providing a binary valued output of one type is even or odd, and that the output of said logical circuit feeds means for computing a measure of the average of the binary values provided at the output of said logical circuit.

2. Apparatus according to claim 1, characterized in this, that said apparatus computes averages of sampled values, or of functions thereof, taken from the functions to be analyzed at various predetermined relative time intervals, e.g. correlation functions, that a logical circuit is provided, that a pulse generator is provided supplying pulses to a cyclic counter, that the sampling of a first of said $k$ functions together with that of its associated reference function is made by a first comparator means once for every cycle made by said cyclic counter, and for a predetermined condition thereof, said first comparator means including a bistate memory device to store the binary results of a comparison and present it at its output to said logical circuit until the next sampling of said first function is made at the next cycle, and that the sampling of a second of said $k$ functions together with that of its reference function is made by a second of said comparator means having register means once for every cycle made by said cyclic counter and for a predetermined condition thereof kept in memory register means.

3. Apparatus as claimed in claim 2, characterized in this, that said $k$ functions are supplied to said $k$ comparator means through an interconnecting device provided with crossconnections enabling to interchange the associations between said $k$ functions and said $k$ comparator means.

4. Apparatus as claimed in claim 2, characterized in this, that a generator for said reference function supplies all possible values of said reference function in a sequence of ordered values during a cycle corresponding to that of said cyclic counter.

5. Apparatus as claimed in claim 4, characterized in this, that, for each condition of said cyclic counter, said generator for said reference function supplies two consecutive reference values to said first and second comparator means respectively and that said logical circuit is provided with additional means to distinguish not only between like and unlike binary valued outputs provided by said first and second comparator means but also to distinguish between the two possible unlike binary valued outputs provided by said two comparator means.

6. Apparatus as claimed in claim 5, characterized in this, that for like results provided by said first and second comparator means, no pulses are sent to said reversible counter, while a pulse is sent to one or the other of the two inputs of said reversible counter depending on which of said first or second comparator means provides a binary valued output of one type.

7. Apparatus as claimed in claim 2, characterized in this, that said cyclic counter supplies an output pulse at the end of each cycle of revolution to a sample counter which is used to control and eventually stop the computation after a predetermined number of cycles has been accomplished by said cyclic counter.

8. Apparatus as claimed in claim 2, characterized in this, that each of said $k$ reference functions statistically independent from one another has a rectangular probability distribution with a range of values covering those of said functions.

9. Apparatus as claimed in claim 2, characterized in this, that the random period of said sawtooth waveforms with linear slope variations has an average value of the order of the period of said cyclic counter.

10. Apparatus according to claim 1 characterized in this, that said apparatus computes averages of sampled values, or of functions thereof, taken from the functions to be analyzed at various predetermined relative time intervals, e.g. correlation functions, that a pulse generator is provided supplying pulses to a cyclic counter, that the sampling of a first of said $k$ functions together with that of its associated reference function is made by a first comparator means once for every cycle made by said cyclic counter, and for a predetermined condition thereof, said first comparator means including a bistate device to store the binary result of a comparison and present it at its output, logical circuit means responsive to the bistate device output until the next sampling of said first function is made at the next cycle, that a memory is provided comprising a number of sections corresponding to particular conditions of said cyclic counter, that reading means are provided to sequentially read the words stored in various sections of said memory under the control of said cyclic counter, that staticizing means are provided to temporarily store a word read from a section of said memory before being rewritten eventually in modified form into said memory section, that the sampling of a second of said $k$ functions together with that of its reference function is made by a second comparator means for every condition of said cyclic counter, that computing means are provided to associate said staticizing

49 device with the output from said logical circuit so that the binary valued output thereof is combined with the word read into said staticizing means to produce an eventually modified word to be rewritten into a section of said memory, and that said means for computing a measure of the average of the binary values provided at the output of said logical circuit are constituted by said staticizing means in association with said computing means.

11. Apparatus according to claim 10 characterized in this, that the sampling of at least a third of said $k$ functions together with that of its reference function is made by at least a third comparator means once for every cycle made by said cyclic counter, and for a predetermined condition thereof kept in memory register means, said third comparator means including a bistate device to store the binary result of a comparison and present it at its output to said logical circuit until the next sampling of said third function is made at the next cycle.

12. Apparatus according to claim 11 characterized in this, that said staticizing means are constituted by a counter parallel driven from said memory and to which the output of said logical circuit is fed in the form of serial pulses characterizing the binary values provided at the output of said logical circuit.

13. Apparatus as claimed in claim 12, characterized in this, that said counter is a reversible counter with two inputs, that a pulse is applied to one or the other of said inputs in accordance with the binary value provided at the output of said logical circuit.

14. Apparatus as claimed in claim 13, characterized in this, that said counter includes a plurality of intercoupled bistable circuits.

15. Apparatus as claimed in claim 13, characterized in this, that one of the bistable circuits of said reversible counter determines if the number of pulses previously received at one input is larger or smaller than the number of pulses previously received at the other input of said reversible counter.

16. Apparatus for computing time averages of functions, which vary with time, characterized in this, that said apparatus computes averages of sampled values, or of functions thereof, taken from the functions to be analyzed at various predetermined relative time intervals, e.g. correlation functions, $k$ representing the number of waveforms or functions to be analyzed, that a pulse generator is provided supplying pulses to a cyclic counter, that the sampling of a first of said $k$ functions together with that of its associated reference function is made by a first comparator means once for every cycle made by said cyclic counter, and for a predetermined condition thereof, said first comparator means including a bistate device to store the binary result of a comparison and present it at its output, logical circuit means responsive to the bistate device output until the next sampling of said first function is made at the next cycle, that a memory is provided comprising a number of sections corresponding to particular conditions of said cyclic counter, that reading means are provided to sequentially read the words stored in various sections of said memory under the control of said cyclic counter, that staticizing means operatively connected to the member are provided to temporarily store a word read from a section of said memory before being rewritten eventually in modified form into said memory section, that the sampling of a second of said $k$ functions together with that of its reference function is made by a second comparator means for every condition of said cyclic counter, that computing means operatively connected to the staticizing device and logical circuit are provided to associate said staticizing device with the output from said logical circuit so that the binary valued output thereof is combined with the word read into said staticizing means to produce an eventually modified word to be rewritten into a section of said memory, the said means for computing a measure of

50 the average of the binary values provided at the output of said logical circuit are constituted by said staticizing means in association with said computing means, the said staticizing means are constituted by a counter parallel driven from said memory and to which the output of said logical circuit is fed in the form of serial pulses characterizing the binary values provided at the output of said logical circuit, the said counter is or is not fed by a pulse depending upon the binary value provided at the output of said logical circuit.

17. Apparatus for computing time averages of functions, which vary with time, characterized in this, that said apparatus computes averages of sampled values, or of functions thereof, taken from the functions to be analyzed at various predetermined relative time intervals, e.g. correlation functions, $k$ representing the number of waveforms or functions to be analyzed, that a pulse generator is provided supplying pulses to a cyclic counter, that the sampling of a first of said $k$ functions together with that of its associated reference function is made by a first comparator means once for every cycle made by said cyclic counter, and for a predetermined condition thereof, said first comparator means including a bistate device to store the binary result of a comparison and present it at its output, logical circuit means responsive to the bistate device output until the next sampling of said first function is made at the next cycle, that a memory is provided comprising a number of sections corresponding to particular conditions of said cyclic counter, that reading means are provided to sequentially read the words stored in various sections of said memory under the control of said cyclic counter, that staticizing means are provided to temporarily store a word read from a section of said memory before being rewritten eventually in modified form into said memory section, that the sampling of a second of said $k$ functions together with that of its reference function is made by a second comparator means for every condition of said cyclic counter, that computing means are provided to associate said staticizing device with the output from said logical circuit so that the binary valued output thereof is combined with the word read into said staticizing means to produce an eventually modified word to be rewritten into a section of said memory, and that said means for computing a measure of the average of the binary values provided at the output of said logical circuit are constituted by said staticizing means in association with said computing means, wherein the sampling of at least a third of said $k$ functions together with that of its reference function is made by at least a third comparator means once for every cycle made by said cyclic counter, and for a predetermined condition thereof kept in memory in register means, said third comparator means including a bistate device to store the binary result of a comparison and present it at its output to said logical circuit until the next sampling of said third function is made at the next cycle, wherein delay comparator means are provided to compare the condition of said cyclic counter with the condition(s) stored in said register means, that authorizing means are provided to enable the feed by said logical circuit output to said means for computing a measure of the average of the binary values provided at the output of said logical circuit, only upon said delay comparator means having detected that said cyclic counter is in a condition bearing a particular relationship to the condition(s) stored in said register means, all said conditions being taken with respect to said predetermined condition corresponding to the sampling of the first of said $k$ functions 18. Apparatus as claimed in claim 17 characterized in this, that said particular relationship corresponds to said delay comparator means having detected that said cyclic counter is in a condition which is not smaller than any of the condition(s) stored in said register means, all said conditions being taken with respect to said predetermined condition corresponding to the sampling of the first of said $k$ functions.

19. Apparatus as claimed in claim 17, characterized in this, that cycle identifying means are provided to distinguish between the positions of the cycles of said cyclic counter within consecutive series of such cycles and that said authorizing means only enable the feed by said logical circuit output for predetermined cycles of said cyclic counter in said series of consecutive cycles.

20. Apparatus as claimed in claim 19, characterized in this, that said cycle identifying means are constituted by a bistable device operated as a scale-of-two device and authorizing said feed by said logical circuit output only for one particular condition of said scale-of-two device, and that the sampling of the first one of said $k$ functions is only enabled by said authorizing means at the beginning of a cycle of said cyclic counter for which said scale-of-two device is in its other condition, a reversal from one condition to the other of paid scale-of-two device taking place for every cycle of said cyclic counter.

21. Apparatus for computing time averages of functions, which vary in time, characterized in this, that said apparatus computes averages of sampled values, or of functions thereof, taken from the functions to be analyzed at various predetermined relative time intervals, e.g. correlation functions, $k$ representing the number of waveforms or functions to be analyzed that a pulse generator is provided supplying pulses to a cyclic counter, that the sampling of a first of said $k$ functions together with that of its associated reference function is made by a first comparator means once for very cycle made by said cyclic counter, and for a predetermined condition thereof, said first comparator means including a bistate device to store the binary result of a comparison and present it at its output, logical circuit means responsive to the bistate device output until the next sampling of said first function is made at the next cycle, that a memory is provided comprising a number of sections corresponding to particular conditions of said cyclic counter, that reading means operatively connected to the memory are provided to sequentially read the words stored in various sections of said memory under the control of said cyclic counter, that staticizing means are provided to temporarily store a word read from a section of said memory before being rewritten eventually in modified form into said memory section, that the sampling of a second of said $k$ functions together with that of its reference function is made by a second comparator means for every condition of said cyclic counter, that computing means are provided to associate said staticizing device with the output from said logical circuit so that the binary valued output thereof is combined with the word read into said staticizing means to produce an eventually modified word to be rewritten into a section of said memory, and that said means for computing a measure of the average of the binary values provided at the output of said logical circuit are constituted by said staticizing means in association with said computing means, wherein the sampling of at least a third of said $k$ functions together with that of its reference function is made by at least a third comparator means once for every cycle made by said cyclic counter, and for a predetermined condition thereof kept in memory in register means, said third comparator means including a bistate device to store the binary result of a comparison and present it at its output to said logical circuit until the next sampling of said third function is made at the next cycle, wherein delay storage means are provided to delay the feed of the binary valued outputs secured by said $k$ comparator means to said logical circuit until the cycle of said cyclic counter which follows that cycle during which said binary values were secured.

22. Apparatus as claimed in claim 21, characterized in this, that said delay storage means include as many bistate devices associated with said second comparator means as there are conditions for said cyclic counter, that further bistate devices are provided in association with the comparator means for said first and at least for said third of said $k$ functions whereby each of said first and third comparator means is associated with two bistate devices, that timing means are provided to store the results of a comparison made by any one of said comparator means for said first and at least for said third of said $k$ functions into one or the other of said bistate devices associated to the respective comparator means and this depending on the parity of the cycle of said cyclic counter, that further timing means under the control of said cyclic counter are provided to successively store the results of said second comparator means into the various bistate devices provided for said second comparator means and this in accordance with the condition of said cyclic counter, that said timing means enable the binary values stored in said bistate devices associated to said first and at least said third comparator means to feed said logical circuit during the cycle of said cyclic counter which follows that cycle during which said binary values were secured, and that said further timing means enable the binary values stored in said bistate devices associated to said second comparator means to feed said logical circuit one cycle of said cyclic counter after the condition during which said binary values were secured.

23. Apparatus for computing time averages of functions, which vary with time, characterized in this, that said apparatus computes averages of sampled values, or of functions thereof, taken from the functions to be analyzed at various predetermined relative time intervals, e.g. correlation functions, that a pulse generator is provided supplying pulses to a cyclic counter, that the sampling of a first of said $k$ functions together with that of its associated reference function is made by a first comparator means once for every cycle made by said cyclic counter, and for a predetermined condition thereof, said first comparator means including a bistate device to store the binary result of a comparison and present it at its output, logical circuit means responsive to the bistate device output until the next sampling of said first function is made at the next cycle, that a memory is provided comprising a number of sections corresponding to particular conditions of said cyclic counter, that reading means operatively connected to the memory are provided to sequentially read the words stored in various sections of said memory under the control of said cyclic counter, that staticizing means are provided to temporarily store a word read from a section of said memory before being rewritten eventually in modified form into said memory section, that the sampling of a second of said $k$ functions together with that of its reference function is made by a second comparator means for every condition of said cyclic counter, that computing means are provided to associate said staticizing device with the output from said logical circuit so that the binary valued output thereof is combined with the word read into said staticizing means to produce an eventually modified word to be rewritten into a section of said memory, and that said means for computing a measure of the average of the binary values provided at the output of said logical circuit are constituted by said staticizing means in association with said computing means and means are provided to prevent said logical circuit from delivering output values to said staticizing means for predetermined conditions of said cyclic counter.

24. Apparatus as claimed in claim 23, characterized in this, that said means to prevent said logical circuit from delivering output values to said staticizing means include a bistable device which is triggered into one or the other condition to identify a first and a second series of sections of said memory, said bistable device authorizing the feed of said binary values provided at the output of said logical circuit to said staticizing means for only one of its two conditions, whereby during a computation only part of said memory is used to store words in the corresponding sections.

25. Apparatus as claimed in claim 24, characterized in this, that said bistable device is operated as a scale-of-two device which is triggered from one to the other condition for every condition of said cyclic counter, whereby the sections out of said memory which are enabled to store words during a computation are sections which correspond either to consecutive odd conditions or to consecutive even conditions of said cyclic counter.

26. Apparatus for computing time averages of functions, which vary with time, characterized in this, that said apparatus computes averages of sampled values, or of functions thereof, taken from the functions to be analyzed at various predetermined relative time intervals, e.g. correlation functions $k$ representing the number of waveforms or functions to be analyzed, that a pulse generator is provided supplying pulses to a cyclic counter, that the sampling of a first of said $k$ functions together with that of its associated reference function is made by a first comparator means once for every cycle made by said cyclic counter, and for a predetermined condition thereof, said first comparator means including a bistate memory device to store the binary results of a comparison and present it at its output to said logical circuit until the next sampling of said first function is made at the next cycle, and that the sampling of a second of said $k$ functions together with that of its reference function is made by a second of said comparator means having register means once for every cycle made by said cyclic counter and for a predetermined condition thereof kept in memory in register means, said $k$ functions being supplied to said $k$ comparator means through an interconnecting device provided with cross-connections enabling to interchange the associations between said $k$ functions and said $k$ comparator means, the said interconnecting device being provided with $2k$ input terminals and $2k$ output terminals, $k$ of said input terminals being connected to input circuits to which are applied the $k$ functions to be analyzed and the $k$ remaining input terminals being connected to the $k$ reference functions to be individually associated with said functions to be analyzed, the $2k$ output terminals of said interconnecting device being connected in pairs to pairs of inputs of said $k$ comparator means.

27. Apparatus for computing statistical, time averages of functions, which vary with time, characterized in this, that said apparatus computes averages of sampled values, or of functions thereof, taken from the functions to be analyzed at various predetermined relative time intervals, e.g. correlation functions, $k$ representing the number of waveforms or functions to be analyzed, that a pulse generator is provided supplying pulses to a cyclic counter, that the sampling of a first of said $k$ functions together with that of its associated reference function is made by a first comparator means once for every cycle made by said cyclic counter, and for a predetermined condition thereof, said first comparator means including a bistate memory device to store the binary results of a comparison and present it at its output to said logical circuit until the next sampling of said first function is made at the next cycle, and that the sampling of a second of said $k$ functions together with that of its reference function is made by a second of said comparator means having register means once for every cycle made by said cyclic counter and for a predetermined condition thereof kept in memory in register means wherein each of said $k$ reference functions statistically independent from one another has a rectangular probability distribution with a range of values covering those of said functions and that for each of said $k$ reference functions a generator supplies a sawtooth waveform exhibiting linear variations between predetermined lower and upper limits.

28. Apparatus as claimed in claim 27, characterized in this, that independent slope control means are provided for each of said sawtooth waveform generators so as to secure linear slopes which vary in a random manner from one scan to the next.

29. Apparatus as claimed in claim 28, characterized in this, that said slopes have a random value determined by a white noise generator controlling said double bootstrap circuit.

30. Apparatus as claimed in claim 27, characterized in this, that a continuous waveform representing a function to be analyzed and the sawtooth waveform representing the corresponding reference function are applied to two inputs of an operational amplifier producing the analogue sum of these two waveforms and included in the comparator means for said function to be analyzed.

31. Apparatus as claimed in claim 27, characterized in this, that said sawtooth waveform generator is constituted by a double bootstrap circuit able to provide linear potential variations at its output varying between predetermined lower and upper limits, the slope of said variations being alternatively positive and negative.

32. Apparatus for computing time averages of functions, which vary with time, characterized in this, that said apparatus computes averages of sampled values, or of functions thereof, taken from the functions to be analyzed at various predetermined relative time intervals, e.g. correlation functions $k$ representing the number of waveforms or functions to be analyzed, that a pulse generator is provided supplying pulses to a cyclic counter, that the sampling of a first of said $k$ functions together with that of its associated reference function is made by a first comparator means once for every cycle made by said cyclic counter, and for a predetermined condition thereof, said first comparator means including a bistate memory device to store the binary results of a comparison and present it at its output to said logical circuit until the next sampling of said first function is made at the next cycle, and that the sampling of a second of said $k$ functions together with that of its reference function is made by a second of said comparator means having register means once for every cycle made by said cyclic counter and for a predetermined condition thereof kept in memory in register means, wherein for each of said $k$ reference functions a generator supplies a sawtooth waveform exhibiting liner variations between predetermined lower and upper limits, independent slope control means connected to the sawtooth generators are provided for each of said sawtooth waveform generators so as to secure linear slopes which vary in a random manner from one scan to the next, the random period having an average value of the order of the period of said cyclic counter, the continuous waveform representing a function to be analyzed and the sawtooth waveform representing the corresponding reference function are applied to two inputs of an operational amplifier producing the analogue sum of these two waveforms and included in the comparator means for said function to be analyzed, the potential obtained at the output of said operational amplifier is transmitted to a two input differential amplifier fed on the one hand by said sum of the waveform to be analyzed with the reference waveform associated therewith, and on the other hand by a fixed stabilized reference voltage, triggering pulses at the stepping rhythm of said cyclic counter being provided by said pulse generator to the output stage of said differental amplifier in order to produce a pulse at one or the other of two distinct outputs of said differential amplifier in accordance with the result of the comparison between said sum of the two waveforms and said fixed reference voltage.

33. Apparatus as claimed in claim 32 characterized in this, that the potential obtained at the output of said operational amplifier is transmitted to one of the inputs of the differential amplifier acting as comparator by means of a voltage limiting device comprising a first symmetrical amplitude limiter followed by an amplifier at the output of which is a second symmetrical amplitude limiter, the reference voltage for each of the two limtiers being each time equal to the said fixed stabilized reference voltage applied to the second input of said differential amplifier.

34. Apparatus for computing time averages of functions, which vary with time, including means for the sampling of said functions and means for computing a measure of the average of the product of the sampled values of several functions, i.e. correlation functions, characterized in this, that sampling means are provided to sample at least three of said functions and to supply signals indicative of said sampled values to a multiplication circuit providing an output indicative of the product of said values and with this output to feed means for computing a measure of the average of the values successively provided at the output of said multiplication circuit, that a pulse generator is provided supplying pulses to a cyclic counter, that the sampling of a first of said functions is accomplished by said sampling means once for every cycle made by said cyclic counter, and for a predetermined condition thereof, that the sampling of the remaining functions are made by said sampling means once for every cycle made by said cyclic counter and for a predetermined condition thereof kept in memory register means, and that said sampling means include sample storage means to store the values of the samples of said functions during time intervals enabling said samples to be fed together to said multiplication circuit.

35. Apparatus for computing time averages of functions, which vary with time, including means for the sampling of said functions and means for computing a measure of the average of the product of the sampled values of several functions, i.e. correlation functions, characterized in this, that sampling means are provided to sample at least three of said functions and to supply signals indicative of said samples values to a multiplication circuit providing an output indicative of the product of said values and with this output to feed means for computing a measure of the average of the values successively provided at the output of said multiplication circuit, that a pulse generator is provided supplying pulses to a cyclic counter, that the sampling of a first of said functions is accomplished by said sampling means once for every cycle made by said cyclic counter, and for a predetermined condition thereof, that a memory is provided comprising a number of sections corresponding to particular conditions of said cyclic counter, that reading means are provided to sequentially read the words stored in various sections of said memory under the control of said cyclic counter, that staticizing means are provided to temporarily store a word read from a section of said memory before being rewritten eventually in modified form into said memory section, that the sampling of a second of said functions is accomplished by said sampling means once for every condition of said cyclic counter, that the sampling of at least a third of said functions is accomplished by said sampling means once for every cycle made by said cyclic counter and for a predetermined condition thereof kept in memory register means, and that said sampling means include sample storage means to store the values of the samples of said functions during time intervals enabling said samples to be fed together to said multiplication circuit.

36. Apparatus characterized in this, that said apparatus, including memory register means, computes averages of sampled values, or of functions thereof, taken from the functions to be analyzed at various predetermined relative time intervals, e.g. correlation functions, that a pulse generator is provided supplying pulses to a cyclic counter, that the sampling of a first of said $k$ functions together with that of its associated reference function is made by a first comparator means once for every cycle made by said cyclic counter, and for a predetermined condition thereof, said first comparator means including a bistate device to store the binary result of a comparison and present it at its output to said logical circuit until the next sampling of said first function is made at the next cycle, that separate means for computing a measure of the average of the binary values provided at the output of said logical circuit are provided, each corresponding to a particular condition of said cyclic counter, and that the sampling of a second of said $k$ functions together with that of its reference function is made by a second comparator means for every condition of said cyclic counter.

37. Apparatus as claimed in claim 36, characterized in this, that the sampling of at least a third of said $k$ functions together with that of its reference function is made by at least a third comparator means once for every cycle made by said cyclic counter, and for a predetermined condition thereof kept in memory register means, said third comparator means including a bistate device to store the binary result of a comparison and present it at its output to said logical circuit until the next sampling of said third function is made at the next cycle.

References Cited

UNITED STATES PATENTS

| | | | |
|---|---|---|---|
| 3,014,659 | 12/1961 | Dickinson | 235—150.51 X |
| 3,191,149 | 6/1965 | Andrews | 340—146.3 |
| 3,043,515 | 7/1962 | Anderson et al. | 235—181 |
| 3,147,373 | 9/1964 | Clynes | 235—181 |
| 2,933,623 | 4/1960 | Jones et al. | 307—88.5 |
| 3,109,107 | 10/1963 | Lee | 307—88.5 |
| 3,043,516 | 7/1962 | Abbott et al. | 235—183 X |
| 3,264,459 | 8/1966 | Ericson | 235—150.51 X |
| 3,281,584 | 10/1966 | Martinez | 235—194 |

MALCOLM A. MORRISON, *Primary Examiner.*

J. F. RUGGIERO, *Assistant Examiner.*